(12) United States Patent (10) Patent No.: US 7,530,624 B2
Endo (45) Date of Patent: May 12, 2009

(54) VEHICLE DOOR STRUCTURE

(75) Inventor: Yoshihide Endo, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/806,969

(22) Filed: Jun. 5, 2007

(65) Prior Publication Data

US 2008/0007087 A1 Jan. 10, 2008

(30) Foreign Application Priority Data

Jun. 9, 2006 (JP) ............................. 2006-161315

(51) Int. Cl.
*B60J 5/00* (2006.01)
(52) U.S. Cl. ................................................. 296/146.6
(58) Field of Classification Search ............. 296/146.5, 296/146.6, 187.12, 193.05, 30
See application file for complete search history.

(56) References Cited

U.S. PATENT DOCUMENTS

| | | | | |
|---|---|---|---|---|
| 4,860,496 | A * | 8/1989 | Hellriegel | 49/502 |
| 5,325,632 | A * | 7/1994 | Djavairian et al. | 49/502 |
| 5,417,470 | A * | 5/1995 | Holt | 296/187.12 |
| 5,470,125 | A | 11/1995 | Yamazaki | |
| 5,599,057 | A * | 2/1997 | Hirahara et al. | 296/146.6 |
| 5,762,394 | A * | 6/1998 | Salmonowicz et al. | 296/146.5 |
| 6,079,766 | A * | 6/2000 | Butler et al. | 296/146.5 |
| 6,135,541 | A * | 10/2000 | Geise et al. | 296/1.03 |
| 6,302,473 | B1 * | 10/2001 | Weber | 296/146.6 |
| 6,575,525 | B2 * | 6/2003 | Traister et al. | 296/187.12 |
| 6,923,492 | B2 | 8/2005 | Okazaki et al. | |
| 6,942,281 | B2 | 9/2005 | Omori et al. | |
| 6,959,957 | B2 * | 11/2005 | Fukuchi et al. | 296/146.5 |
| 6,969,107 | B2 * | 11/2005 | Omori et al. | 296/146.6 |
| 7,144,072 | B2 * | 12/2006 | Wallstrom et al. | 296/187.03 |
| 7,172,238 | B2 * | 2/2007 | Bodin et al. | 296/146.6 |
| 2005/0212324 | A1 * | 9/2005 | Mittermeier et al. | 296/146.5 |
| 2007/0108794 | A1 * | 5/2007 | Yagi | 296/146.6 |

FOREIGN PATENT DOCUMENTS

DE 29 32 027 A1 2/1980

(Continued)

*Primary Examiner*—Dennis H. Pedder
(74) *Attorney, Agent, or Firm*—Oliff & Berridge, PLC

(57) ABSTRACT

A vehicle door structure for suppressing permanent deformation due to thermal distortion of a door is described. A door inner panel 18 and a door outer panel 20 are configured in aluminum alloy or the like. An impact beam 26 and a belt line inner reinforcement 44 are joined to the door inner panel 18. The impact beam 26 and the belt line inner reinforcement 44 are configured from a material, such as steel, with a smaller linear expansion coefficient than the door outer panel 20. Therefore, even if the door 42 as a whole is, for example, placed in a high temperature environment such as a bake oven in electrophoretic coating, the door inner panel 18 side and the door outer panel 20 side are restrained, respectively, by the belt line inner reinforcement 44 and the impact beam 26. Thus, permanent deformation due to thermal distortion at the door outer panel 20 side, due to a difference in the thermal expansion conditions of the door inner panel 18 side and the door outer panel 20 side, may be suppressed.

12 Claims, 46 Drawing Sheets
(3 of 46 Drawing Sheet(s) Filed in Color)

FOREIGN PATENT DOCUMENTS

| | | |
|---|---|---|
| DE | 102 54 084 A1 | 6/2004 |
| DE | 102 61 565 A1 | 7/2004 |
| EP | 0 921 052 A3 | 6/1999 |
| GB | 2 028 960 A | 3/1980 |
| JP | U-62-139810 | 9/1987 |
| JP | 06072152 A * | 3/1994 |
| JP | A-6-255365 | 9/1994 |
| JP | A-6-269871 | 9/1994 |
| JP | A-7-108827 | 4/1995 |
| JP | A-8-011535 | 1/1996 |
| JP | A-11-129758 | 5/1999 |
| JP | A-11-310036 | 11/1999 |
| JP | A-2000-071770 | 3/2000 |
| JP | A-2001-277852 | 10/2001 |
| JP | A-2001-316657 | 11/2001 |
| JP | A-2003-205745 | 7/2003 |
| JP | A 2003-252057 | 9/2003 |
| JP | A 2004-26070 | 1/2004 |
| JP | A-2004-136756 | 5/2004 |
| JP | A 2004-314696 | 11/2004 |
| JP | A-2004-345500 | 12/2004 |
| JP | A-2005-263164 | 9/2005 |
| KR | 1998-44579 A | 9/1998 |
| WO | WO 03/011586 A1 | 2/2003 |
| WO | WO 2005/084247 A2 | 9/2005 |

* cited by examiner 8-8

FIG.23
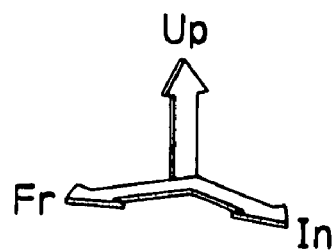
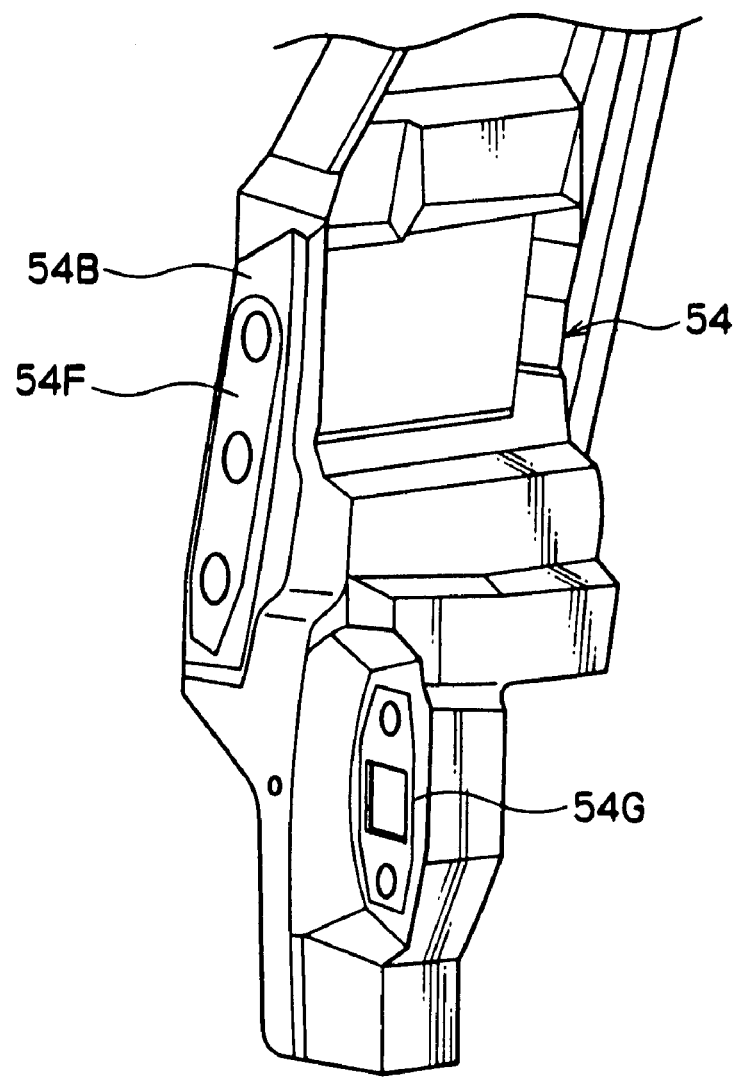

FIG.25
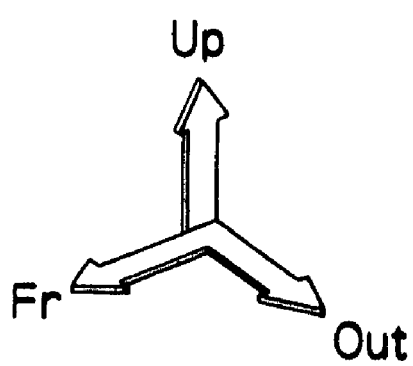
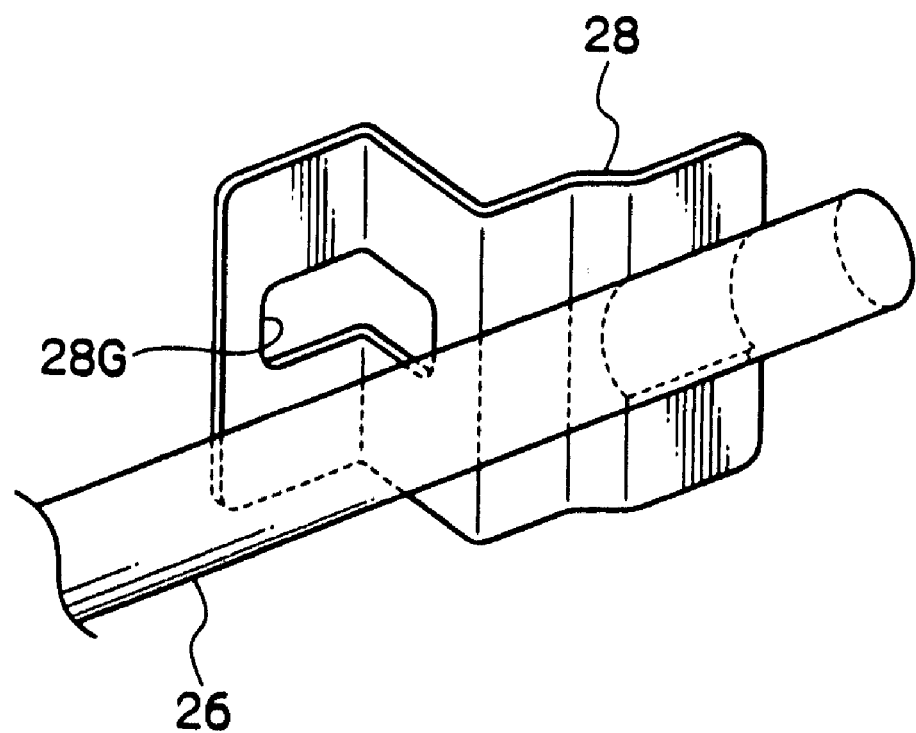

VEHICLE DOOR STRUCTURE

CROSS-REFERENCE TO RELATED APPLICATION

This application claims priority under 35 U.S.C. 119 from Japanese Patent Application No. 2006-161315, the disclosure of which is incorporated by reference herein.

BACKGROUND OF THE INVENTION

1. Field of the Invention

The present invention relates to a vehicle door structure, and in particular to a vehicle door structure configured with a door outer panel disposed at the outside of a door and a door inner panel disposed at the inside of the door.

2. Description of the Related Art

Vehicle door structures are known, such as described in Japanese Patent Application (JP-A) Nos. 2004-314696, 2003-252057, and 2004-26070. In JP-A No. 2004-314696 an example of a vehicle door is described, with the door provided with main structures of a door body and an outer panel. The door body is formed as a substantially rectangular frame (skeleton structure), and the outer panel is fixed to the door body on the vehicle outside. Furthermore, the door as a whole, provided with the door body and the outer panel, is preferably configured from a light alloy, such as an aluminum alloy, magnesium alloy or the like.

However, when the door is configured as a whole from such a light alloy that has a large linear expansion coefficient, such as aluminum alloy, magnesium alloy or the like, and, furthermore, the door as a whole is placed, for example, in a high temperature environment (such as a bake oven in electrophoretic coating), there is thermal expansion of the door as a whole. At such a time, the thermal expansion amount of the outer panel, since it is formed as a single sheet, is greater than that of the door body. Therefore, in such a door, a difference is generated in the thermal expansion conditions between the door body side and the outer panel side. There is a possibility of permanent deformation being generated, due to thermal distortion at the outer sheet portion of the door that is provided at the outer panel side, caused by the difference in the thermal expansion conditions between the door body side and the door panel side.

The present invention is made in consideration of the above circumstances and provides a vehicle door structure that may suppress permanent deformation of the door.

SUMMARY OF THE INVENTION

In order to address the above issues, a door structure of a first aspect of the present invention includes: a door inner panel, including, at portions toward both ends in the door width direction, first side joining portions at a first side in the door thickness direction and second side joining portions at a second side, opposite to the first side, in the door thickness direction; a door outer panel, disposed more to the second side in the door thickness direction than the door inner panel and joined to the door inner panel; a pair of door reinforcement members, each configured from a material that has a smaller linear expansion coefficient than that of the door outer panel, extending in the door width direction and located between the door inner panel and the door outer panel, one of the door reinforcement members being disposed at a position at the first side in the door thickness direction and portions toward both ends thereof in the door width direction each being joined to one of the first side joining portions, and the other of the door reinforcement members being disposed in a position at the second side in the door thickness direction and portions toward both ends thereof in the door width direction each being joined to one of the second side joining portions.

In the vehicle door structure of the first aspect, if the vehicle door structure is applied to a door on a side face of a vehicle, for example, the door width direction corresponds to the vehicle front-rear direction, and if the vehicle door structure is applied to a door on the rear face of a vehicle then the door width direction corresponds to the vehicle width direction. Furthermore, if the vehicle door structure is applied to a door on a side of a vehicle, for example, the door thickness direction corresponds to the vehicle width direction, and if the vehicle door structure is applied to a door on a rear face of a vehicle then the door thickness direction corresponds to the vehicle front-rear direction (and the same applies to other aspects below).

In the above aspect, the door reinforcement member that is disposed at the door outer panel side is joined to the second side joining portions formed at both ends in the door width direction of the inner panel and toward the door outer panel side. Furthermore, the door reinforcement member is configured of a material with a smaller linear expansion coefficient than the door outer panel. Therefore, even if the door as a whole is, for example, placed in a high temperature environment, thermal expansion of the door outer panel may be restrained, by the reinforcement member disposed at the door outer panel side, and may be suppressed. By doing so, permanent deformation of the door outer panel due to thermal distortion may be suppressed.

Furthermore, in a similar manner there is also one of the door reinforcement members joined, at portions at both ends in the door width direction of the door inner panel, to the first side joining portions formed toward the door inner panel side. Therefore, since the door inner panel side and the door outer panel side are restrained by the pair of door reinforcement members, even if the door as a whole is, for example, placed in a high temperature environment, generation of a difference in thermal expansion conditions between the door inner panel side and the door outer panel side may be suppressed. By doing so, generation of permanent deformation due to thermal distortion on the door outer panel side, due to a difference in thermal expansion conditions between the door inner panel side and the door outer panel side, may be suppressed.

Furthermore, the first side and the second side in the door thickness direction of the door inner panel are restrained by respective members of the pair of door reinforcement members. Therefore, rotational displacement of the door inner panel due to thermal expansion force of the door outer panel may also be suppressed.

In the vehicle door structure of the above aspect, a door width direction surface extending in the door width direction, and a door thickness direction surface extending in the door thickness direction, may be formed at one of portions at the end in the door width direction of the door inner panel, and it is sufficient as long as at least one reinforcement member of the pair of door reinforcement members has a connecting portion provided at one of the portions at the ends in the door width direction thereof, and the connecting portion is joined to the door width direction surfaces and the door thickness direction surfaces.

In the above aspect, the connecting portion is joined to the door width direction surface and the door thickness direction surface formed at the portion at the end in the door width direction of the door inner panel. Therefore, even if the door as a whole is, for example, placed in a high temperature environment, relative angular displacement between the door width direction surfaces and the door thickness direction surfaces of the door inner panel (tilting of the two faces) may be suppressed by the connecting portion. In particular, the connecting portion, when configured from a material with a smaller linear expansion coefficient than that of the door outer panel, exhibits a high suppressing effect against relative angular displacement between the door thickness direction surfaces and the door width direction surfaces caused by the thermal expansion force of the door outer panel, even if the door as a whole is, for example, placed in a high temperature environment.

In the vehicle door structure of the above aspects, the door outer panel and the door inner panel may be joined at their mutual edge portions by a normal temperature curing adhesive, a fine particle containing adhesive, or welding.

In the above aspect, the door outer panel and the door inner panel are joined at their mutual edge portions by a normal temperature curing adhesive, a fine particle containing adhesive, or welding. Therefore, even if the door as a whole is, for example, placed in a high temperature environment, generation of positional misalignment of the edge portions of the door outer panel relative to the door inner panel, due to thermal expansion force of the door outer panel, may be suppressed.

In the vehicle door structure of the above aspects, a mounting portion for mounting a functional component may be provided on one or more of the pair of door reinforcement members or the connecting portion.

According to the above aspect, a mounting portion for mounting a functional component is provided on at least one of the pair of door reinforcement members or the connecting portion. Therefore, even if the door as a whole is, for example, placed in a high temperature environment, since there is the door reinforcement member configured from a material with a small linear expansion coefficient, the functional component is provided at the door reinforcement member or the mounting portion of the connecting portion provided on the door reinforcement member, thereby mounting precision of the functional component may be assured.

In the vehicle door structure of the above aspects, one or more of the pair of door reinforcement members or the connecting portion may be joined to the door outer panel.

According to the above aspect, at least one of the pair of door reinforcement members, or the connecting portion provided on the pair of door reinforcement members, is joined to the door outer panel. Therefore, the outer panel may be directly restrained by the door reinforcement member or the connecting portion, and so, even if the door as a whole is, for example, placed in a high temperature environment, generation of a difference in the thermal expansion conditions between the door inner panel side and the door outer panel side may be suppressed.

In the vehicle door structure of the above aspects, a door frame may be provided, supporting door glass and provided extending up from a door panel body, of the door inner panel and the door outer panel, and the fixing portion of the door frame to the door panel body may be joined to at one or more of the pair of door reinforcement members or the connecting portion.

According to such an aspect, even if the door as a whole is, for example, placed in a high temperature environment, since the fixing portion of the door frame to the door panel body is joined to at least one of the pair of door reinforcement members configured from a material with a small linear expansion coefficient and with suppressed thermal expansion deformation, or to the connecting portion provided to the door reinforcement member, the precision of the mounting position of the door frame may be assured.

In the vehicle door structure of the above aspects, at the portion at the end in the door width direction of the door inner panel, a second door thickness direction surface may be formed adjacent to a portion where the edge of the door inner panel is joined to the door outer panel and extending in the door thickness direction, and the connecting portion may be joined to the second door thickness direction surface.

According to such an aspect, a second door thickness direction surface is formed adjacent to a portion where the edge of the door inner panel is joined to the door outer panel and extending in the door thickness direction, and the connecting portion provided on at least one of the pair of door reinforcement members is joined to the second door thickness direction surface. Therefore, by the higher rigidity afforded to the second door thickness direction surface joined to the connecting portion, the rigidity of the edge joining portions themselves, adjacent to the second door thickness direction surface, may be increased. Furthermore, even if the door as a whole is, for example, placed in a high temperature environment, deformation of the edge joining portions due to the thermal expansion force of the door outer panel may be suppressed.

In the vehicle door structure of the above aspects, the connecting portion, as well as being joined to the door width direction surface and the door thickness direction surfaces, may be configured with a shape retaining portion for restricting relative angular displacement of the door width direction surface and door thickness direction surface.

According to such an aspect, the connecting portion provided on at least one of the pair of door reinforcement members is joined to the door width direction surface and the door thickness direction surface that are formed on the portion at the end in the door width direction of the door inner panel. Therefore, even if the door as a whole is, for example, placed in a high temperature environment, relative angular displacement between the door width direction surface and the door thickness direction surface of the door outer panel (tilting of the two faces), due to the thermal expansion force of the door outer panel, may be suppressed by the connecting portion. Furthermore, the shape retaining portion is provided on the connecting portion. Therefore, relative angular displacement of the door width direction surface and the door thickness direction surface may be even further suppressed.

In the vehicle door structure of the above aspects, a portion at each of the two ends in the door width direction of the pair of door reinforcement members may be connected by a connector.

According to such an aspect, a portion at each of the two ends in the door width direction of the pair of door reinforcement members is connected by a connector. Therefore, rigidity between the pair of door reinforcement members may be assured. By doing so, even if the door as a whole is, for example, placed in a high temperature environment, a difference in the thermal expansion conditions between the door inner panel side and the door outer panel side may be even further suppressed.

In the vehicle door structure of the above aspects, reinforcement may be provided continuous to the door width direction surface and the door thickness direction surface.

According to such an aspect, the reinforcement is provided continuously on the door width direction surface and the door thickness direction surface that are formed at a portion at both ends in the door width direction of the door inner panel. Therefore, even if the door as a whole is, for example, placed in a high temperature environment, relative angular displacement of the door width direction surface and the door thickness direction surface (tilting of the two faces), due to the thermal expansion force of the door outer panel, may be suppressed by the reinforcement.

In the vehicle door structure of the above aspect, the reinforcement may be configured as a bead that protrudes out from the door width direction surface and the door thickness direction surface.

According to such an aspect, the reinforcement is configured as a bead that protrudes out from the door width direction surface and the door thickness direction surface. Therefore, the strength, against relative angular displacement of the door width direction surface and the door thickness direction surface (tilting of the two faces), may be assured by the bead.

In the vehicle door structure of the above aspect, the bead may be configured with a bead portion that protrudes out from the door thickness direction surface along the door width direction, and a portion at an end in the door width direction of at least one of the pair of door reinforcement members may be provided with a connecting portion and the connecting portion may be joined at a protruding end portion of the bead portion.

According to such an aspect, a bead portion protrudes out from the door thickness direction surface along the door width direction, that is to say along the longitudinal direction of the door reinforcement member, and the connecting portion provided on the door reinforcement member is joined at the protruding end portion of the bead portion. Therefore, deformation of the bead portion, and therefore of the bead as a whole may be suppressed due to an axial force exhibited by the door reinforcement member. By doing so, relative angular displacement between the door width direction surface and the door thickness direction surface (tilting of the two faces) may be suppressed.

A vehicle door structure of an aspect according to a second embodiment of the present invention includes: a door inner panel, disposed at first side in the door thickness direction; a door outer panel, disposed more to the second side in the door thickness direction than the door inner panel and joined to the door inner panel; a door reinforcement member, configured from a material that has a smaller linear expansion coefficient than that of the door outer panel, extending in the door width direction and located between the door inner panel and the door outer panel, and portions of the door reinforcement member both ends in the door width direction thereof being joined respectively to portions of both ends of the door inner panel in the door width direction; a connecting portion, provided at an end portion in the door width direction of the door reinforcement member; and a door frame, supporting door glass and provided extending up from a door panel body, which includes the door inner panel and the door outer panel, the fixing portion of the door frame to the door panel body being joined to at least one of the door reinforcement member or the connecting portion.

According to such an aspect, even if the door as a whole is, for example, placed in a high temperature environment, since the fixing portion of the door frame is joined to the door reinforcement member configured from a material with a small linear expansion coefficient with suppressed thermal expansion deformation, or to the connecting portion provided on the door reinforcement member, the fixing alignment precision of the door frame may be assured.

In the vehicle door structure of the above aspect, a door thickness direction surface may be formed at an end portion in the door width direction of the door inner panel, adjacent to a portion where the edge of the door inner panel is joined to the door outer panel, the door thickness direction surface extending in the door thickness direction, and the connecting portion may be joined at the door thickness direction surface.

According to such an aspect, a door thickness direction surface is formed adjacent to a portion where the edge of the door inner panel is joined to the door outer panel, and the connecting portion provided on the door reinforcement member is joined at the door thickness direction surface. Therefore, by the higher rigidity afforded to the door thickness direction surface joined to the connecting portion, the rigidity of the edge joining portion itself, adjacent to the second door thickness direction surface, may be increased. Furthermore, even if the door as a whole is, for example, placed in a high temperature environment, deformation of the edge joining portions due to the thermal expansion force of the door outer panel may be suppressed.

In the vehicle door structure of the above aspects, at an end portion in the door width direction of the door inner panel, a door width direction surface extending may be formed in the door width direction, and a door thickness direction surface may be formed extending in the door thickness direction; and the connecting portion may be joined to the door width direction surface and the door thickness direction surface, and may include a shape retaining portion for restricting relative angular displacement of the door width direction and door thickness direction.

According to such an aspect, the connecting portion provided on the door reinforcement member is joined to the door width direction surface and to the door thickness direction surface formed at the end portion in the door width direction of the door inner panel. Therefore, even if the door as a whole is, for example, placed in a high temperature environment, relative angular displacement between the door width direction surface and the door thickness direction surface (tilting of the two faces), due to thermal expansion force of the door outer panel, may be suppressed by the connecting portion. Furthermore, a shape retaining portion is provided at the connecting portion. Therefore, the relative angular displacement between the door width direction surface and the door thickness direction surface may be even further suppressed.

Furthermore, an aspect according to a third embodiment of the present invention is a vehicle door structure including: a door inner panel, formed at an end portion in the door width direction with a door width direction surface extending in the door width direction and with a door thickness direction surface extending in the door thickness direction; a door outer panel, joined to the door inner panel; a door reinforcement member, extending in the door width direction and located between the door inner panel and the door outer panel, and a portion of the door reinforcement member at both ends in the door width direction thereof being joined respectively to a portion of the door inner panel at both ends in the door width direction; and reinforcement, provided continuously on the door width direction surface and the door thickness direction surface.

According to such an aspect, reinforcement is provided continuous to the door width direction surface and the door thickness direction surface formed at the portion at the end in the door width direction of the door inner panel. Therefore, even if the door as a whole is, for example, placed in a high temperature environment, relative angular displacement between the door width direction surface and the door thickness direction surface (tilting of the two faces) may be suppressed by the reinforcement.

In the vehicle door structure of the above aspect, the reinforcement may be configured as a bead that protrudes out from the door width direction surface and the door thickness direction surface.

According to such an aspect, the reinforcement is configured as a bead that protrudes out from the door width direction surface and the door thickness direction surface. Therefore, strength may be assured by the bead against relative angular displacement between the door width direction surface and the door thickness direction surface (tilting of the two faces).

In the vehicle door structure of the above aspects, the bead may be configured with a bead portion that protrudes from the door thickness direction surface along the door width direction; a connecting portion may be provided at an end portion in the door width direction of the door reinforcement member; and the connection portion may be joined at a protruding end portion of the bead portion.

According to such an aspect, the bead is configured with a bead portion that protrudes from the door thickness direction surface along the door width direction; a connecting portion is provided at an end portion in the door width direction of the door reinforcement member; and the connection portion is joined at a protruding end portion of the bead portion. Therefore, deformation of the bead portion, and therefore of the bead as a whole may be suppressed due to an axial force exhibited by the door reinforcement member. By doing so, relative angular displacement between the door width direction surface and the door thickness direction surface (tilting of the two faces) may be suppressed

EFFECT OF THE INVENTION

According to the present invention, as described above, permanent deformation of a door may be suppressed. By doing so, for example, the build precision of the door to vehicle body may be increased.

BRIEF DESCRIPTION OF THE DRAWINGS

Exemplary embodiments of the present invention will be described in detail based on the following figures, wherein:

FIG. 23 is a perspective view showing an example of a modification of a front bracket provided with the vehicle door structure according to the fourth exemplary embodiment of the present invention;

FIG. 25 is a perspective view showing an example of an extension provided with a modification of the vehicle door structure according to the fourth exemplary embodiment of the present invention;

DETAILED DESCRIPTION OF THE INVENTION

Herebelow, examples of an exemplary embodiment of the present invention will be described in detail with reference to the drawings.

First Embodiment

Explanation will now be given of a first exemplary embodiment of the present invention, with reference to FIG. 1 to FIG. 5.

Figure 1:
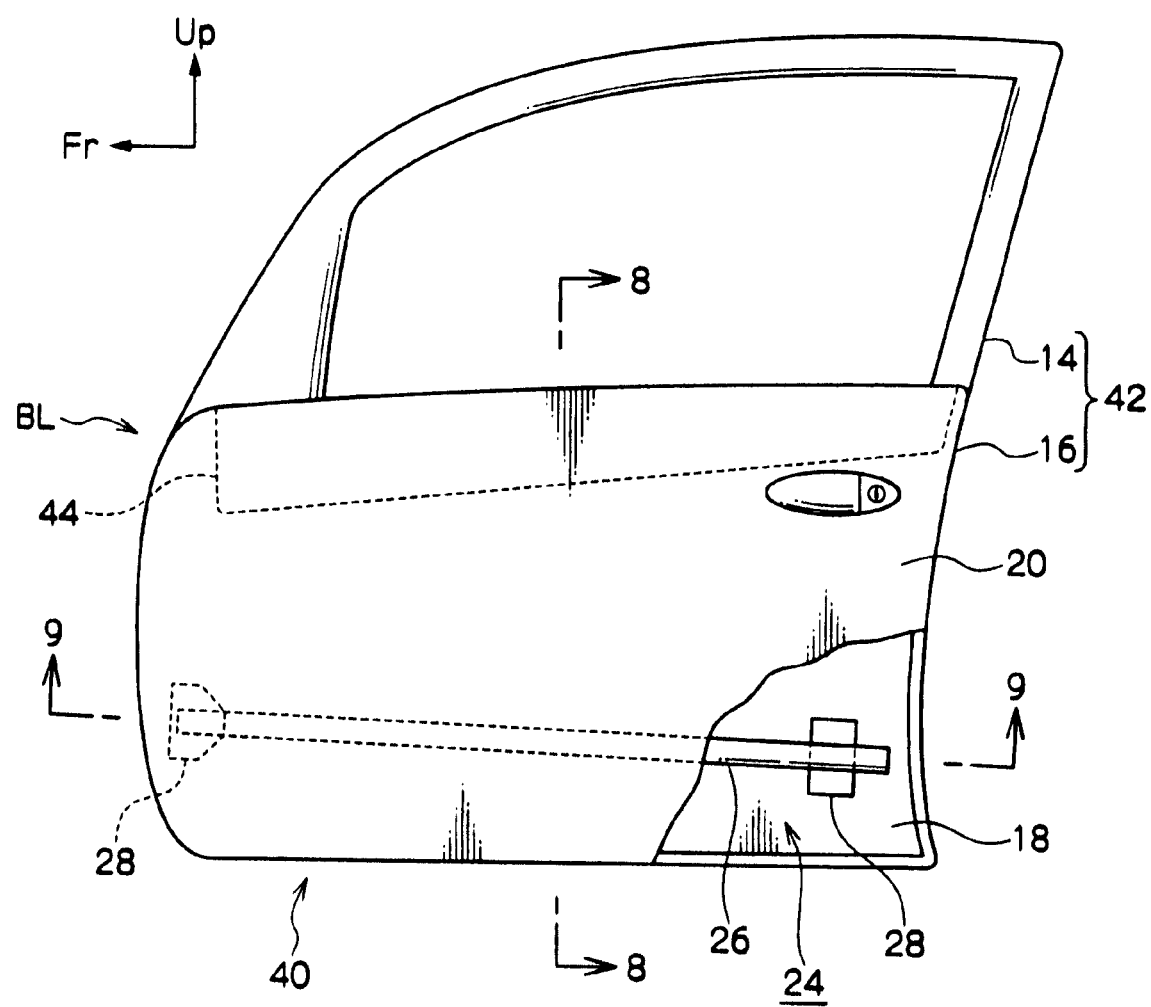
FIG. 1 is a lateral view of a door to which the vehicle door structure according to a first exemplary embodiment of the present invention is applied.
Figure 2:
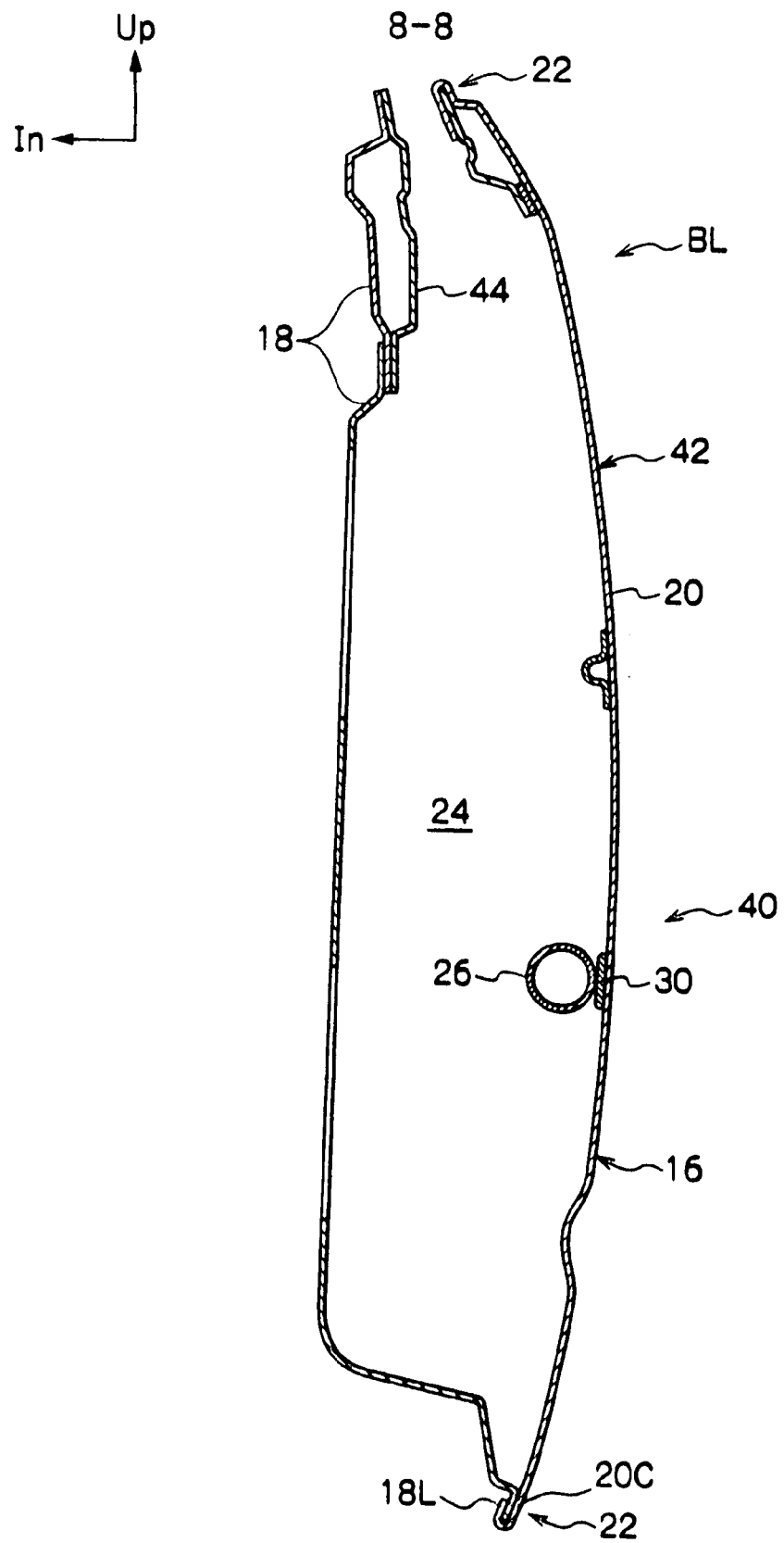
FIG. 2 is a cross-section on 8-8 of FIG. 1.
Figure 3:
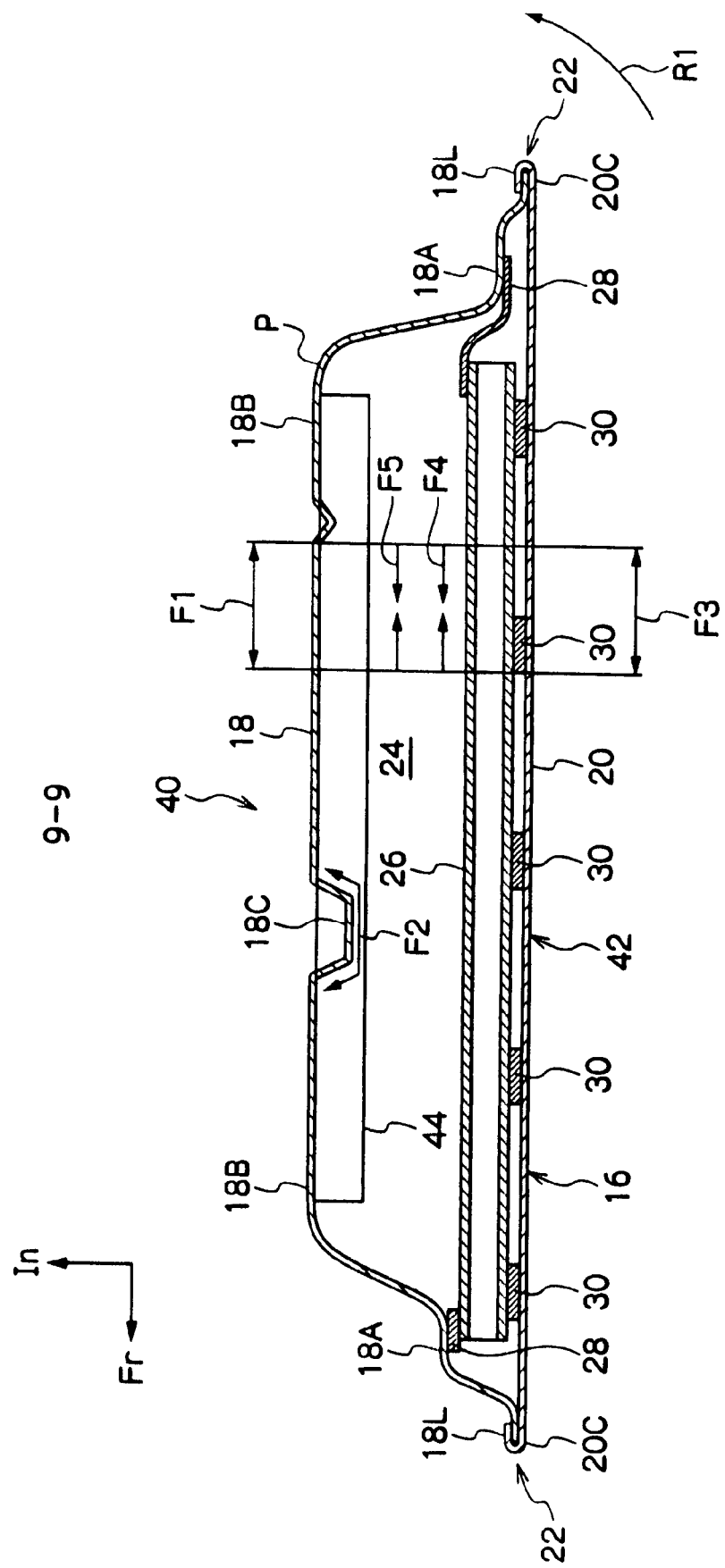
FIG. 3 is a cross-section on 9-9 of FIG. 1.
Figure 4:
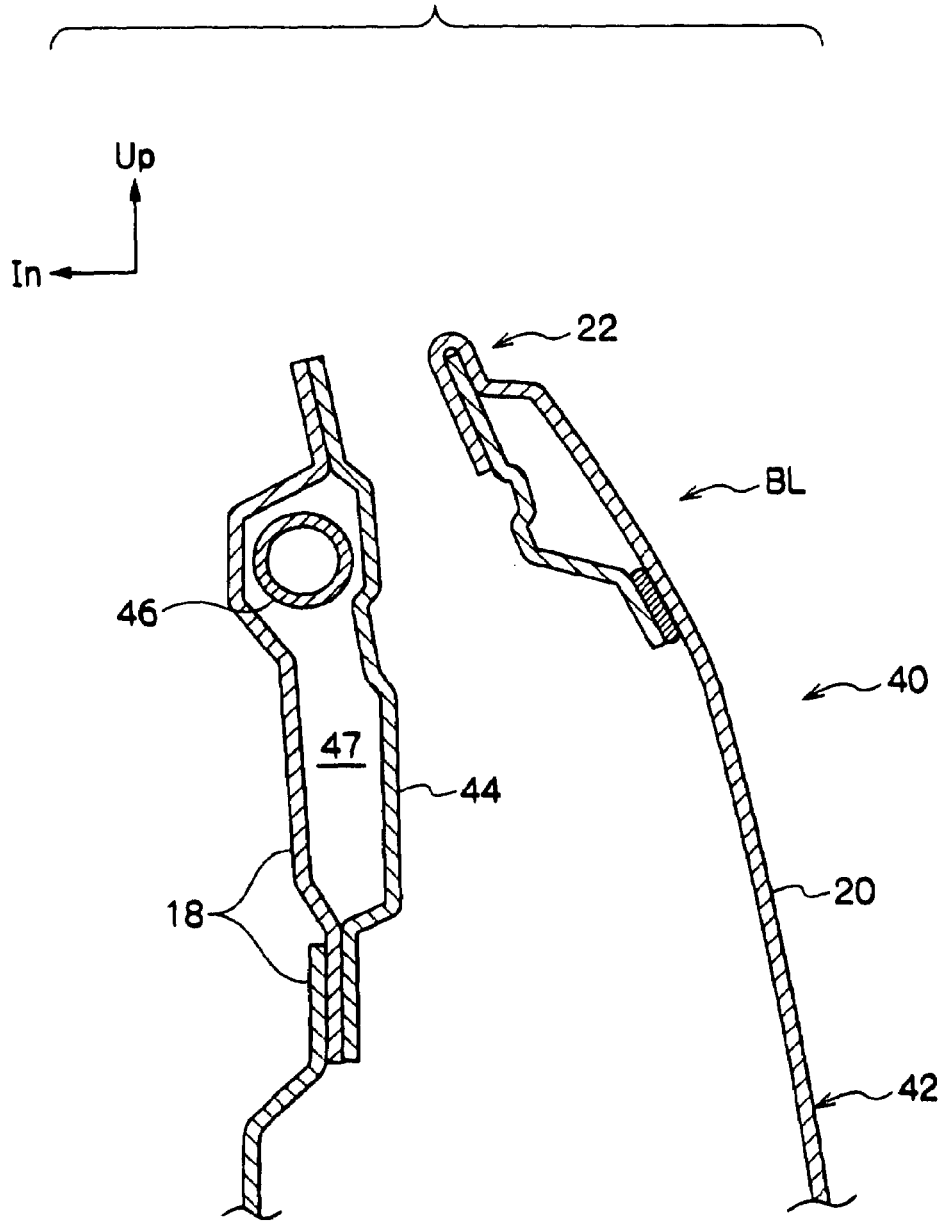
FIG. 4 is a diagram showing a first example of a modification to the vehicle door structure according to the first exemplary embodiment of the present invention is applied.
Figure 5:
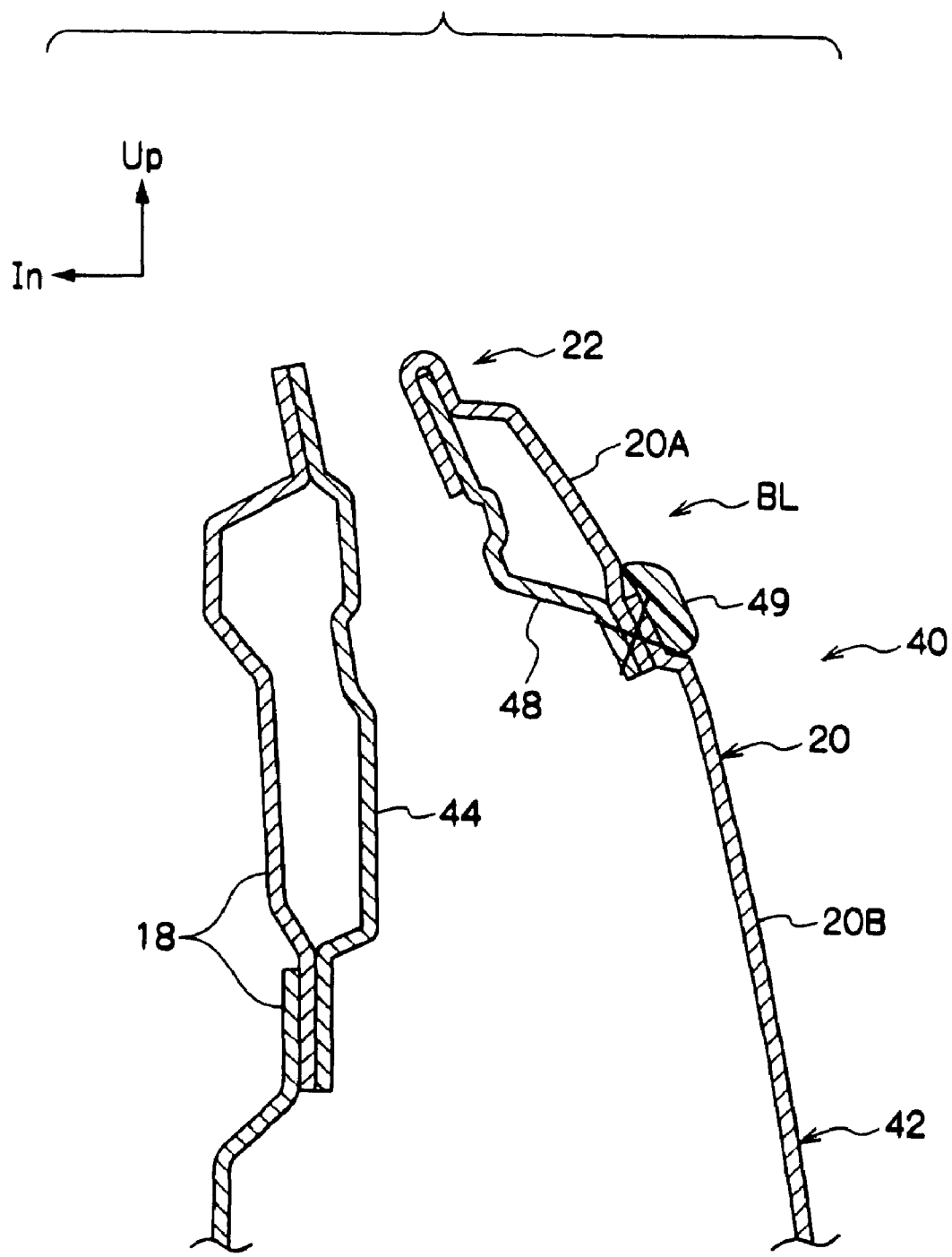
FIG. 5 is a diagram showing a second example of a modification to the vehicle door structure according to the first exemplary embodiment of the present invention is applied.

FIG. 1 to FIG. 3 are figures showing the structure of a door 42 to which the vehicle door structure 40 according to the first exemplary embodiment of the present invention is applied. In FIG. 4 and FIG. 5 are shown, in addition, examples of modifications to the vehicle door structure 40 according to the first exemplary embodiment of the present invention. In these diagrams, the arrow Fr indicates the vehicle front-rear direction front side, the arrow Up indicates the vehicle up-down direction up side, and the arrow In indicates the vehicle width direction inside.

The door 42 to which the vehicle door structure 40 according to the first exemplary embodiment of the present invention is applied is, for example, configured as a front side door of a vehicle such as a passenger car or the like. The door 42 is provided with a door frame 14 at the door top half, and with a door panel body 16 at the door bottom half.

The door panel body 16 is provided with a door inner panel 18 disposed at the vehicle width direction inside, and a door outer panel 20 disposed at the vehicle width direction outside. In the present exemplary embodiment the door inner panel 18 and the door outer panel 20 are configured in, for example, a light metal such as an aluminum alloy, a magnesium alloy or the like. The door inner panel 18 and the door outer panel 20 have, for example, their respective outer peripheral edges 18L, 20C processed by hemming together and bonded with a non-illustrated structural adhesive (these portions will be referred to as edge joint portions 22 below), as shown in FIG. 2 and FIG. 3.

Furthermore, the door panel body 16, configured by the bonded door inner panel 18 and the door outer panel 20, has an internal space 24 between the door inner panel 18 and the door outer panel 20, and an impact beam 26 (door reinforcement member) is disposed within the internal space 24 on the door outer panel 20 side, positioned at a lower portion of the door panel body 16.

The impact beam 26 is disposed so as to extend along the vehicle front-rear direction within the internal space 24. The impact beam 26, as shown in FIG. 3, is joined, through extensions 28, by portions at both ends thereof in the vehicle front-rear direction, to respective door outside joining portions 18A formed at both ends of the door inner panel 18 in the vehicle front-rear direction and on the door outer panel 20 side of the door inner panel 18. Furthermore, the impact beam 26 is bonded to the door outer panel 20 with adhesive 30 at five locations in the longitudinal direction, as shown in FIG. 2 and FIG. 3.

The belt line inner reinforcement 44 is disposed at the belt line portion (BL) of the door 42, as shown in FIG. 1 and FIG. 2. Also, the belt line inner reinforcement 44 is disposed in a position at the door inner panel 18 side in the internal space 24 formed between the door inner panel 18 and the door outer panel 20, as shown in FIG. 3.

The belt line inner reinforcement 44 is disposed so as to extend along the vehicle front-rear direction in the internal space 24. Also, the belt line inner reinforcement 44, as shown in FIG. 3, is joined at both the end portions thereof in the vehicle front-rear direction to door inside joining portions 18B provided at both the end portions thereof in the vehicle front-rear direction of the door inner panel 18 and formed toward the door inner panel 18 side.

In the present exemplary embodiment, the impact beam 26 and the belt line inner reinforcement 44 are, for example, configured in steel. The impact beam 26 and the belt line inner reinforcement 44 may be configured from a material that has a smaller linear expansion coefficient that the door outer panel 20, and may be configured of, other than steel, titanium, for example.

Next, explanation will be given of the operation and effect of the first exemplary embodiment of the present invention.

When manufacturing the door 42 configured as above, it is treated, for example, in the following manner during coating. That is, after carrying out electrophoretic coating of the door 42 as a whole, baking and drying of the coating is carried out at about 200° C. in an electrophoretic coating bake oven.

When this is carried out, since the door inner panel 18 is configured of a light metal with a high thermal expansion coefficient, such as an aluminum alloy, magnesium alloy or the like, thermal expansion force is generated in all four directions of the door inner panel 18, and the door inner panel 18 attempts to thermally expand. However, in general, there are plural indented or protruding structural portions 18C formed such as the seating face of fixing components, beading and the bonding face at the door inner panel 18, as shown in FIG. 3. As a result, the thermal expansion force F1 generated in the door inner panel 18 is distributed to the structure portions 18C, as shown by the arrow F2 in FIG. 3 (that is to say, the expansion direction becomes complex).

In contrast, the door outer panel 20 is configured, like the door inner panel 18, of a light metal with a high thermal expansion coefficient, such as an aluminum alloy, magnesium alloy or the like, and in addition is generally formed with a surface portion structured in the most part from a single plate. Therefore, the door outer panel 20, as shown by the arrow F3 in FIG. 3, attempts to thermally expand to a greater extent than the door inner panel 18, due to the thermal expansion force in all four directions of the door outer panel 20.

However, in the vehicle door structure 40 according to the present exemplary embodiment, there are the door outside joining portions 18A formed at both ends of the door inner panel 18 in the vehicle front-rear direction and in positions at the door outer panel 20 side. Furthermore, the impact beam 26, which is disposed at the door outer panel 20 side extending along the vehicle front-rear direction, is joined through the extensions 28 to the door outside joining portions 18A.

In addition, as shown in FIG. 3, there are the door inside joining portions 18B formed in positions to the door inner panel 18 side of the door inner panel 18 at both the ends thereof in the vehicle front-rear direction. Furthermore, the belt line inner reinforcement 44, disposed on the door inner panel 18 side and extending in the vehicle front-rear direction, is joined to the door inside joining portions 18B. In this manner the impact beam 26 and the belt line inner reinforcement 44 are joined to the door inner panel 18. The belt line inner reinforcement 44 is, in addition, configured, like the impact beam 26, of a material that has a smaller thermal expansion coefficient than that of the door outer panel 20.

Therefore, in the door panel body 16, the door inner panel 18 side and the door outer panel 20 side are restrained by, respectively, the impact beam 26 and the belt line inner reinforcement 44. So, as described above, even if the whole of the door 42 is placed, for example, in a high temperature environment, such as an electrophoretic coating bake oven or the like, differences in the thermal expansion conditions between the door inner panel 18 and the door outer panel 20 may be suppressed (the expansion suppression directions of the impact beam 26 and the belt line inner reinforcement 44 are shown in FIG. 3 by the arrows F4 and F5). In this way, generation of permanent deformation of the door outer panel 20 side, due to the thermal distortion due to the difference in the thermal expansion conditions between the door inner panel 18 side and the door outer panel 20 side, may be suppressed, and the initial state of the door outer panel 20 may be maintained. As a result, for example, the build precision of the door 42 to the vehicle body may be increased.

Additionally, the inside and the outside of the door inner panel 18 in the vehicle width direction are respectively restrained by the impact beam 26 and the belt line inner reinforcement 44. Therefore, rotational displacement of the door inner panel 18 due to thermal expansion force of the door outer panel 20 (shown in FIG. 3 as a bending deformation in the direction of arrow R1, about a fulcrum of a door inner panel 18 thickness direction deformation point P) may be suppressed.

Also, the impact beam 26 is bonded (joined) to the door outer panel 20 by the adhesive 30. Therefore, the door outer panel 20 may be directly restrained at the impact beam 26, and even if the vehicle door structure 40 as a whole is, for example, placed in a high temperature environment such as a electrophoretic coating bake oven, the generation of a difference in the thermal expansion conditions of the door inner panel 18 side and the door outer panel 20 side may be suppressed.

Also, the reduced weight door outer panel 20, being configured from a light metal such as aluminum alloy, magnesium alloy or the like, and having an increased natural vibration frequency, is bonded to the steel, high mass, impact beam 26. Therefore, when the door 42 is closed, high frequency vibrations of the door outer panel 20 are attenuated by the mass of the impact beam 26, and generation of high frequency sound from the door outer panel 20 may be suppressed. By doing so the sound of the door 42 shutting may be reduced, and a high quality feeling may be imparted.

Furthermore, in the same way as with the door outer panel 20, the door inner panel 18, being configured from a light metal such as aluminum alloy, magnesium alloy or the like, and having a high natural vibration frequency, is bonded to the steel, high mass, belt line inner reinforcement 44. Therefore, when the door 42 is closed, the high frequency vibrations of the door inner panel 18 are attenuated by the mass of the belt line inner reinforcement 44, and the generation of high frequency sound from the door inner panel 18 may be suppressed. In this way too, the sound of the door 42 shutting may be reduced, and a high quality feeling may be imparted.

Furthermore, according to the present exemplary embodiment, as described above, the thermal expansion of the door outer panel 20 in electrophoretic coating may be restrained by the impact beam 26 when baking, and internal stress may be generated in the door outer panel 20. Thereby, the load bearing of the door outer panel 20 may be increased, and the load bearing of the door 42 as a whole, and the dent resistance of the door outer panel 20 may be increased.

Furthermore, in the same way as in the door outer panel 20, in electrophoretic coating, the thermal expansion of the door inner panel 18 may be restrained by the belt line inner reinforcement 44 when baking, and internal stress may be generated in the door inner panel 18. Thereby, the load bearing of the door inner panel 18 may be increased, and the load bearing of the door 42 as a whole during a side impact and the load bearing of mounting portions for fixing non illustrated fittings thereto, such as window regulators and the like, may be increased. As a result, the opening and closing robustness of the door 42 as a whole may be increased.

Explanation will now be given of an example of a modification of the first exemplary embodiment of the present invention.

In the above exemplary embodiment, only the belt line inner reinforcement 44 was joined to the door inner panel 18 as a reinforcing member, however, as shown in FIG. 4, the belt line inner reinforcement 44 and an impact beam 46 may be joined to the door inner panel 18 as reinforcement members. In order to do this, the impact beam 46 may be disposed within a closed cross-section 47, configured between the belt line inner reinforcement 44 and the door inner panel 18.

By doing so, the restraining force of the belt line portion BL of the door inner panel 18 may be increased. As a result, the restraining force on the door outer panel 20 may be increased, thereby, permanent deformation due to thermal distortion of the door outer panel 20 may be suppressed, and so the build precision of the door 42 to the vehicle body may be improved.

Also, as shown in FIG. 5, the door outer panel 20 is divided at the belt line portion BL into a belt line outer panel 20A and a door outer panel body 20B that are bonded together. Of these, the belt line outer panel 20A, disposed at the belt line portion BL, and a belt line outer reinforcement 48 may be configured from a material such as steel that has a linear expansion coefficient that is smaller than that of the door outer panel body 20B, which is configured of aluminum alloy or the like.

By doing so, the thermal expansion of the belt line portion BL that is not able to be restrained by the impact beam 26 of the door outer panel 20 (see FIG. 2), may be restrained by the belt line outer panel 20A and the belt line outer reinforcement 48 that have a smaller linear expansion coefficient. As a result, the build precision of the belt line portion BL may be increased.

In such a case, as shown in FIG. 5, if a decorative molding is provided along the boundary of the belt line outer panel 20A with the door outer panel body 20B, the boundary of the belt line outer panel 20A with the door outer panel body 20B may be covered and concealed, and detriment to the external appearance of the door 42 may be prevented.

Second Exemplary Embodiment

Explanation will now be given of a second exemplary embodiment of the present invention, with reference to FIG. 6 to FIG. 12.

Figure 11:
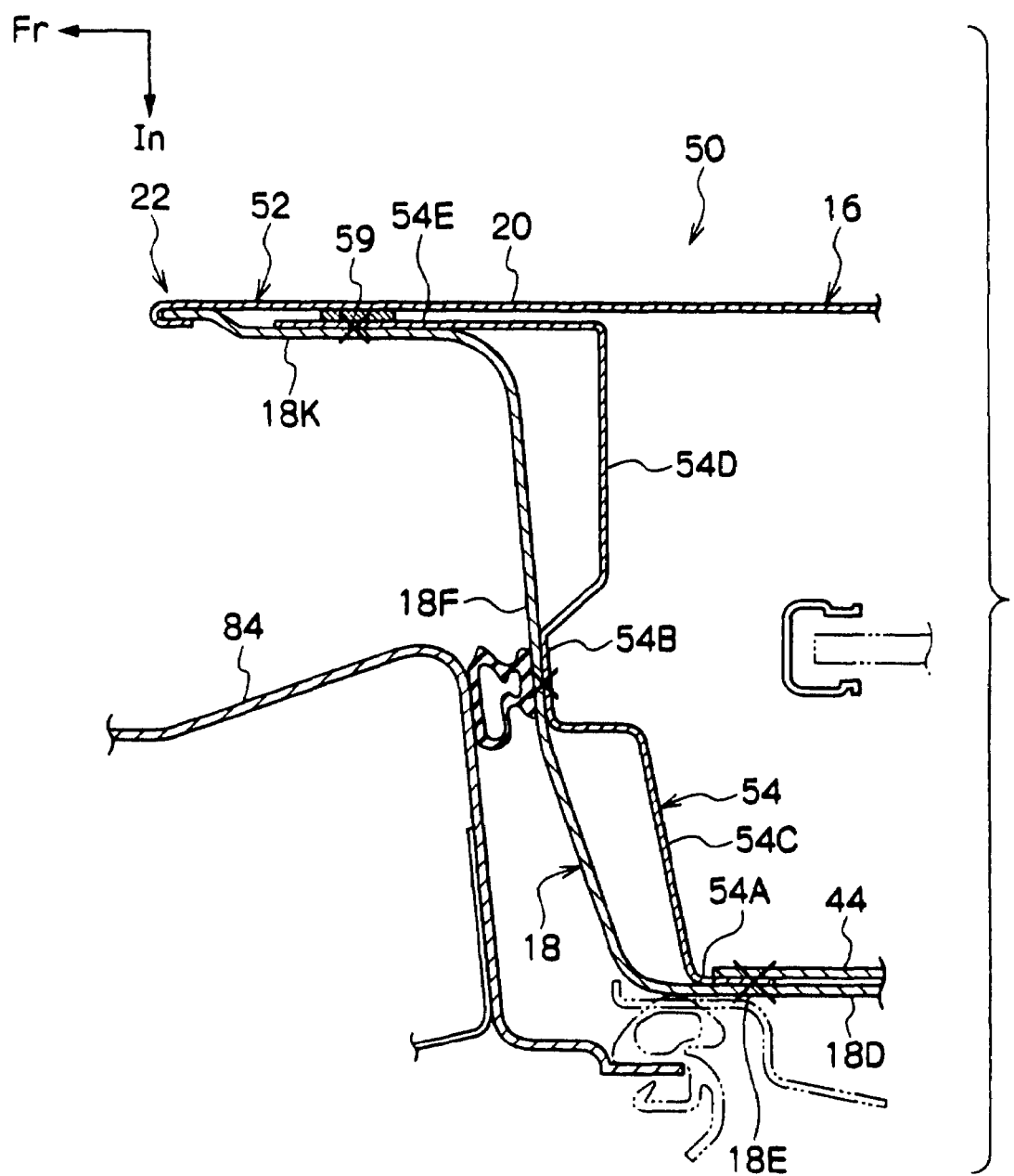
FIG. 11 is a diagram showing a first example of a modification to the vehicle door structure according to the second exemplary embodiment of the present invention.
Figure 12:
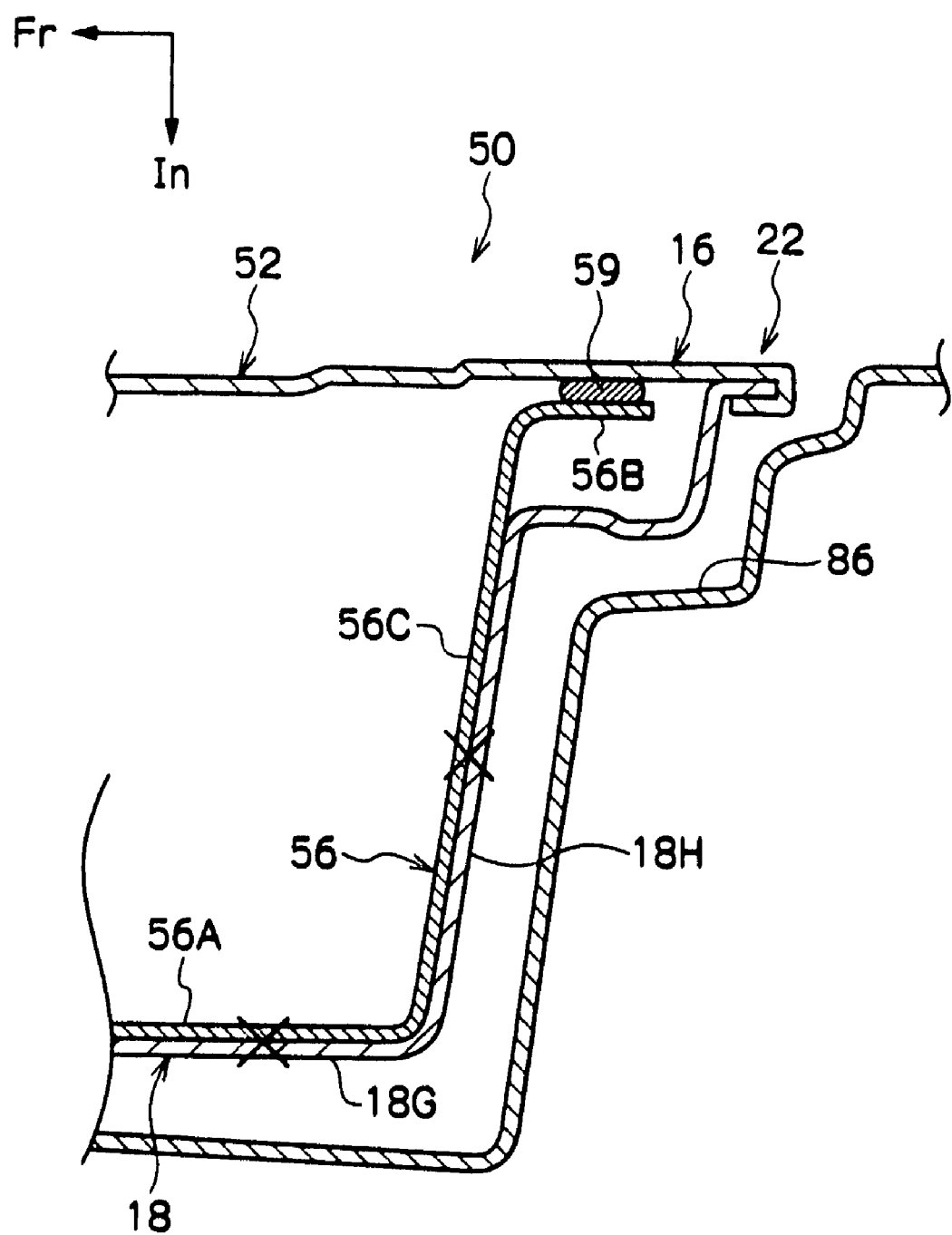
FIG. 12 is a diagram showing a second example of a modification to the vehicle door structure according to the second exemplary embodiment of the present invention.

In FIG. 6 to FIG. 10 is shown a configuration of a door 52 to which a vehicle door structure 50 according to a second exemplary embodiment of the present invention is applied. In addition, FIG. 11 and FIG. 12 show examples of modifications to the vehicle door structure 50 according to the second exemplary embodiment of the present invention. In these figures, the arrow Fr indicates the vehicle front-rear direction front side, the arrow Up indicates the vehicle up-down direction up side, and the arrow In indicates the vehicle width direction inside.

The vehicle door structure 50 according to the second exemplary embodiment of the present invention is a vehicle door structure 40 according to the first exemplary embodiment of the present invention to which has been configured, as connecting portions, a front bracket 54, a lock reinforcement 56, and an extension 58. Therefore, in the second exemplary embodiment of the present invention, the elements thereof that are the same as the above first exemplary embodiment of the present invention will be assigned the same reference numerals, and explanation thereof will be omitted.

Figure 6:
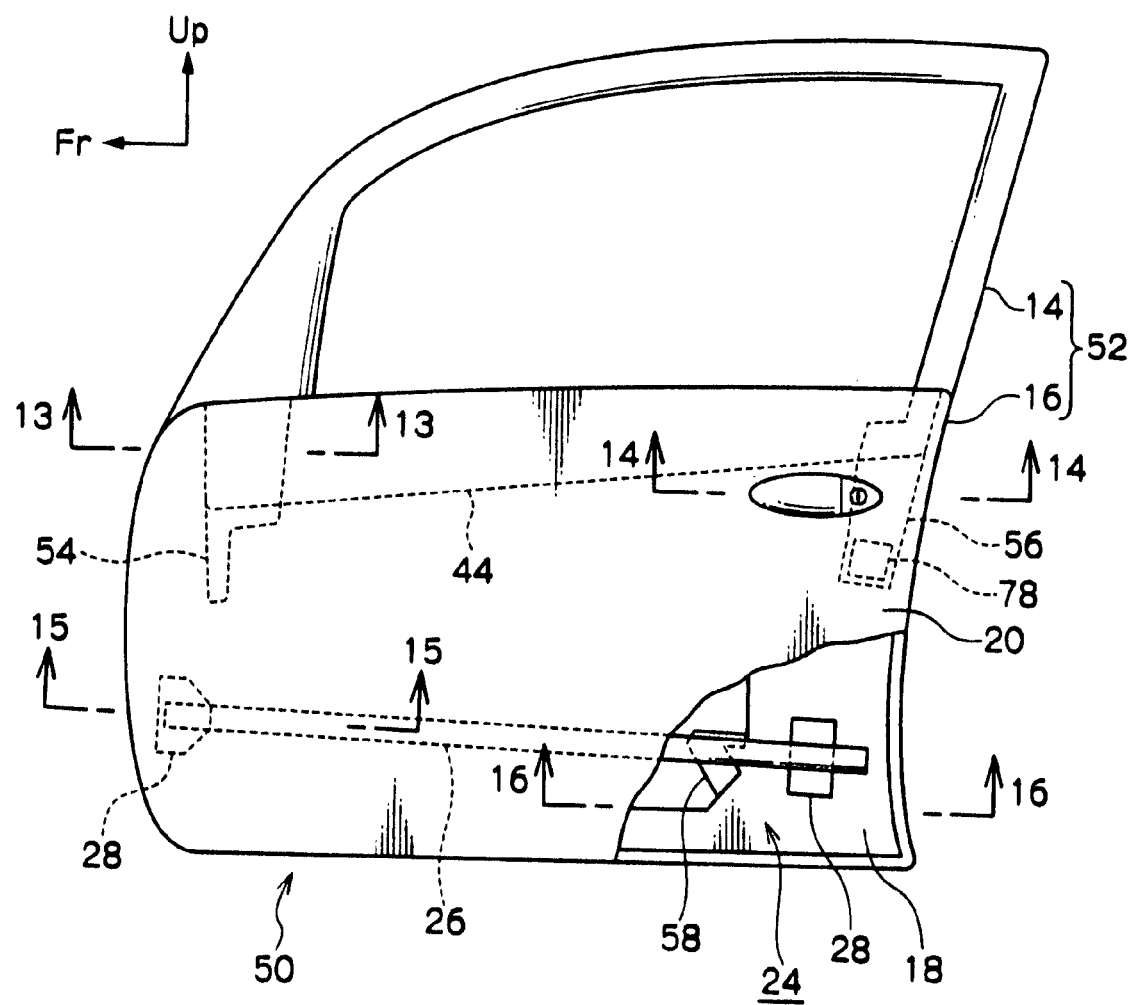
FIG. 6 is a lateral view of a door to which the vehicle door structure according to a second exemplary embodiment of the present invention is applied.

In the vehicle door structure 50 according to the present exemplary embodiment, as shown in FIG. 6, the front bracket 54 is disposed at an upper portion at the front side in the vehicle front-rear direction of the door panel body 16, and the lock reinforcement 56 is disposed at an upper portion at the rear side in the vehicle front-rear direction of the door panel body 16. Furthermore, the extension 58 is disposed at a lower portion of the door panel body 16, between a pair of extensions 28.

In the present exemplary embodiment, the front bracket 54, the lock reinforcement 56 and the extension 58 are, like the impact beam 26, configured from, for example, steel. The front bracket 54, the lock reinforcement 56 and the extension 58 may be configured from a material that has a smaller linear expansion coefficient than that of the above door outer panel 20, and, other than steel, they may be configured from, for example, titanium.

Figure 7:
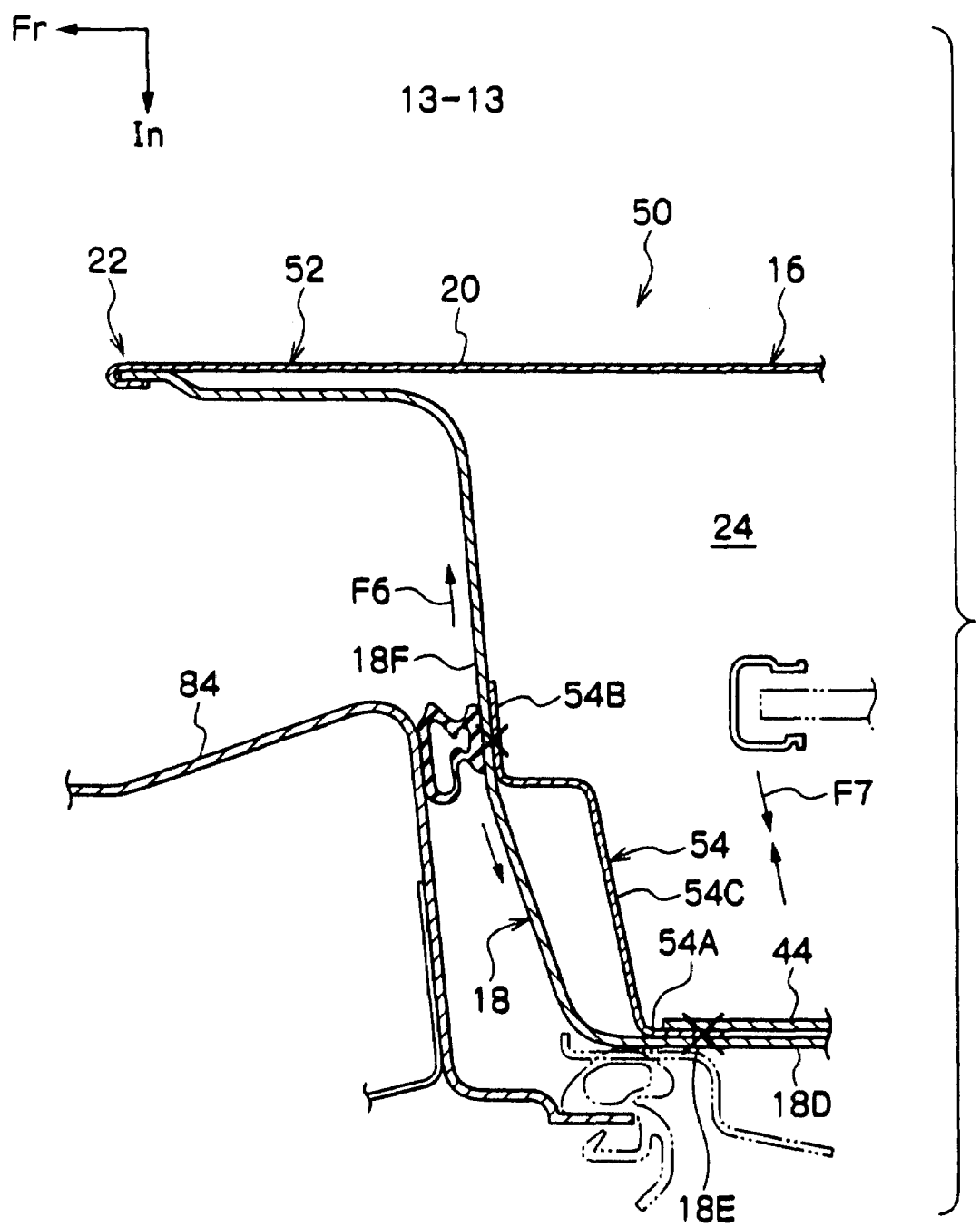
FIG. 7 is a cross-section on 13-13 of FIG. 6.

As shown in FIG. 7, there is a vehicle front-rear direction joining face 18E (door width direction face) that is configured at a portion at the front side in the vehicle front-rear direction of a door inner panel body 18D formed along the vehicle front-rear direction of the door inner panel 18. Furthermore, there is a vehicle width direction joining face 18F (door thickness face) formed continuous to the vehicle front-rear direction joining face 18E, at a front portion thereof in the vehicle front-rear direction, and extending in the vehicle width direction.

Also, as shown in FIG. 7, the front bracket 54 is configured with a vehicle front-rear direction joining face 54A that extends along the vehicle front-rear direction, a vehicle width direction joining face 54B that extends along the vehicle width direction, and a vehicle width direction support face 54C that extends therebetween in the vehicle width direction. The front bracket 54 is provided integrally to the door inner panel 18, by the vehicle front-rear direction joining face 54A and the vehicle width direction joining face 54B being respectively joined to the vehicle front-rear direction joining face 18E and the vehicle width direction joining face 18F (i.e. two joining faces). Also, the front bracket 54 is joined to a portion at the front side in the vehicle front-rear direction of the belt line inner reinforcement 44.

Figure 8:
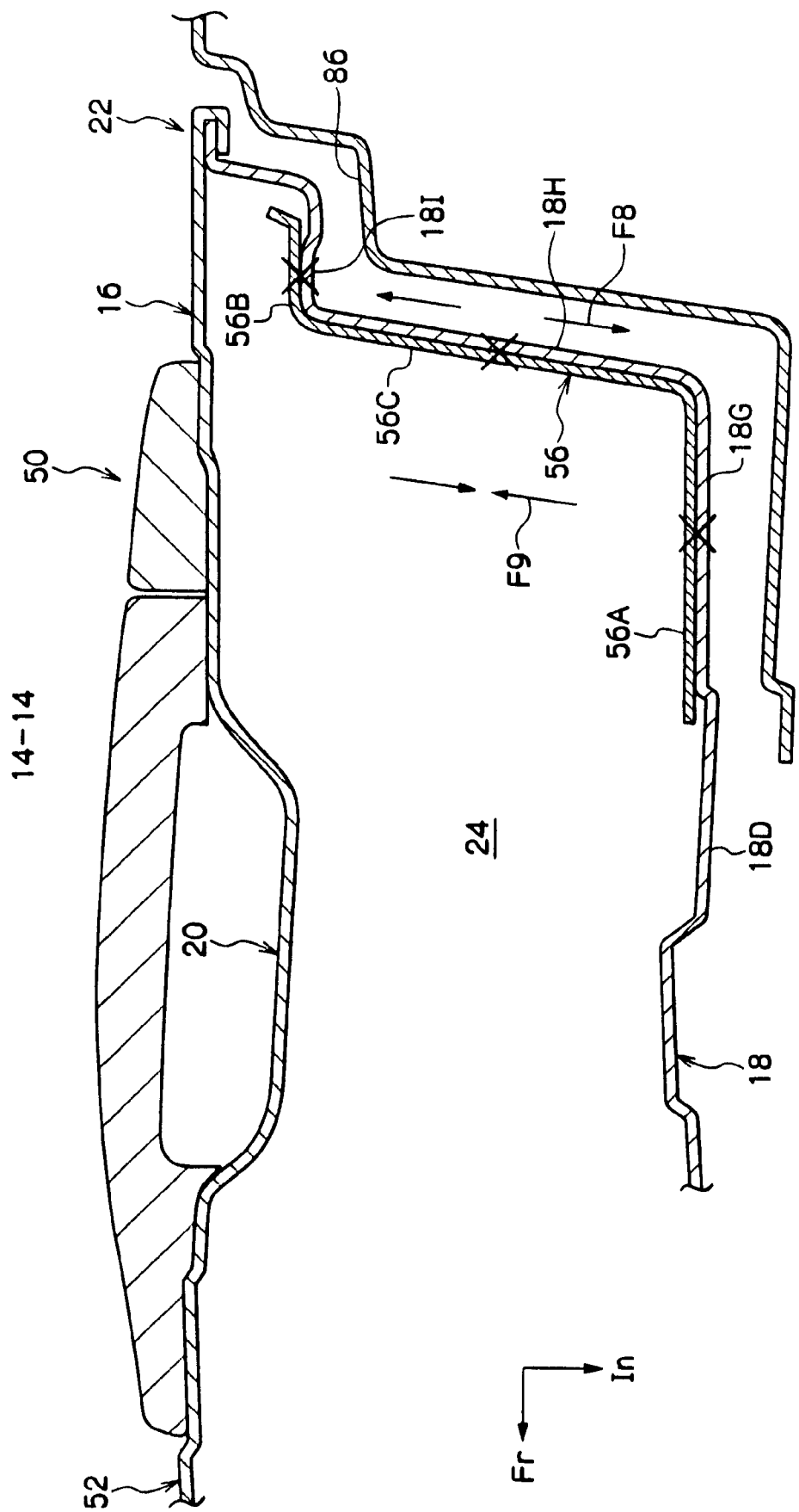
FIG. 8 is a cross-section on 14-14 of FIG. 6.

Furthermore, as shown in FIG. 8, a first vehicle front-rear direction joining face 18G (door width direction face) is configured along the vehicle front-rear direction at a rear side portion in the vehicle front-rear direction of the door inner panel body 18D. Also, a vehicle width direction joining face 18H (door thickness direction face) is formed, at a rear side portion in the vehicle front-rear direction, continuous to the first vehicle front-rear direction joining face 18G and extending along the vehicle width direction. There is, in addition, a second vehicle front-rear direction joining face 18I (door width direction face) formed, at an outside portion in the vehicle width direction, continuous to the vehicle width direction joining face 18H and extending along the vehicle front-rear direction.

Also, as shown in FIG. 8, the lock reinforcement 56 is configured with first and second vehicle front-rear direction joining faces 56A, 56B that extend along the vehicle front-rear direction, and a vehicle width direction joining face 56C that extends therebetween, along the vehicle width direction. The lock reinforcement 56 is provided integrally to the door inner panel 18 by the first and second vehicle front-rear direction joining face 56A, 56B and the vehicle width direction joining face 56C being joined, respectively, to the first and second vehicle front-rear direction joining faces 18G, 18I and the vehicle width direction joining face 18H (i.e. three joining faces). The lock reinforcement 56 is joined, as shown in FIG. 6, to a rear side portion in the vehicle front-rear direction of the belt line inner reinforcement 44.

Figure 9:
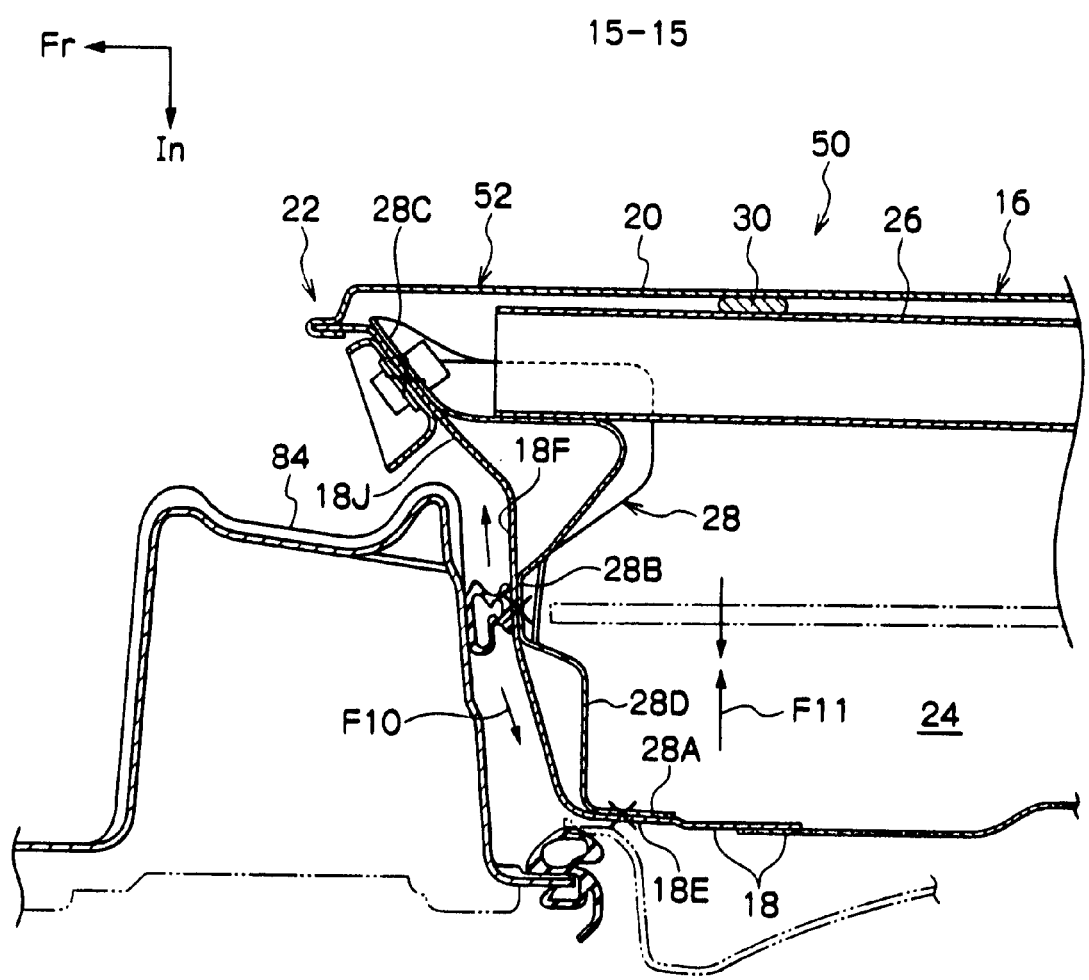
FIG. 9 is a cross-section on 15-15 of FIG. 6.

Furthermore, as shown in FIG. 9, there is a vehicle width direction outside joining face 18J formed continuous to the vehicle width direction joining face 18F of the door inner panel 18, at a lower portion at the front side in the vehicle front-rear direction of the door panel body 16.

Also, as shown in FIG. 9, an extension 28 that is joined at the front side of the impact beam 26 is configured with a vehicle front-rear direction joining face 28A that extends along the vehicle front-rear direction, a vehicle width direction joining face 28B that extends along the vehicle width direction, and a vehicle width direction outside joining face 28C that is positioned to the outside in the vehicle width direction of the vehicle width direction joining face 28B. The extension 28 is integrally provided to the door inner panel 18 by the vehicle front-rear direction joining face 28A, the vehicle width direction joining face 28B and the vehicle width direction outside joining face 28C being joined, respectively, to the vehicle front-rear direction joining face 18E, the vehicle width direction joining face 18F, and the vehicle width direction outside joining face 18J (i.e. three joining faces).

Figure 10:
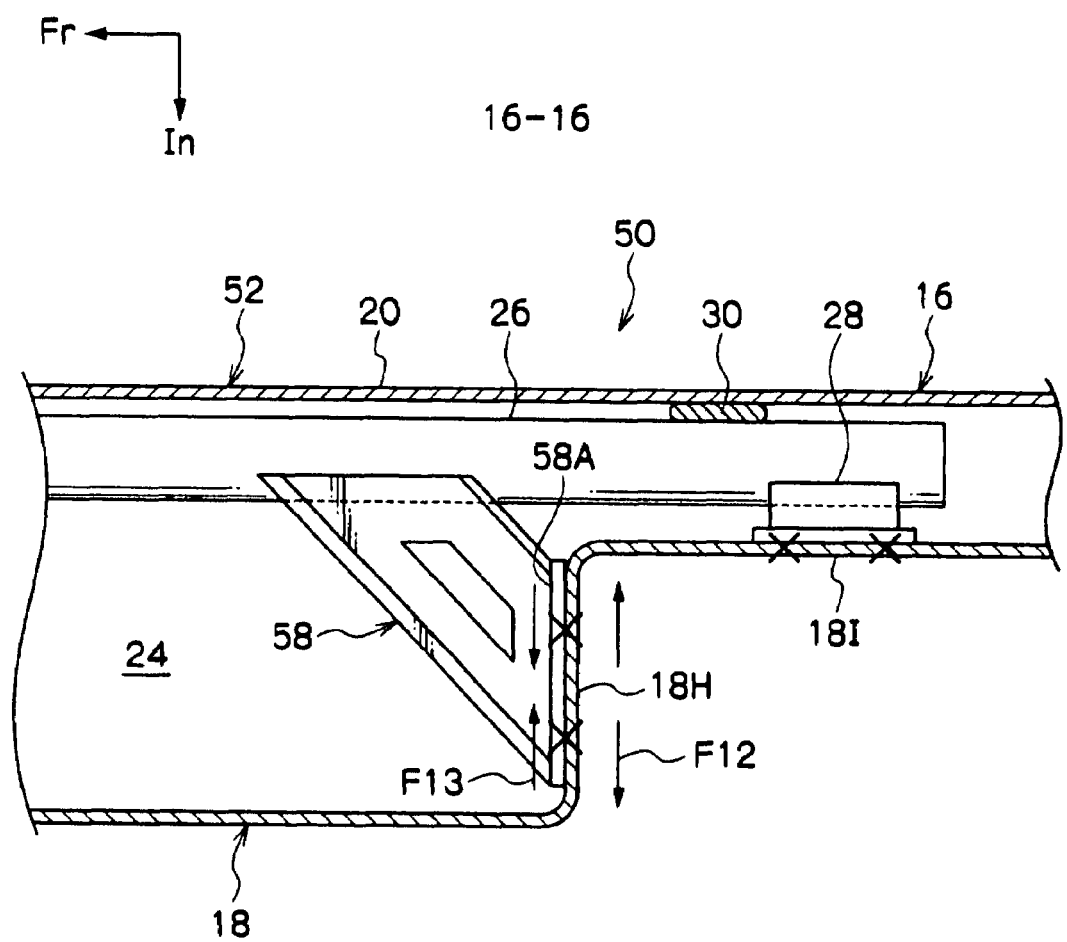
FIG. 10 is a cross-section on 16-16 of FIG. 6.

In the present exemplary embodiment, as shown in FIG. 10, there is also the above vehicle width direction joining face 18H and second vehicle front-rear direction joining face 18I formed at a rear side lower portion in the vehicle front-rear direction of the door panel body 16.

As shown in FIG. 10, the extension 28 that is joined to the rear side in the vehicle front-rear direction of impact beam 26 is also joined to the second vehicle front-rear direction joining face 18I of the door inner panel 18. Furthermore, one end of the extension 58 is joined to an intermediate portion toward the rear in the vehicle front-rear direction of the impact beam 26, and the other end thereof is joined to the vehicle width direction joining face 18H of the door inner panel 18. In this way, the rear side in the vehicle front-rear direction of the impact beam 26 is joined to the vehicle width direction joining face 18H and the second vehicle front-rear direction joining face 18I of the door inner panel 18, through the extension 58 and the extension 28 (i.e. two joining faces).

Next, explanation will be given of the operation and effect of the second exemplary embodiment of the present invention.

The vehicle door structure 50 according to the second exemplary embodiment of the present invention demonstrates, in addition to the operation and effect demonstrated by the vehicle door structure 40 of the first exemplary embodiment of the present invention, the following operation and effect.

By the vehicle door structure 50, as shown in FIG. 7, the vehicle front-rear direction joining face 54A and the vehicle width direction joining face 54B of the front bracket 54 are joined, respectively, to the vehicle front-rear direction joining face 18E and the vehicle width direction joining face 18F of the door inner panel 18 (i.e. two joining faces). Therefore, even when the door 52 as a whole is, for example, placed in a high temperature environment such as a bake oven in electrophoretic coating, the relative angular displacement between the vehicle front-rear direction joining face 18E and the vehicle width direction joining face 18F of the door inner panel 18 (tilting of the two faces), due to the thermal expansion force of the door outer panel 20, may be suppressed by the front bracket 54.

In particular, the front bracket 54 is itself configured from a material with a smaller linear expansion coefficient that that of the door outer panel 20. Therefore, even if the door 52 as a whole is, for example, placed in a high temperature environment such as a bake oven in electrophoretic coating, there is a high suppression effect against the relative angular displacement between two faces of the door inner panel 18 caused by the thermal expansion force of the door outer panel 20.

Furthermore, even when deformation force acts in the vehicle width direction of the vehicle width direction joining face 18F of the door inner panel 18 due to the thermal expansion force door outer panel 20, such as is shown by the arrows F6 in FIG. 7, deformation in the vehicle width direction of the vehicle width direction joining face 18F by this deformation force may be suppressed by the support of the vehicle width direction joining face 54B and the vehicle width direction support face 54C of the front bracket 54 (for example, in this case the expansion suppressing direction is shown by the arrows F7 in FIG. 7). As a result, for example, the build precision of an upper portion at the rear side in the vehicle front-rear direction of the door panel body 16 may be increased.

Furthermore, by the vehicle door structure 50 of the present exemplary embodiment, as shown in FIG. 8, the first and second vehicle front-rear direction joining faces 56A, 56B and the vehicle width direction joining face 56C of the lock reinforcement 56 are joined, respectively, to the first and second vehicle front-rear direction joining faces 18G, 18I and the vehicle width direction joining face 18H of the door inner panel 18 (i.e. three joining faces). Therefore, even if the door 52 as a whole is, for example, placed in a high temperature environment such as a bake oven in electrophoretic coating, relative angular displacement between the first vehicle front-rear direction joining face 18G and the vehicle width direction joining face 18H of the door inner panel 18, due to the thermal expansion force of the door outer panel 20 (tilting of the two faces), or relative angular displacement between the vehicle width direction joining face 18H and the second vehicle front-rear direction joining face 18I (tilting of the two faces), may be suppressed by the lock reinforcement 56.

In particular, the lock reinforcement 56 is itself configured from a material with a smaller linear expansion coefficient that that of the door outer panel 20. Therefore, even if the door 52 as a whole is, for example, placed in a high temperature environment such as a bake oven in electrophoretic coating, there is a high suppression effect against the relative angular displacement between two faces of the door inner panel 18 caused by the thermal expansion of the door outer panel 20.

Also, even when deformation force acts in the vehicle width direction of the vehicle width direction joining face 18H of the door inner panel 18 due to the thermal expansion force of the door outer panel 20, such as is shown by the arrows F8 in FIG. 8, deformation in the vehicle width direction of the vehicle width direction joining face 18H by this deformation force may be suppressed by the support of the vehicle width direction joining face 56C of the lock reinforcement 56 (for example, in this case the expansion suppressing direction is shown by the arrows F9 in FIG. 8). As a result, for example, the build precision of an upper portion at the rear side in the vehicle front-rear direction of the door panel body 16 may be increased.

Furthermore, as shown in FIG. 9, the vehicle front-rear direction joining face 28A, the vehicle width direction joining face 28B and the vehicle width direction outside joining face 28C of the extension 28 are joined, respectively, to the vehicle front-rear direction joining face 18E, the vehicle width direction joining face 18F, and the vehicle width direction outside joining face 18J of the door inner panel 18 (three joining faces). Therefore, even if the door 52 as a whole is, for example, placed in a high temperature environment such as a bake oven in electrophoretic coating, relative angular displacement between the vehicle front-rear direction joining face 18E and the vehicle width direction joining face 18F of the door inner panel 18 (tilting of the two faces), or relative angular displacement between the vehicle width direction joining face 18F and the vehicle width direction outside joining face 18J (tilting of the two faces), may be suppressed by the extension 28.

In particular, the extension 28 is itself configured from a material with a smaller linear expansion coefficient that that of the door outer panel 20. Therefore, even if the door 52 as a whole is, for example, placed in a high temperature environment such as a bake oven in electrophoretic coating, there is a high suppression effect against the relative angular displacement between two faces of the door inner panel 18 caused by the thermal expansion of the door outer panel 20.

Also, even if a deformation force acts in the vehicle width direction, such as is shown by the arrows F10 in FIG. 9, on the vehicle width direction joining face 18F of the door inner panel 18 due to the thermal expansion force of the door outer panel 20, deformation of the vehicle width direction joining face 18F in the vehicle width direction by this deformation force may be suppressed by the support at the vehicle width direction joining face 28B and a vehicle width direction support face 28D (for example, in this case the expansion suppression direction is shown by the arrows F11 in FIG. 9). As a result, for example, the build precision of a lower portion at the front side in the vehicle front-rear direction of the door panel body 16 may be increased.

Also, as shown in FIG. 10, the extensions 56, 28 are joined, respectively, to the vehicle width direction joining face 18H and second vehicle front-rear direction joining face 18I of the door inner panel 18 (two joining faces). Therefore, even if the door 52 as a whole is, for example, placed in a high temperature environment such as a bake oven in electrophoretic coating, relative angular displacement (tilting of the two faces) between the vehicle width direction joining face 18H and the second vehicle front-rear direction joining face 18I of the door inner panel 18 due to the thermal expansion force of the door outer panel 20 may be suppressed by the extensions 56, 28.

In particular, the extensions 58, 28 are themselves configured from a material with a smaller linear expansion coefficient that that of the door outer panel 20. Therefore, even if the door 52 as a whole is, for example, placed in a high temperature environment such as a bake oven in electrophoretic coating, there is a high suppression effect against the relative angular displacement between two faces of the door inner panel 18 caused by the thermal expansion of the door outer panel 20.

Furthermore, even if a deformation force acts in the vehicle width direction, such as is shown by the arrows F12 in FIG. 10, on the vehicle width direction joining face 18H of the door inner panel 18 due to the thermal expansion force of the door outer panel 20, deformation of the vehicle width direction joining face 18H in the vehicle width direction by this deformation force may be suppressed by the support at a vehicle width direction joining face 58A of the extension 58 (for example, in this case the expansion suppression direction is shown by the arrows F13 in FIG. 10). As a result, for example, the build precision of a lower portion at the rear side in the vehicle front-rear direction of the door panel body 16 may be increased.

Note that, in the present exemplary embodiment, when the door inner panel 18 is configured of a light alloy such as aluminum alloy, or the like, in general there is a high degree of buckling when press forming, and it is difficult to maintain intended shapes. However, in the vehicle door structure 50 according to the present exemplary embodiment, the front bracket 54, the lock reinforcement 56, and the extensions 28, 56 are joined to each of the joining faces at the two end portions in the vehicle front-rear direction of the door inner panel 18. Therefore, variations when press forming the door inner panel 18 may be compensated for, to a certain extent, and the manufacturability of the door 52 may be raised.

Also, according to the vehicle door structure 50 of the present exemplary embodiment, two or more faces in the vehicle front-rear direction and vehicle width direction are set as the fitting faces of the belt line inner reinforcement 44 and impact beam 26 to the door inner panel 18, the belt line inner reinforcement 44 and impact beam 26 take most of the load when there is a side impact or a front impact. In doing so, the load that accompanies a side impact or a front impact may be distributed, and localized deformation may be suppressed of the light metal door inner panel 18 that is of a material with a smaller extension ratio than steel. As a result, deformation during a side impact or a front impact may be suppressed.

Explanation will now be given of a modification of the present exemplary embodiment.

In the above exemplary embodiment, the front bracket 54 may be configured as follows. As shown in FIG. 11, a vehicle width direction support face 54D may also be continuously formed, extending to the outside in the vehicle width direction, to the vehicle width direction joining face 54B of the front bracket 54, and also a vehicle front-rear direction joining face 54E may be formed to this front bracket 54, with this vehicle front-rear direction joining face 54E being joined to a vehicle front-rear direction joining face 18K of the door inner panel 18 and bonded to the door outer panel 20 by an adhesive 59.

In the same way, the lock reinforcement 56 of the above exemplary embodiment may be configured as follows. As shown in FIG. 12, the vehicle width direction joining face 56C of the lock reinforcement 56 may be extended to the outside in the vehicle width direction, and the second vehicle front-rear direction joining face 56B may be bonded to the door outer panel 20 by the adhesive 59.

In this manner, by bonding the front bracket 54 and the lock reinforcement 56 to the door outer panel 20, the door outer panel 20 may be directly restrained by, in addition to the door inner panel 18, the belt line inner reinforcement 44 and the front bracket 54 at the lock reinforcement 56. By doing so, even if the door 52 as a whole is, for example, placed in a high temperature environment such as a bake oven in electrophoretic coating, better suppression may be made of a difference in thermal expansion conditions between the door inner panel 18 side and the door outer panel 20 side. As a result, the build precision of the door 52 to the vehicle body may be increased.

In the above exemplary embodiment portions at both ends in the vehicle front-rear direction of the impact beam 26 are joined to each of the joining faces of the door inner panel 18 through the extensions 28. However, the portions at both ends in the vehicle front-rear direction of the impact beam 26 may be configured with connecting portions, and joined directly to each of the joining faces of the door inner panel 18.

In the same way, in the above exemplary embodiment, portions at both the ends in the vehicle front-rear direction of the belt line inner reinforcement 44 are joined to each of the joining faces of the door inner panel 18 through, respectively, the front bracket 54 and the lock reinforcement 56. However, the portions at both ends in the vehicle front-rear direction of the belt line inner reinforcement 44 may be configured with joining portions and joined directly to each of the joining faces of the door inner panel 18.

Third Exemplary Embodiment

Next, explanation will be given of the third exemplary embodiment of the present invention, with reference to FIG. 13 to FIG. 16.

Figure 13:
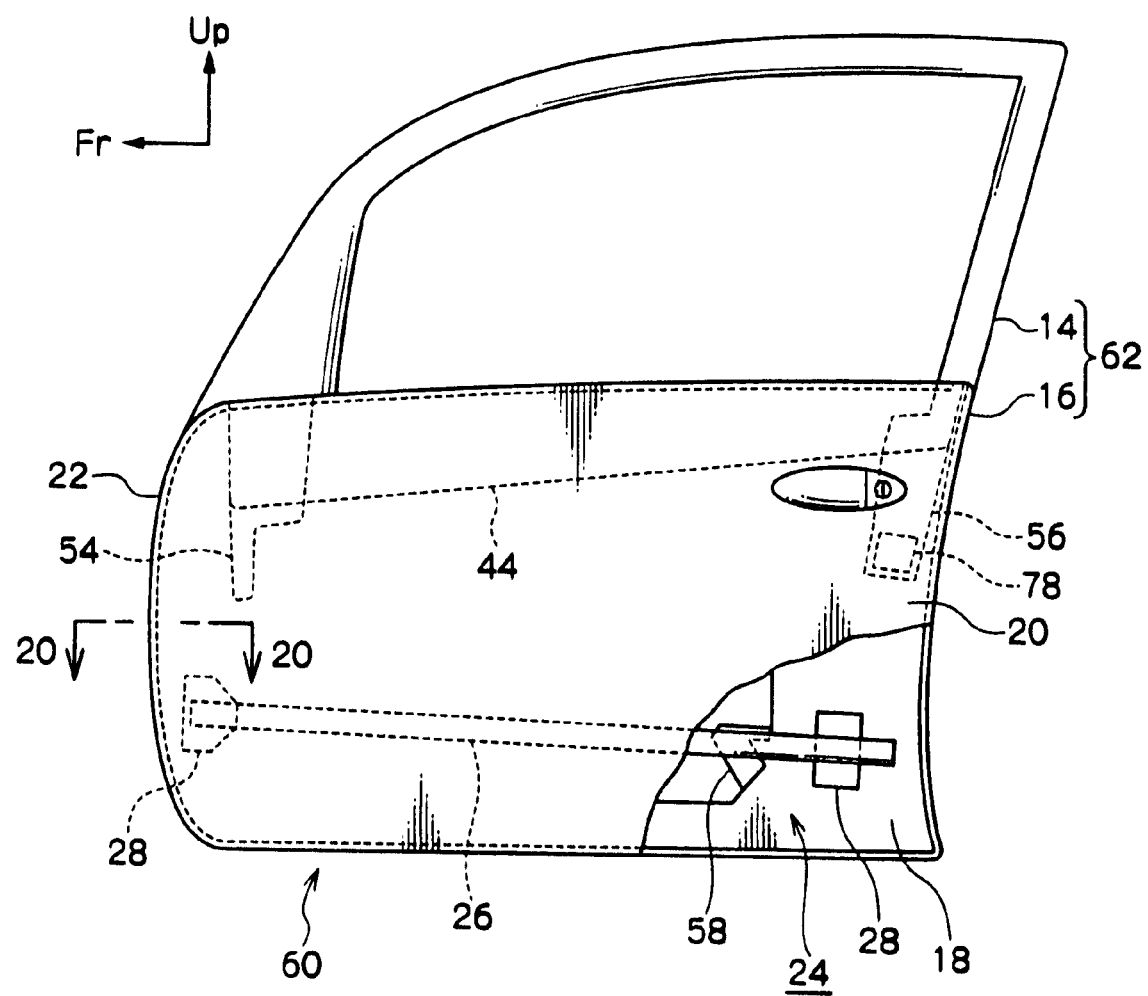
FIG. 13 is a lateral view of a door to which the vehicle door structure according to a third exemplary embodiment of the present invention is applied.
Figure 14:
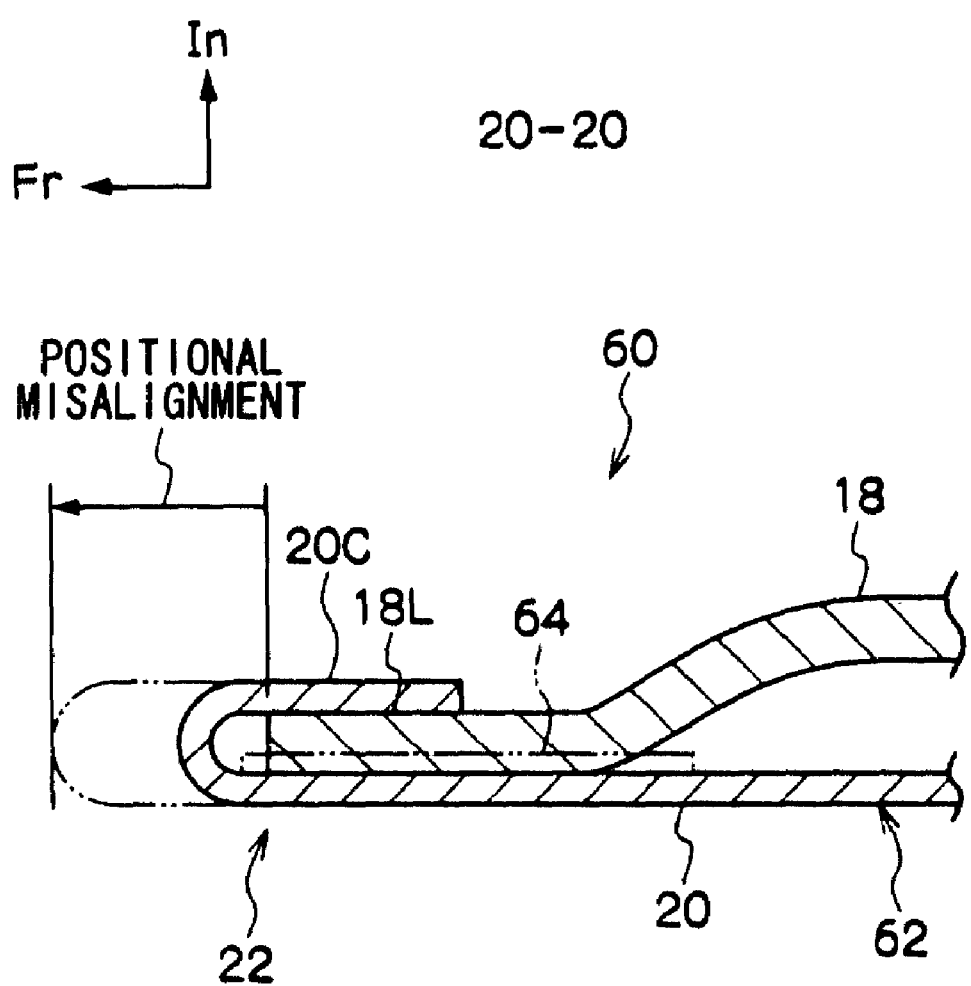
FIG. 14 is a cross-section on 20-20 of FIG. 13.
Figure 15:
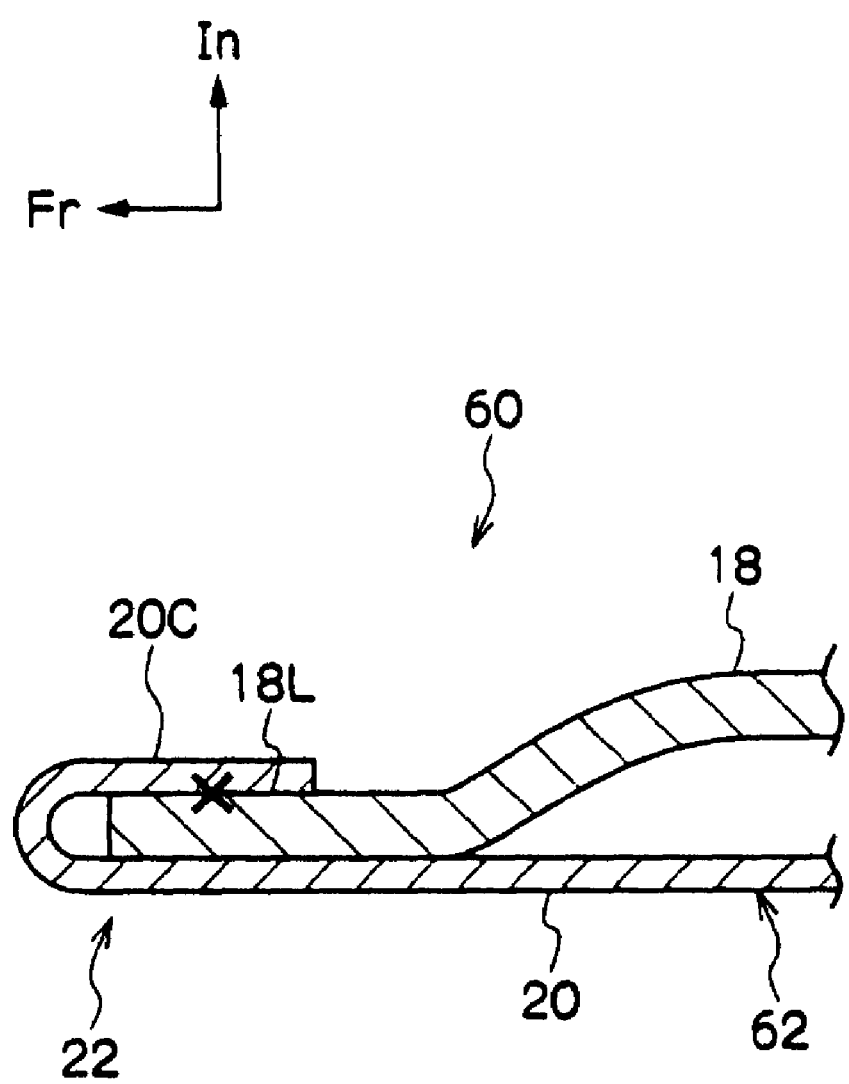
FIG. 15 is a diagram showing a first example of a modification to the vehicle door structure according to the third exemplary embodiment of the present invention.
Figure 16:
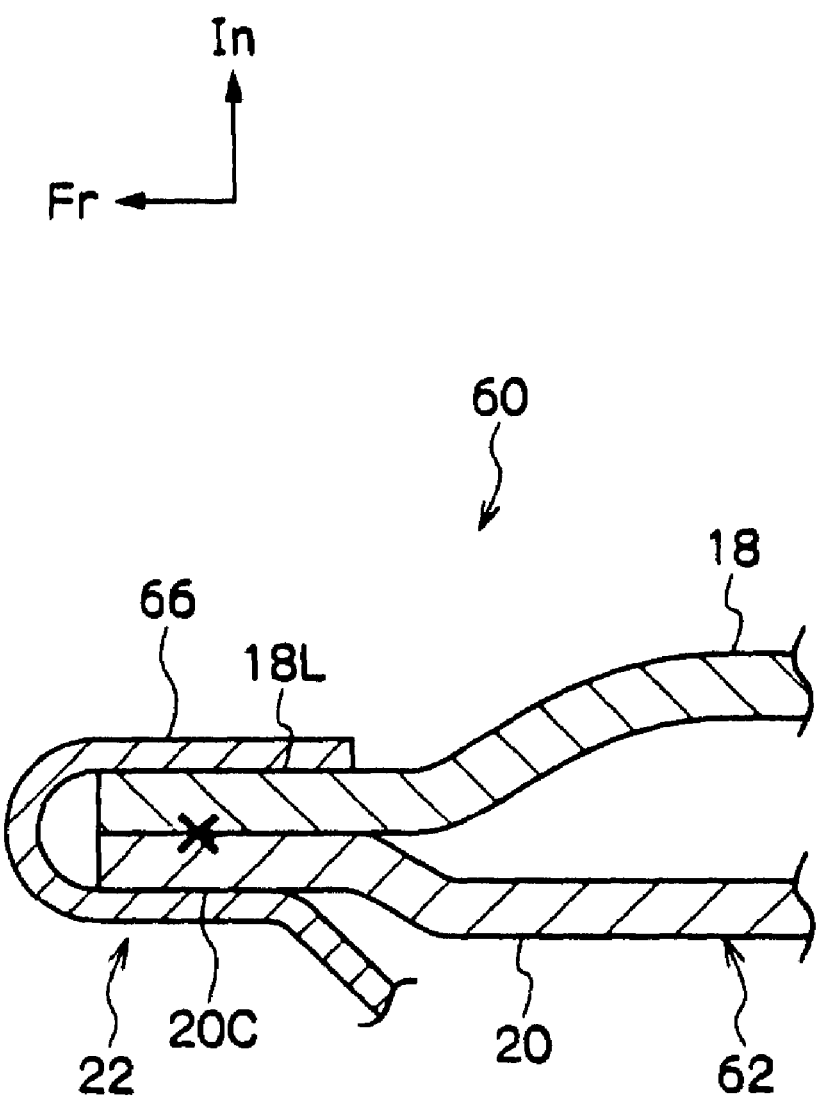
FIG. 16 is a diagram showing a second example of a modification to the vehicle door structure according to the third exemplary embodiment of the present invention.

FIG. 13 and FIG. 14 show a door 62 to which a vehicle door structure 60 according to the third exemplary embodiment of the present invention is applied. FIG. 15 and FIG. 16 show examples of modifications to the vehicle door structure 60 according to the third exemplary embodiment of the present invention. In these figures, the arrow Fr indicates the vehicle front-rear direction front side, the arrow Up indicates the vehicle up-down direction up side, and the arrow In indicates the vehicle width direction inside.

In the vehicle door structure 60 according to the present exemplary embodiment, is the vehicle door structure 50 according to the second exemplary embodiment of the present invention described above, to which a normal temperature curing adhesive 64 is applied at the join of the edge joint portions 22 of the door inner panel 18 and the door outer panel 20, as shown in FIG. 14. Therefore, in the third exemplary embodiment of the present invention, elements that are similar to those of the first exemplary embodiment and second exemplary embodiment will be allocated the same reference numerals and explanation thereof will be omitted.

Next explanation will be given of the operation and effect of the third exemplary embodiment of the present invention.

The vehicle door structure 60 according to the present exemplary embodiment displays, in addition to the operation and effect displayed by the vehicle door structures 40, 50 of the first exemplary embodiment and second exemplary embodiment described above, the following operation and effect.

Mutual outer peripheral edge portions 18L, 20C of the door inner panel 18 and door outer panel 20 are joined with the normal temperature curing adhesive 64. Therefore, in the assembly process of the door 62, the edge joint portions 22 of the door inner panel 18 and door outer panel 20, which are restrained by the steel impact beam 26 and belt line inner reinforcement 44, may be joined and restrained under normal temperature conditions. By doing so, even if the door 62 as a whole is, for example, placed in a high temperature environment such as a bake oven in electrophoretic coating, misalignment between the position of the outer peripheral edge portion 18L of the door inner panel 18 and the outer peripheral edge portion 20C of the door outer panel 20 due to the thermal expansion force of the door outer panel 20, like that shown in FIG. 14, may be suppressed. As a result the build precision of the door 62 to the vehicle body may be increased.

Furthermore, for example, before the door 62 is oven baked in electrophoretic coating, the outer peripheral edge portion 20C of the door outer panel 20 may be restrained, and therefore the generation of misalignment in the positioning of the outer peripheral edge portion 20C of the door outer panel 20 may be suppressed.

Furthermore, since the door outer panel 20 as a whole including the outer peripheral edge portion 20C may be restrained with certainty, the internal stress of the door outer panel 20 may be increased when the door 62 is, for example, electrophoretic coated.

Next, explanation will be given of a modification to the third exemplary embodiment of the present invention.

The edge joint portions 22 of the door inner panel 18 and door outer panel 20 in the above exemplary embodiment may be configured as follows. Fine particles, such as glass fragments, glass beads, ceramic particles, metal particles and the like, may be used in the adhesive 64 for joining the mutual outer peripheral edge portions 18L, 20C of the door inner panel 18 and the door outer panel 20. By doing so, the frictional resistance between the outer peripheral edge portions 18L, 20C may be increased, and positional misalignment between the outer peripheral edge portion 18L of the door inner panel 18 and the outer peripheral edge portion 20C of the door outer panel 20, due to the thermal expansion force of the door outer panel 20, may be even further suppressed (see FIG. 14).

Also, the mutual outer peripheral edge portions 18L, 20C of the door inner panel 18 and door outer panel 20 are not limited to being joined by the adhesive 64, and, as shown in FIG. 15, they may be joined by welding. By doing so, since the outer peripheral edge portion 20C may be fixed and retained with certainty, the positional misalignment between the outer peripheral edge portion 18L of the door inner panel 18 and the outer peripheral edge portion 20C of the door outer panel 20, due to the thermal expansion force of the door outer panel 20, may be suppressed with certainty.

When the outer peripheral edge portion 18L of the door inner panel 18 and the outer peripheral edge portion 20C of the door outer panel 20 are bonded by welding without hemming, then a decorative molding 66 may be provided so as to cover the edge joint portions 22, as shown in FIG. 16. By doing so, the welded edge joint portions 22 may be covered and concealed, and any detriment to the external appearance of the door 42 may be prevented.

Fourth Exemplary Embodiment

Explanation will now be given of a fourth exemplary embodiment of the present invention, with reference to FIG. 17 to FIG. 25.

Figure 24:
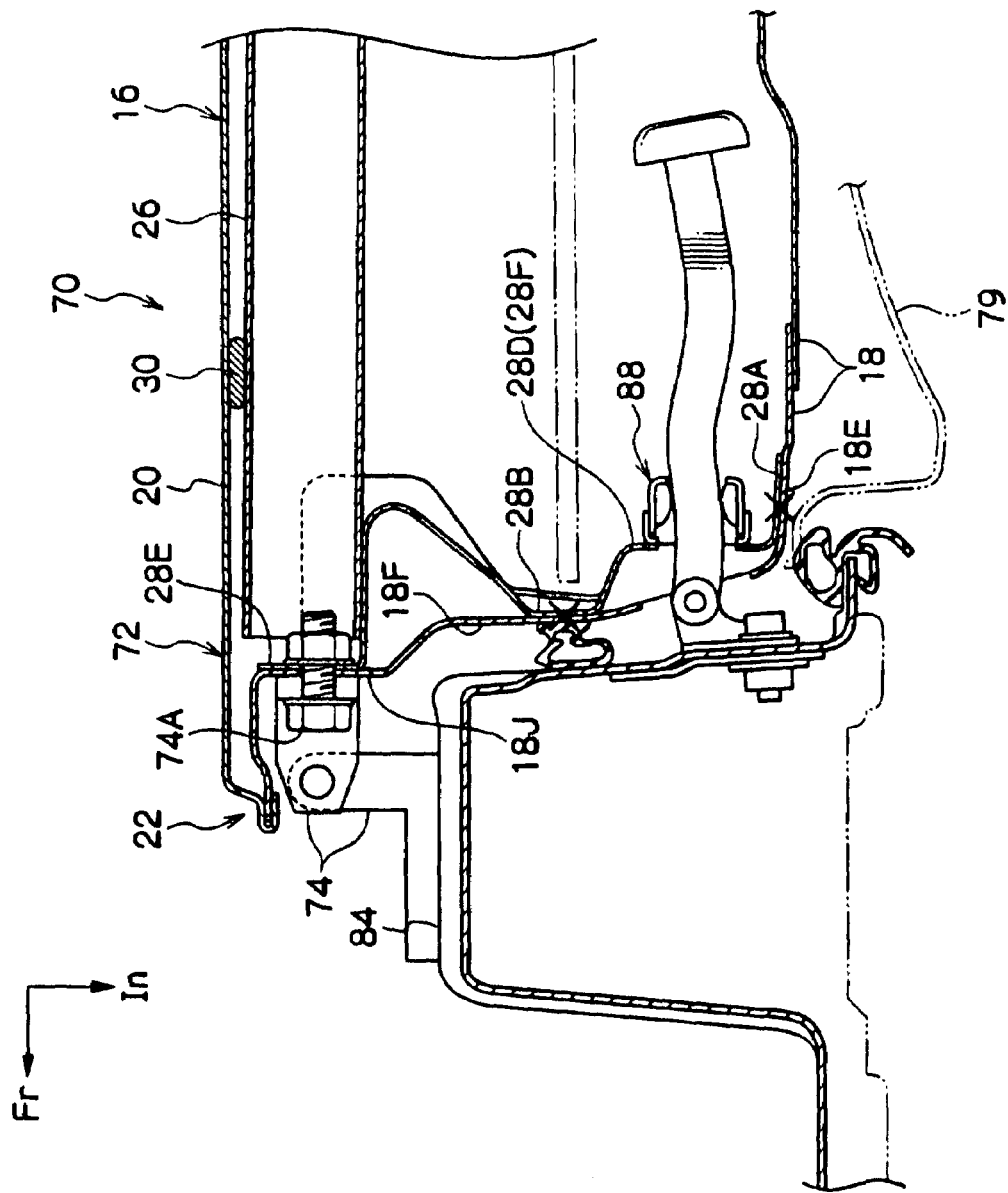
FIG. 24 is a plan view cross-section of a door to which a first example of a modification to the vehicle door structure according to the fourth exemplary embodiment of the present invention is applied.
Figure 26A:
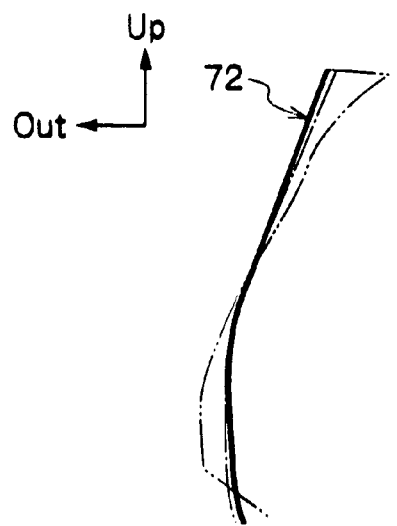
FIG. 26A to FIG. 26D are explanatory diagrams showing the baking distortion prevention effect of a door to which the vehicle door structure according to the fourth exemplary embodiment of the present invention is applied.
Figure 26B:
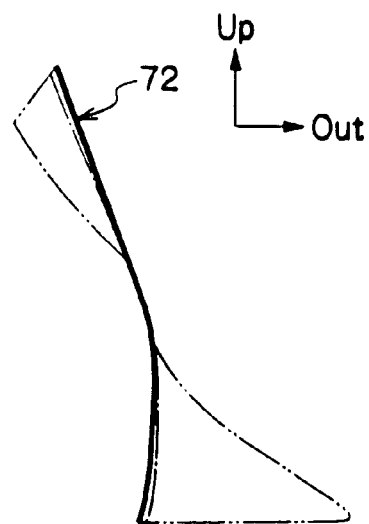
Figure 26C:
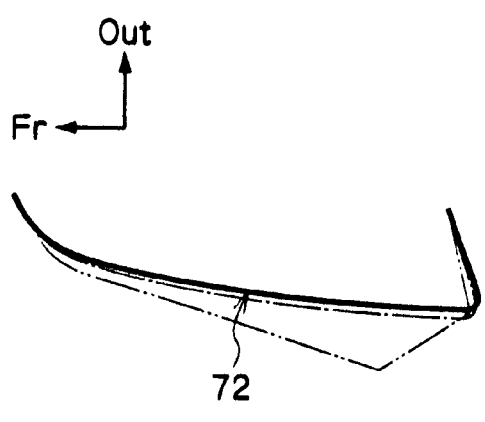
Figure 26D:
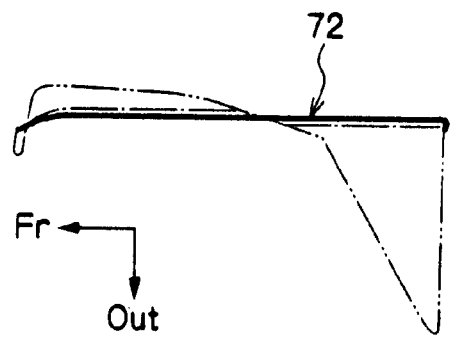

In FIG. 17 to FIG. 25 is shown a door 72 to which a vehicle door structure 70 according to the fourth exemplary embodiment of the present invention is applied. In FIG. 23 to FIG. 25 are shown examples of modifications to the vehicle door structure 70 according to the fourth exemplary embodiment of the present invention. In these figures, the arrow Fr indicates the vehicle front-rear direction front side, the arrow Up indicates the vehicle up-down direction up side, the arrow In indicates the vehicle width direction inside and the arrow Out indicates the vehicle width direction outside.

The vehicle door structure 70 according to the present exemplary embodiment is the vehicle door structure 60 according to the third exemplary embodiment of the present invention described above, configured with the following additions. Therefore, in the fourth exemplary embodiment of the present invention, elements that are similar to those of the first exemplary embodiment to the third exemplary embodiment will be allocated the same reference numerals, and explanation thereof will be omitted.

Figure 17:
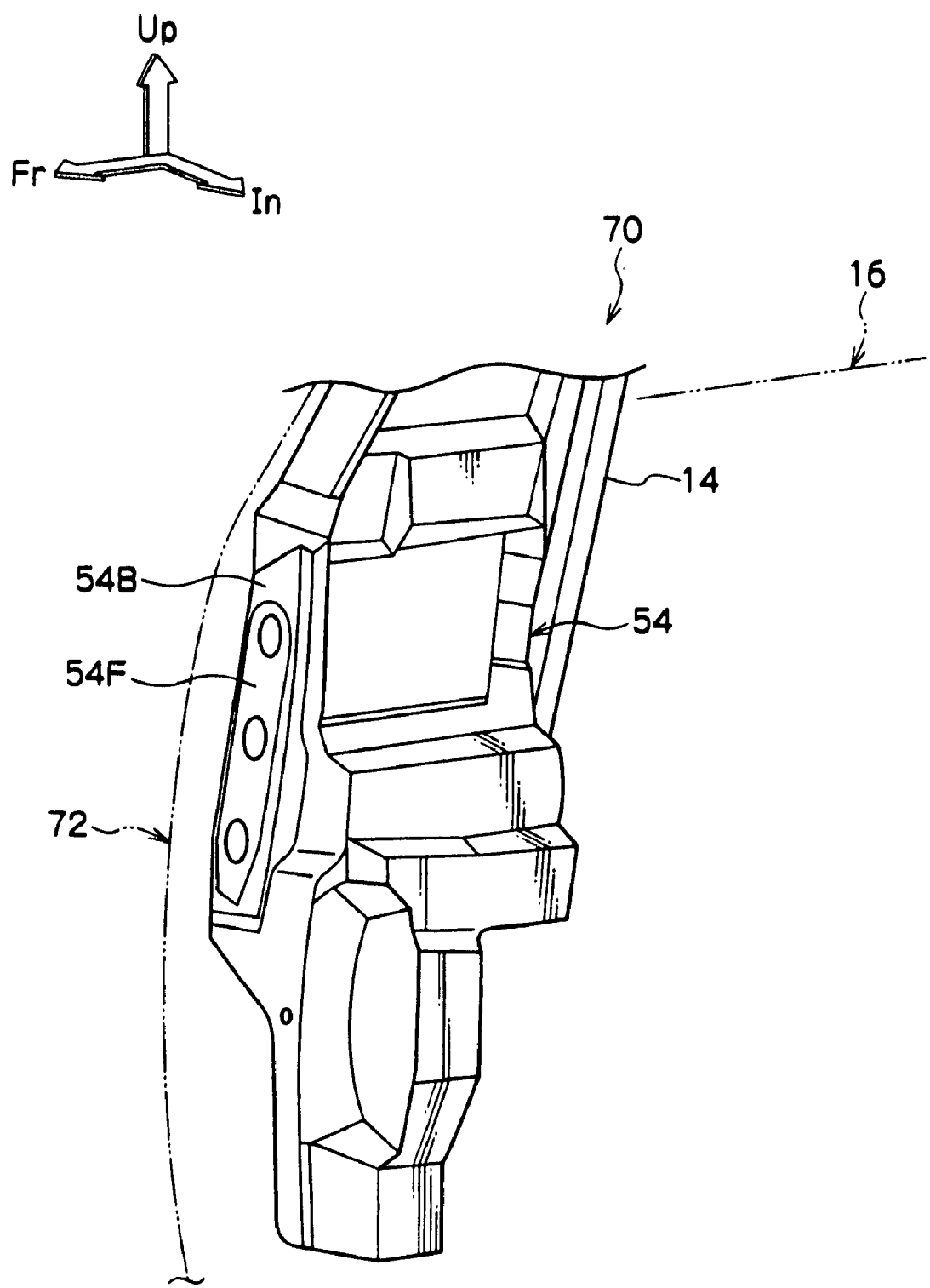
FIG. 17 is a perspective view of a front bracket provided with the vehicle door structure according to a fourth exemplary embodiment of the present invention.
Figure 18:
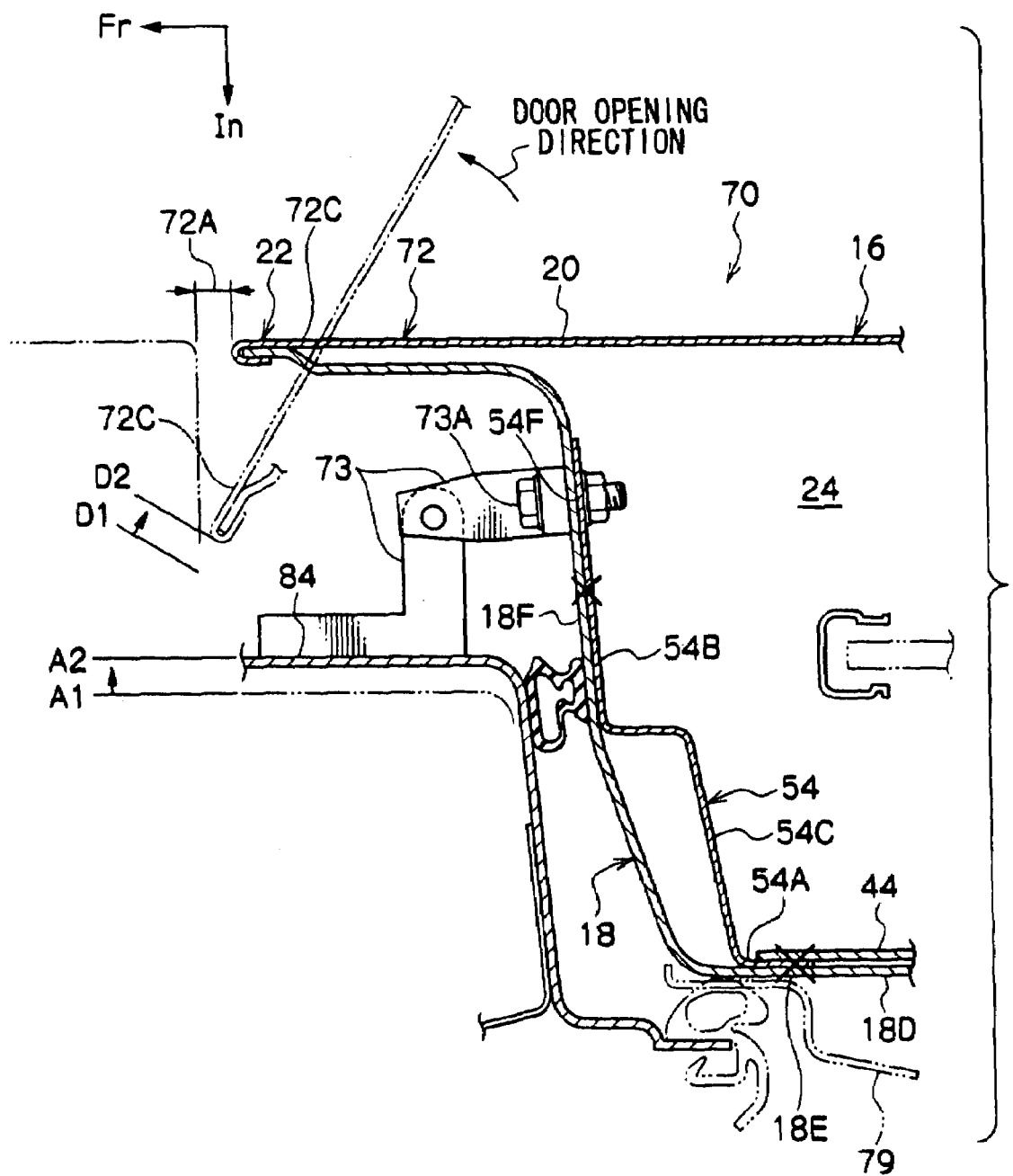
FIG. 18 is a plan view cross-section of a door to which the vehicle door structure according to the fourth exemplary embodiment of the present invention is applied.

In the door 72 to which the vehicle door structure 70 according to the fourth exemplary embodiment of the present invention is applied, as shown in FIG. 17 and FIG. 18, a door hinge mounting portion 54F is provided the vehicle width direction joining face 54B of the front bracket 54. Furthermore, as shown in FIG. 18, a door hinge 73, as a functional component, is fitted to the door hinge mounting portion 54F by a fixing 73A of a nut and a bolt.

Figure 19:
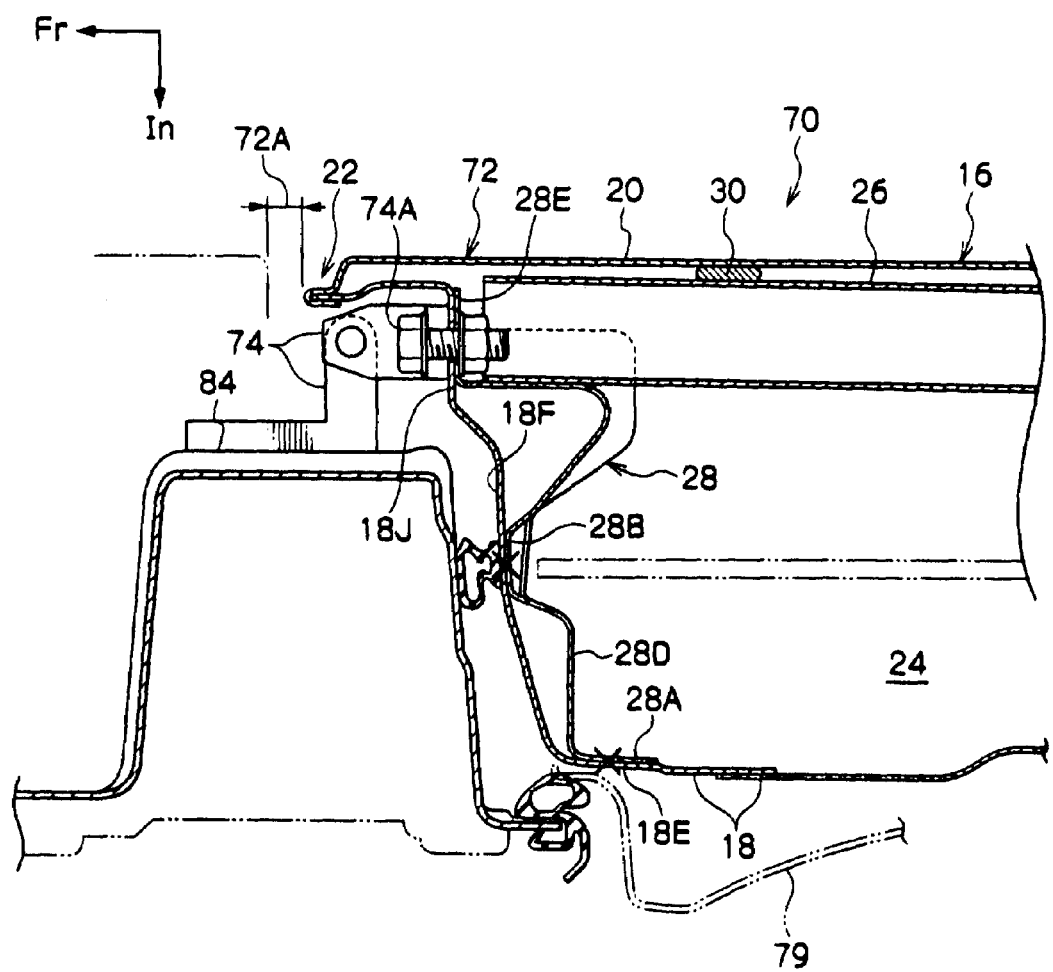
FIG. 19 is a plan view cross-section of a door to which the vehicle door structure according to the fourth exemplary embodiment of the present invention is applied.

In the same way, as shown in FIG. 19, in the door 72 a door hinge mounting portion 28E is provided to the extension 28 disposed at a lower portion at the front side in the vehicle front-rear direction of the door panel body 16. Furthermore, also as a functional component, a door hinge 74 is fixed to the door hinge mounting portion 28E by a fixing 74A of a nut and a bolt. The door 72 is supported so as to be able to pivot relative to an A-pillar 84 of the vehicle body by the door hinges 73, 74 mounted to each of the door hinge mounting portions 54F, 28E.

Figure 20:
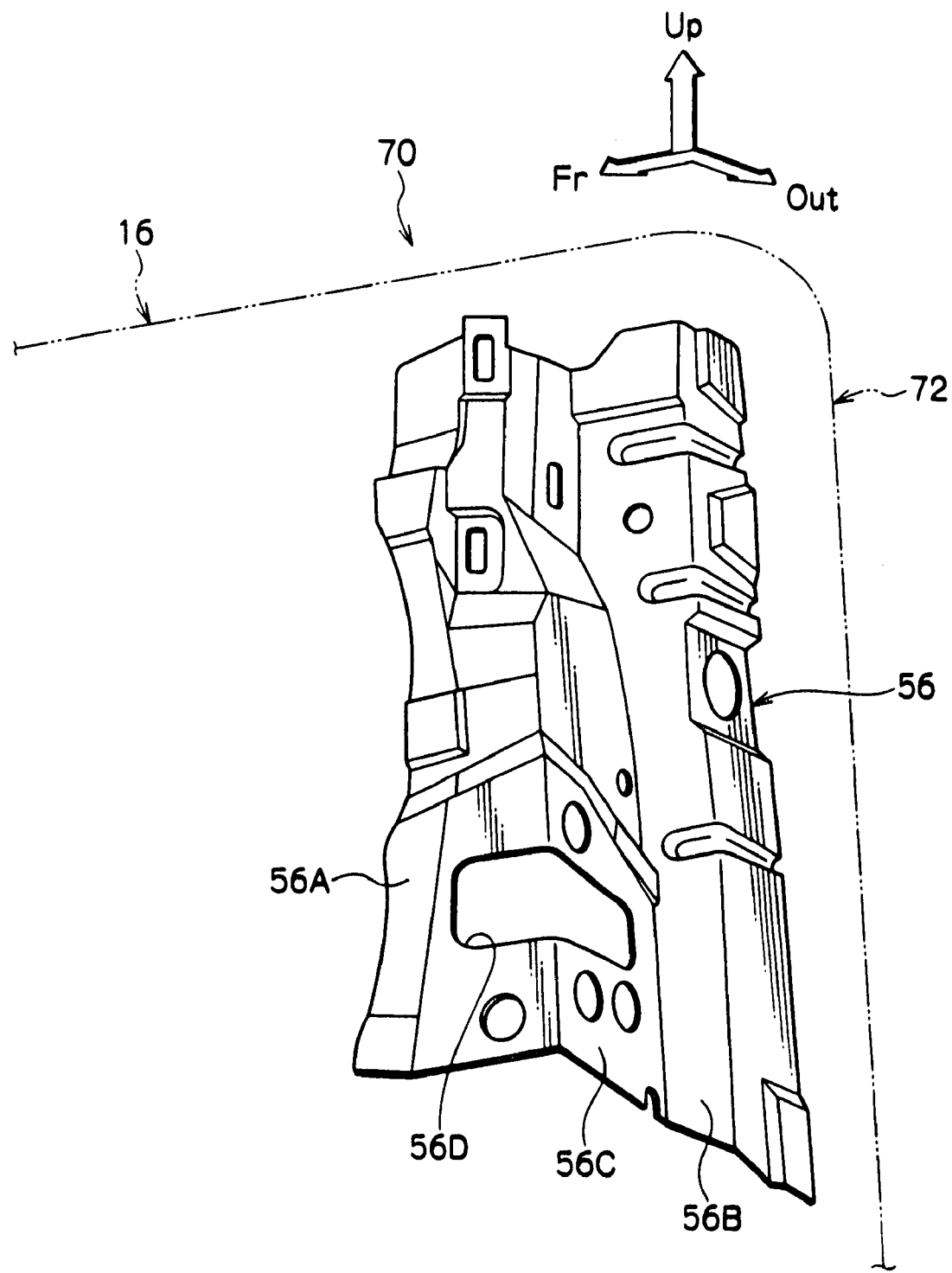
FIG. 20 is perspective view of a lock reinforcement provided on the vehicle door structure according to the fourth exemplary embodiment of the present invention is applied.
Figure 21:
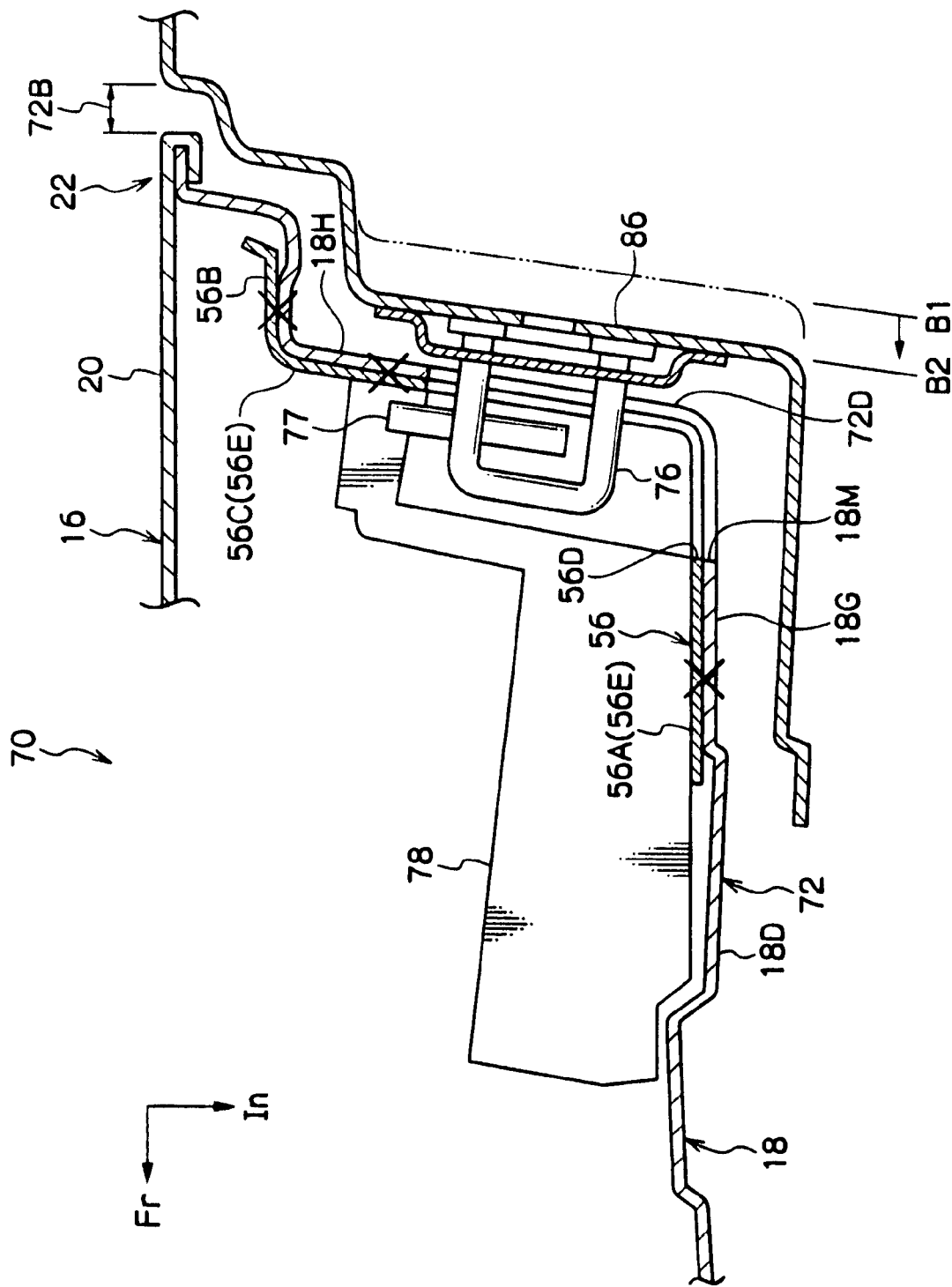
FIG. 21 is a plan view cross-section of a door to which the vehicle door structure according to the fourth exemplary embodiment of the present invention is applied.

Furthermore, as shown in FIG. 20 and FIG. 21, a lock striker hole 56D is provided in the lock reinforcement 56 that is disposed at an upper portion in the rear side in the vehicle front-rear direction of the door panel body 16 from the first vehicle front-rear direction joining face 56A to the vehicle width direction joining face 56C.

As shown in FIG. 21, the first vehicle front-rear direction joining face 56A and the vehicle width direction joining face 56C are configured as a door lock mounting portion 56E, and, as a functional component, a door lock 78, equipped with a latch member 77, is integrally provided thereto. In the present exemplary embodiment, it is configured such that when the door 72 is closed to the side of the vehicle, a striker member 76 is inserted, through a hole 18M in the door inner panel 18, into the lock striker hole 56D, and the striker member 76 and the latch member 77 are engaged, and in this way the closed state of the door 72 to the vehicle body is maintained.

The operation and effect of the fourth exemplary embodiment of the present invention will now be explained.

The vehicle door structure 70 according to the present exemplary embodiment displays, in addition to the operation and effect displayed by the vehicle door structures 40, 50, 60 of the first exemplary embodiment to the third exemplary embodiment described above, the following operation and effect.

In the vehicle door structure 70 according to the present exemplary embodiment, as shown in FIG. 18 and FIG. 19, there are the door hinge mounting portions 54F, 28E provided, respectively, on the front bracket 54 and the extension 28, and the door hinges 73, 74 are mounted to the respective door hinge mounting portions 54F, 28E. Therefore, even if the door 72 as a whole is, for example, placed in a high temperature environment such as a bake oven in electrophoretic coating, the door hinges 73, 74 are mounted to respective door hinge mounting portions 54F, 28E of the front bracket 54 and the extension 28 that are configured from a material that has a small linear expansion coefficient, and so the fitting alignment precision of each of the door hinges 73, 74 may be assured.

Furthermore, as shown in FIG. 21, there is at the lock reinforcement 56, similar to the above, and the door lock 78 equipped with the latch member 77 is integrally provided to the door lock mounting portion 56E, and the lock striker hole 56D is also provided thereto. Therefore, even if the door 72 as a whole is, for example, placed in a high temperature environment such as a bake oven in electrophoretic coating, the door lock 78 and lock striker hole 56D are provided to the lock reinforcement 56 that is configured from a material that has a small linear expansion coefficient, and so the fitting alignment precision of the door lock 78 and the lock striker hole 56D may be assured.

In this manner, by the vehicle door structure 70 according to the present exemplary embodiment, even if the door 72 as a whole is, for example, placed in a high temperature environment such as a bake oven in electrophoretic coating when the door 72 is fixed to the vehicle body, the fitting alignment precision, which is based on the door hinges 73, 74, door lock 78 and lock striker hole 56D, may be assured. By doing so, the build precision from the door hinges 73, 74 through to the door lock 78 (that is the door 72 build standard) may be raised.

By raising the build precision from the door hinges 73, 74 through to the door lock 78 of the door 72 (that is the door 72 build standard), break line gaps 72A, 72B of the door 72 (see FIGS. 18, 19 and 21), and a break line gap of a door trim 79, may be made small.

Figure 22A:
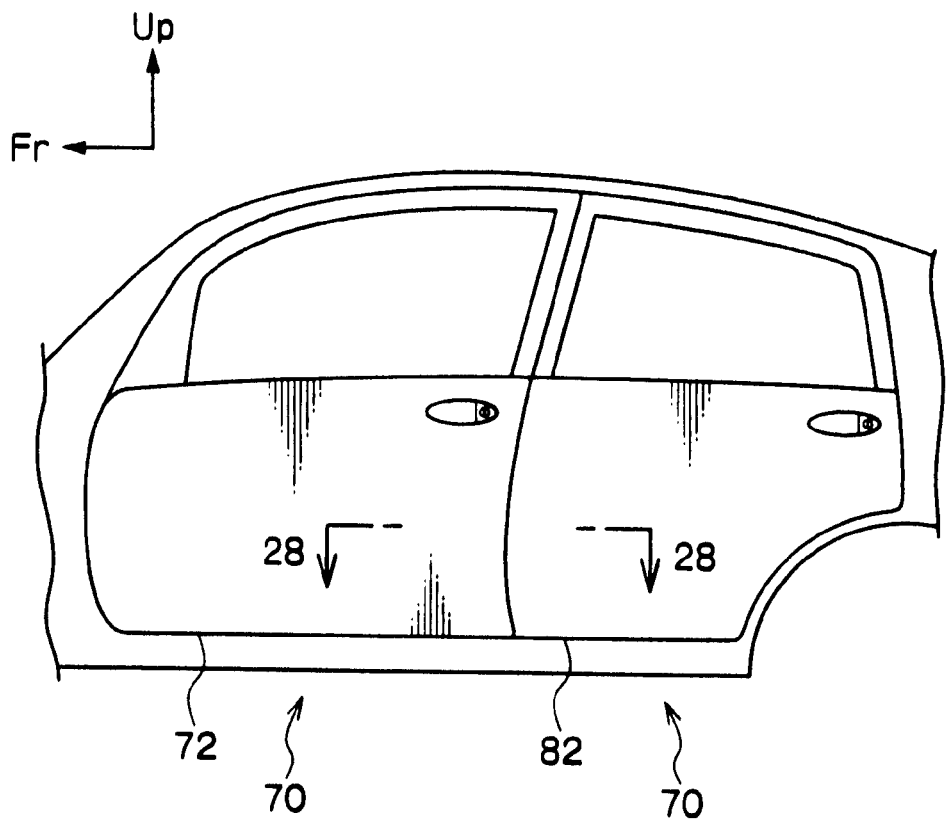
FIG. 22A is lateral view of a vehicle to which the vehicle door structure according to the fourth exemplary embodiment of the present invention is applied.
Figure 22B:
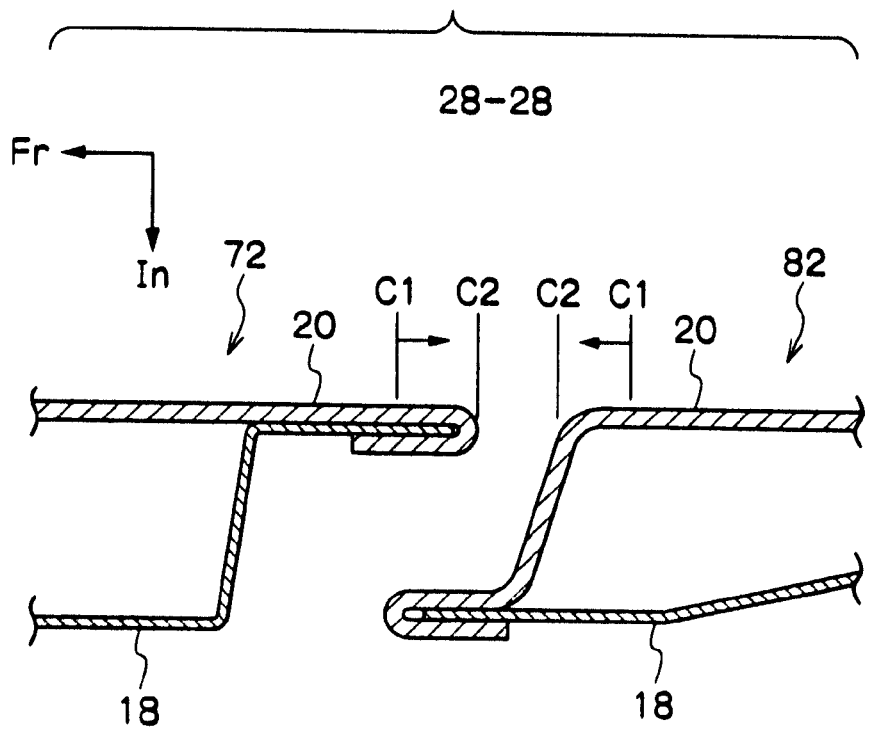
FIG. 22B is a cross-section on 28-28 of FIG. 22A.

Specifically, when, as shown in FIG. 22A and FIG. 22B, the vehicle door structure 70 according to the present exemplary embodiment is applied to both the front door 72 and a rear door 82, by changing the break line therebetween of the door outer panels 20, from the conventional C1, to C2, the break line gap may be decreased between the doors 72, 82.

Furthermore, by decreasing the break line by raising the build precision of the door hinges 73, 74 through to the door lock 78 of the door 72 (that is the door 72 build precision), even if the door 72 as a whole is, for example, placed in a low temperature environment, deterioration in the attractiveness due to widening of the break line gap of the door 72 (at low temperature) may be suppressed.

Misalignment of the door hinge 73, about which the door 72 opens and closes, may be suppressed, as shown in FIG. 18, and also the thermal expansion amount of a front end portion 72C of the door 72 may be reduced from D1 to D2. Therefore, a gap may be assured, when opening the door 72, between the front end portion 72C of the door 72 and the A-pillar 84. Therefore, as shown in FIG. 18, the A-pillar 84 may, for example, be moved to the outside in the vehicle width direction, from the conventional A1 position, to A2. In so doing, the cross-sectional area of the A-pillar 84 may be increased, and load bearing of the A-pillar 84 during side impact may be increased. When the door 72 is a rear door, the cross-section area of a B-pillar 86 may be increased, and load bearing of the B-pillar 86 during side impact may be increased.

In a similar manner, by the vehicle door structure 70 according to the present exemplary embodiment, as shown in FIG. 21, the thermal expansion amount at the door lock portion of the door inner panel 18 may be decreased, and so the gap between a rear end portion 72D of the door 72 and the B-pillar 86 (and the gap between the door inner panel 18 and the striker member 76) may be assured. Therefore the B-pillar 86 may be moved, for example, to the front in the vehicle front-rear direction, from the conventional B1 position, to B2. By doing so, the cross-sectional area of the B-pillar 86 may be increased, and the load bearing of the B-pillar 86 during side impact may be increased. When the door 72 is a rear door the cross-sectional area of a C-pillar may be increased, and the load bearing of the C-pillar during side impact may be increased.

Next, an example of a modification of the fourth exemplary embodiment of the present invention will be explained.

In the above exemplary embodiment the door hinge mounting portion 54F was provided to the front bracket 54, however, as shown in FIG. 23, in addition to providing the door hinge mounting portion 54F, a door check mounting member 54G, for fitting, as a functional component, a door check thereto, may also be provided to the front bracket 54. Also, as shown in FIG. 24, the vehicle width direction support surface 28D of the extension 28 may be configured with a door check mounting portion 28F, for mounting a door check 88 thereto.

By so doing, the door check 88 (see FIG. 24) is mounted to the front bracket 54 and the extension 28 that are configured from a material with a small linear expansion coefficient, and thereby it is configured such that the positional relationships between the door hinges 73, 74 of the door 72 and the door check 88 are not readily affected by changes in surrounding temperature. In this way, there is a constant distance, when the door 72 is opened and closed, between the door hinges 73, 74 about which it is pivoted and the position of the door check 88. As a result, the feeling may be improved when opening and closing the door 72 in low and high temperature environments.

In the above exemplary embodiment the door hinge mounting portion 54F is provided to the front bracket 54, but door hinge mounting portion(s) may be provided to the belt line inner reinforcement 44.

Furthermore, in the above exemplary embodiment the lock striker hole 56D was provided to the lock reinforcement 56, but, as shown in FIG. 25, a lock striker hole 28G may be provided to the extension 28. In such a case, when fixing the door 72, the fitting alignment precision, which is based on the lock striker hole 28G may be assured.

Test Example 1

Explanation will now be given of a test example of the vehicle door structure 70 according to the fourth exemplary embodiment of the present invention, with reference to FIG. 26 to FIG. 28.

In FIG. 26A to FIG. 26D are explanatory diagrams showing the baking distortion prevention effect of the door 72 to which the vehicle door structure 70 according to the fourth exemplary embodiment of the present invention is applied. FIG. 26A to 26D show, respectively, a front view of a front side portion, a back view of a rear side portion, a plan view (top view) of a frame portion, and a bottom view of a lower side portion of the door 72. In the figures, the initial state of the door 72 before baking is shown by solid lines, and the state of the door 72 to which the vehicle door structure 70 according to the present exemplary embodiment is applied after baking is shown by the intermittent lines with a single dot, and state of a conventional door after baking is shown by the intermittent lines with a double dot. In each case, the distortion is shown 100 times the actual distortion.

As shown in the figures, in the case of a conventional door after baking, the door is greatly deformed as shown by the double dot intermittent lines. In contrast, with the vehicle door structure 70 according to the present exemplary embodiment, the distortion of each of the portions of the door 72 is suppressed, and it is clear that the initial state of the door 72 before baking is maintained. Therefore, even if the door 72 as a whole is, for example, placed in a high temperature environment such as a bake oven in electrophoretic coating, permanent deformation due to thermal distortion of the door outer panel 20 may be suppressed, and it can be said that, as a result, the build precision of the door 72 to the vehicle body may be increased.

Figure 27A:
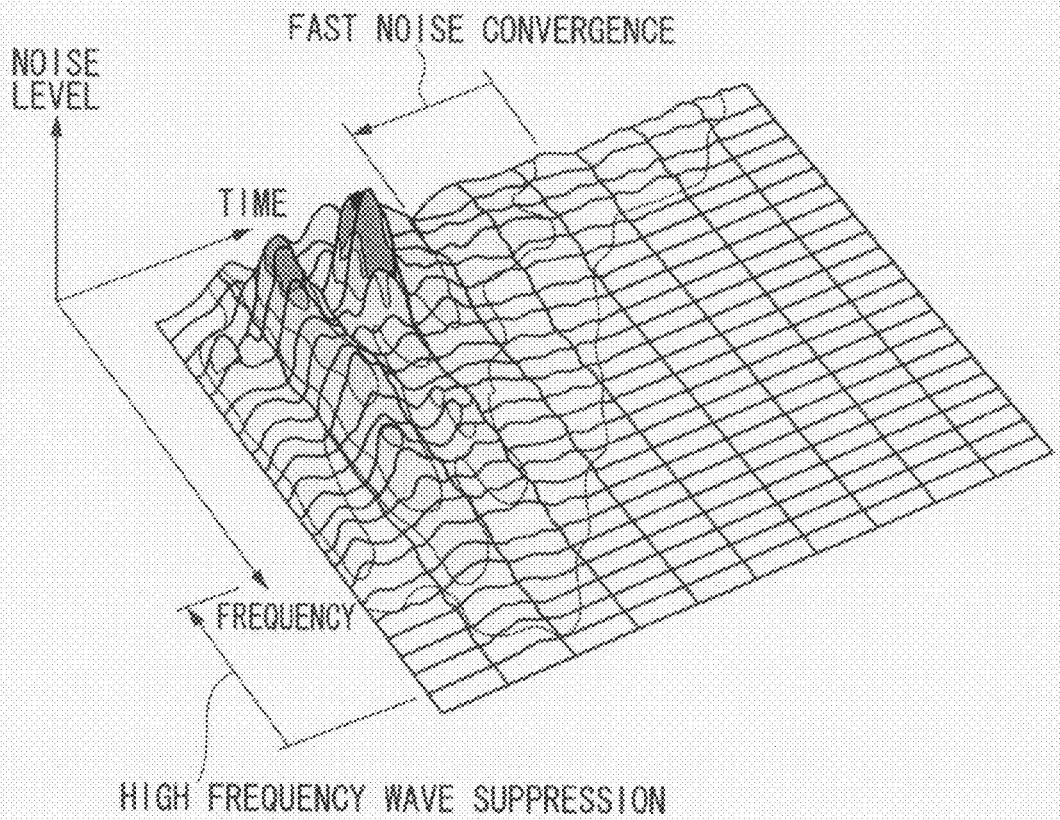
FIG. 27A and FIG. 27B are explanatory diagrams showing the door shutting noise prevention effect of a door to which the vehicle door structure according to the fourth exemplary embodiment of the present invention is applied.
Figure 27B:
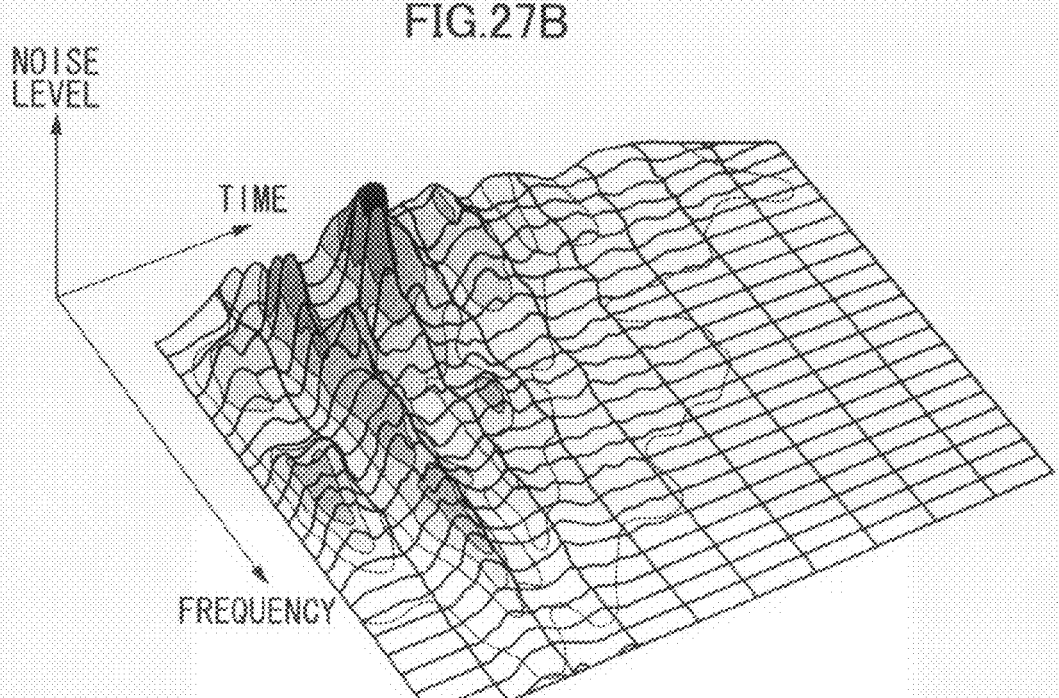

Furthermore, FIG. 27A and FIG. 27B are explanatory diagrams showing the door shutting noise prevention effect of the door 72 to which the vehicle door structure 70 according to the present exemplary embodiment is applied. In FIG. 27A is shown test data of the noise of shutting the door 72 to which the vehicle door structure 70 according to the fourth exemplary embodiment of the present invention is applied, and FIG. 27B shows test data of the noise of shutting a conventional door.

As is seen in the figures, for the door 72, the noise convergence is faster than a conventional door, and it is clear that high frequency sound may be suppressed. Therefore, by the vehicle door structure 70 according to the present exemplary embodiment, the noise of shutting the door 72 may be decreased, and a high quality feeling may be imparted.

Figure 28A:
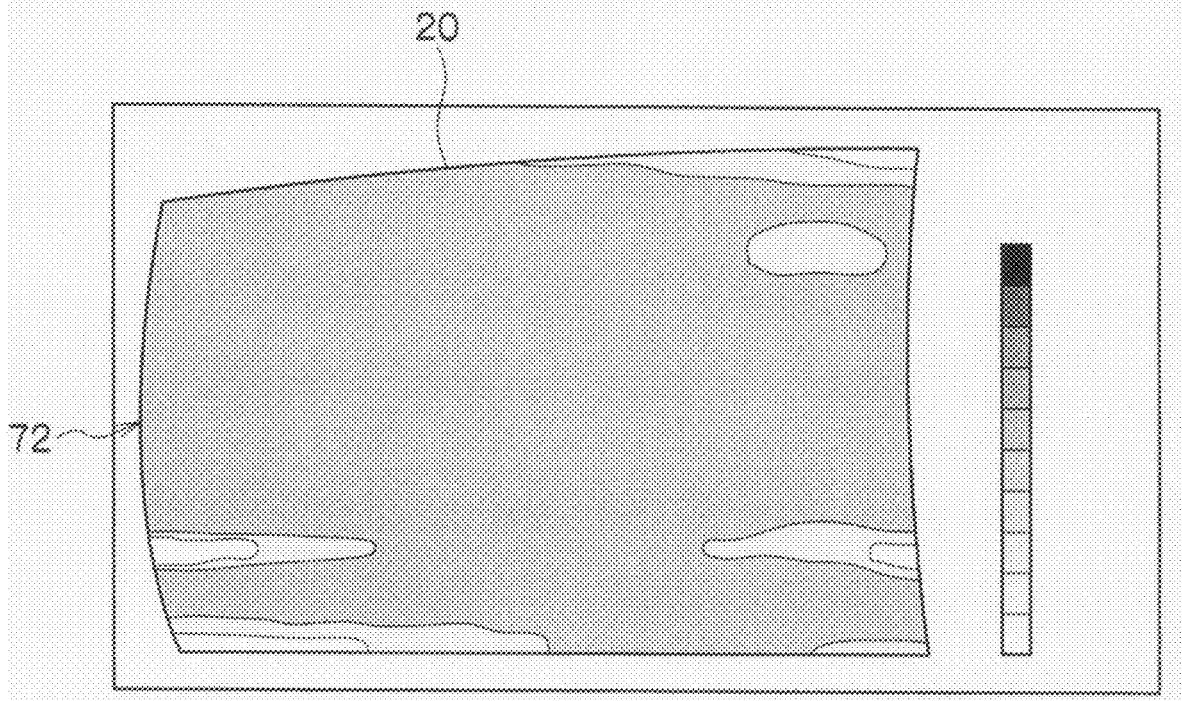
FIG. 28A and FIG. 28B are explanatory diagrams showing the door outer panel internal stress increase effect of a door to which the vehicle door structure according to the fourth exemplary embodiment of the present invention is applied.
Figure 28B:
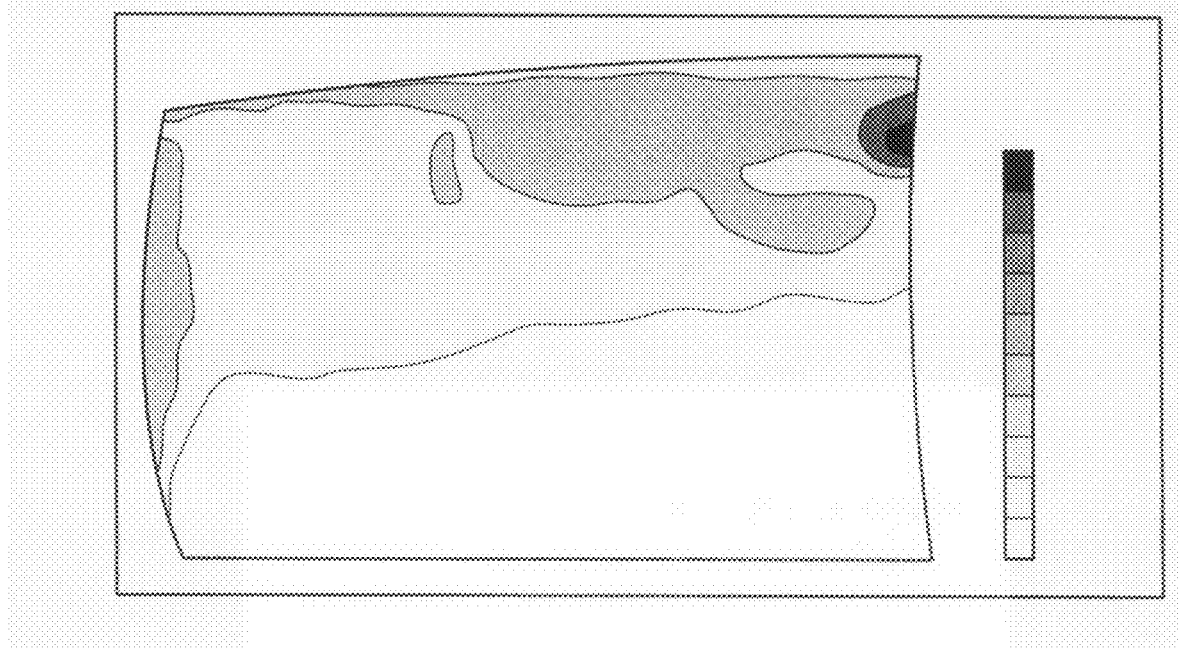

Furthermore, FIG. 28A and FIG. 28B are explanatory diagrams showing the door outer panel 20 internal stress increase effect of the door 72 to which the vehicle door structure 70 is applied. FIG. 28A shows internal stress test data for a door outer panel 20 of the door 72 to which the vehicle door structure 70 according to the present exemplary embodiment is applied, and FIG. 28B shows test data for a door outer panel of a conventional door. Both sets of data are analyses of the hypothesis that the door as a whole is, for example, placed in a high temperature environment such as a bake oven in electrophoretic coating.

As is seen from the figures, there is a higher internal stress in the door 72, to which the vehicle door structure 70 is applied, than in a conventional door. Therefore, by the vehicle door structure 70 according to the present exemplary embodiment, the load bearing of the door outer panel 20 is increased, and it may be said that the load bearing of the door 72 as a whole during a side impact, and the dent resistance of the door outer panel 20, may be increased.

Fifth Exemplary Embodiment

Explanation will now be given of a fifth exemplary embodiment of the present invention, with reference to FIG. 29 to FIG. 35.

Figure 29:
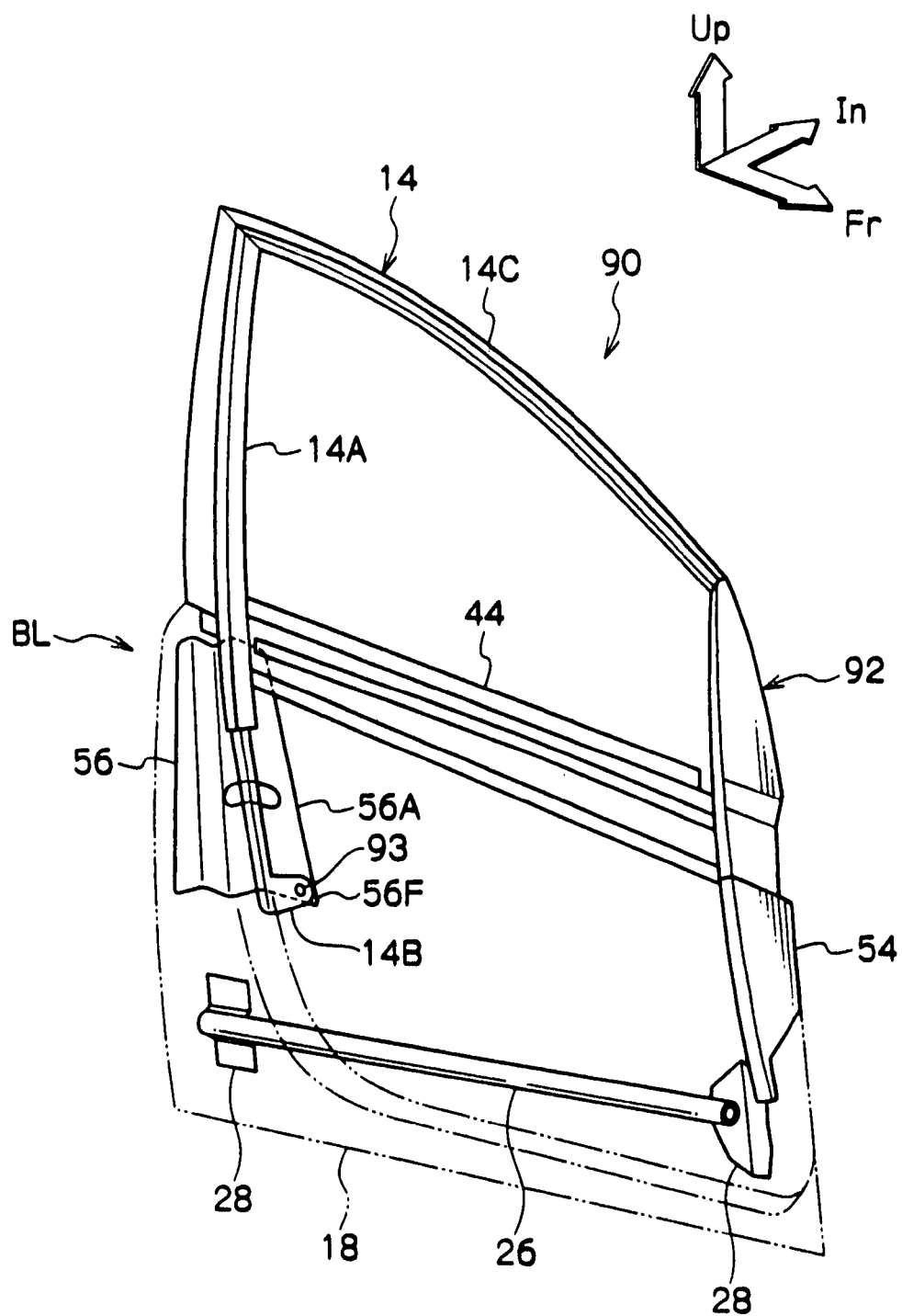
FIG. 29 is a perspective view of a door to which the vehicle door structure according to the fifth exemplary embodiment of the present invention is applied.
Figure 30:
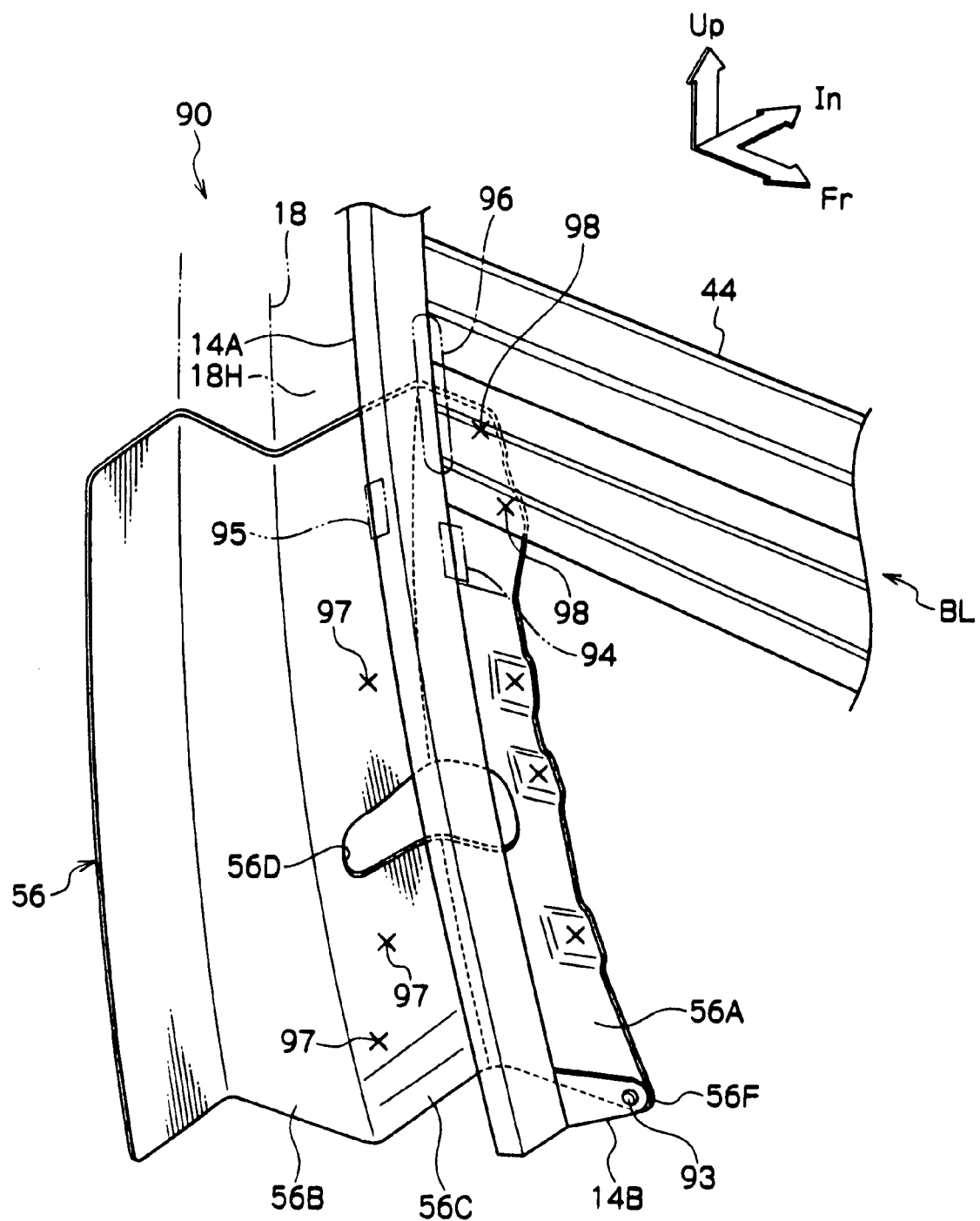
FIG. 30 is an expanded view of important portions of FIG. 29.
Figure 31:
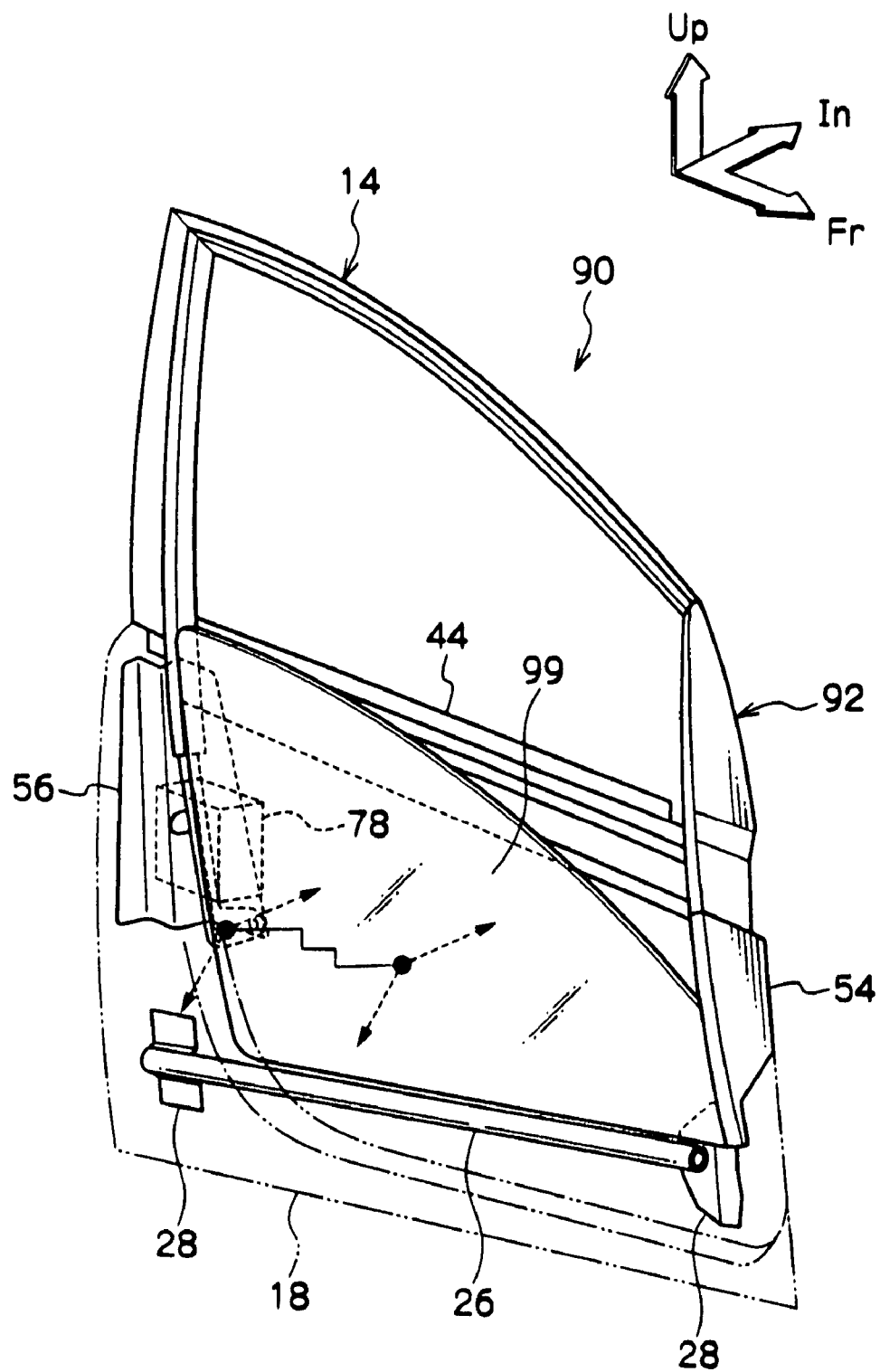
FIG. 31 is an explanatory diagram showing the glass anti-vibration effect of a door to which the vehicle door structure according to the fifth exemplary embodiment of the present invention is applied.

FIG. 29 to FIG. 31 show a door 92 to which the vehicle door structure 90 according to the fifth exemplary embodiment of the present invention is applied. Furthermore, FIG. 32 to FIG. 35 show examples of modification of the vehicle door structure 90 according to the fifth exemplary embodiment of the present invention. In these figures, the arrow Fr indicates the vehicle front-rear direction front side, the arrow Up indicates the vehicle up-down direction up side, and the arrow In indicates the vehicle width direction inside.

The vehicle door structure 90 according to the fifth exemplary embodiment of the present invention is the vehicle door structure 70 of the fourth exemplary embodiment of the present invention described above, configured with the following additions. Therefore, in the fifth exemplary embodiment of the present invention, elements that are similar to those of the first exemplary embodiment to the fourth exemplary embodiment will be allocated the same reference numerals and explanation thereof will be omitted.

As shown in FIG. 29 and FIG. 30, the door 92, to which the vehicle door structure 90 according to the present exemplary embodiment is applied, has a rear frame 14A provided to the door frame 14 (functional component), and a tongue shaped fixing portion 14B is provided to a lower portion (lower frame) of the rear frame 14A. Furthermore, in the door 92, a fixing portion 56F (fixing component) is provide to the vehicle front-rear direction joining face 56A of the lock reinforcement 56.

The door frame 14 is integrally joined to the lock reinforcement 56, by the fixing portion 14B at the fastening portion 56F being fastened by a fastener 93 and also, as shown in FIG. 30, by the bonding portions 94, 95 being bonded to the vehicle front-rear direction joining face 56A and the vehicle width direction joining face 56C. In addition, the door frame 14 is bonded to the belt line inner reinforcement 44 at a bonding portion 96.

In the present exemplary embodiment, the lock reinforcement 56 is joined to the door inner panel 18 at a bonding portion 97 as well as being joined to the belt line inner reinforcement 44 at a bonding portion 98.

Explanation will now be given of the operation and effect of the fifth exemplary embodiment of the present invention.

The vehicle door structure 90 according to the present exemplary embodiment, in addition to the operation and effect displayed by the vehicle door structures 40, 50, 60 and 70 of the first exemplary embodiment to the fourth exemplary embodiment, also displays the following operation and effect.

That is, the lock reinforcement 56 is joined to the belt line inner reinforcement 44 that is configured from a material with small linear expansion coefficient and has suppressed thermal expansion deformation, and the rear frame 14A of the door frame 14 is integrally joined to the lock reinforcement 56. Therefore, even if the door 92 as a whole is, for example, placed in a high temperature environment such as a bake oven in electrophoretic coating, the rear frame 14A of the door frame 14 is integrally joined to the lock reinforcement 56 and so the fixing alignment precision of the door frame 14 may be assured.

That is, as shown in FIG. 30, the fixing alignment precision of the door frame 14 relative to the door panel body 16 is assured: in the vehicle front-rear direction, by the rigidity of the belt line inner reinforcement 44 set in the vehicle front-rear direction; in the vehicle up-down direction, by a reduction in the thermal expansion amount of the steel lock reinforcement 56 set downward from the belt line inner reinforcement 44; and, in the vehicle width direction, by increased rigidity due to making an L-shaped cross-section of the vehicle front-rear direction joining face 56A with the vehicle width direction joining face 56C of the lock reinforcement 56.

By doing so, the vehicle door structure 90 according to the present exemplary embodiment may assure the fixing alignment precision of the door frame 14. As a result, the build precision of the door frame 14 to the vehicle body may be increased. In particular, according to the above structure of the present exemplary embodiment, as shown in FIG. 29, the build precision may be increased of an upper frame 14C of the door frame 14 in the vehicle width direction, where the offset distance is large from the belt line portion BL.

Even when the hole 18M (see FIG. 21) is provided in the door inner panel 18 for the striker member 76 to accept the latch member 77, when the door 92 as a whole is, for example, placed in a high temperature environment such as a bake oven in electrophoretic coating, deformation of the peripheral portions of the hole 18M may be suppressed by the lock reinforcement 56.

Also, the rear frame 14A of the door frame 14 is reinforced by the lock reinforcement 56 as a whole. Therefore, when the door 92 is opened and closed, the load of door glass that is supported by the door frame 14 may be taken by the lock reinforcement 56 as a whole. In doing so, the durability of the rear frame 14A of the door frame 14 to opening and closing may be increased.

Furthermore, with the vehicle door structure 90 according to the present exemplary embodiment, as shown in FIG. 30, joining faces of the lock reinforcement 56 and the door inner panel 18 with the door frame 14 (vehicle width direction joining face 56C and vehicle width direction joining face 18H) extend in the vehicle width direction, thereby the side impact load bearing may be transmitted to the B-pillar 86 via these surfaces that are in the vehicle width direction. In such an instance, the faces in the vehicle width direction are, compared to faces that are at an angle to the vehicle width direction, less readily collapsed during a side impact, and the side impact load may be distributed to the B-pillar 86, and the load transmission ratio may be increased.

Also, during a side impact, as shown in FIG. 31, the load of the door lock 78 is transmitted to the door frame 14 through the lock reinforcement 56. In addition, during a side impact, distribution may be made of the load from a lower portion to an upper portion of the door frame 14. Therefore, the load transmission ratio may be increased, and deformation during side impact may be suppressed.

Furthermore, the fitting portions of the door frame 14 are reinforced by the lock reinforcement 56, and, for example, as shown in FIG. 31, vibrations of the door frame 14 when opening and closing the door 92 may be suppressed. By doing so, even if the door glass 99 is in the down position when the door 92 is opened or closed, vibration of the door glass 99 may be suppressed.

Explanation will now be given of examples of modifications to the fifth exemplary embodiment of the present invention.

Figure 32:
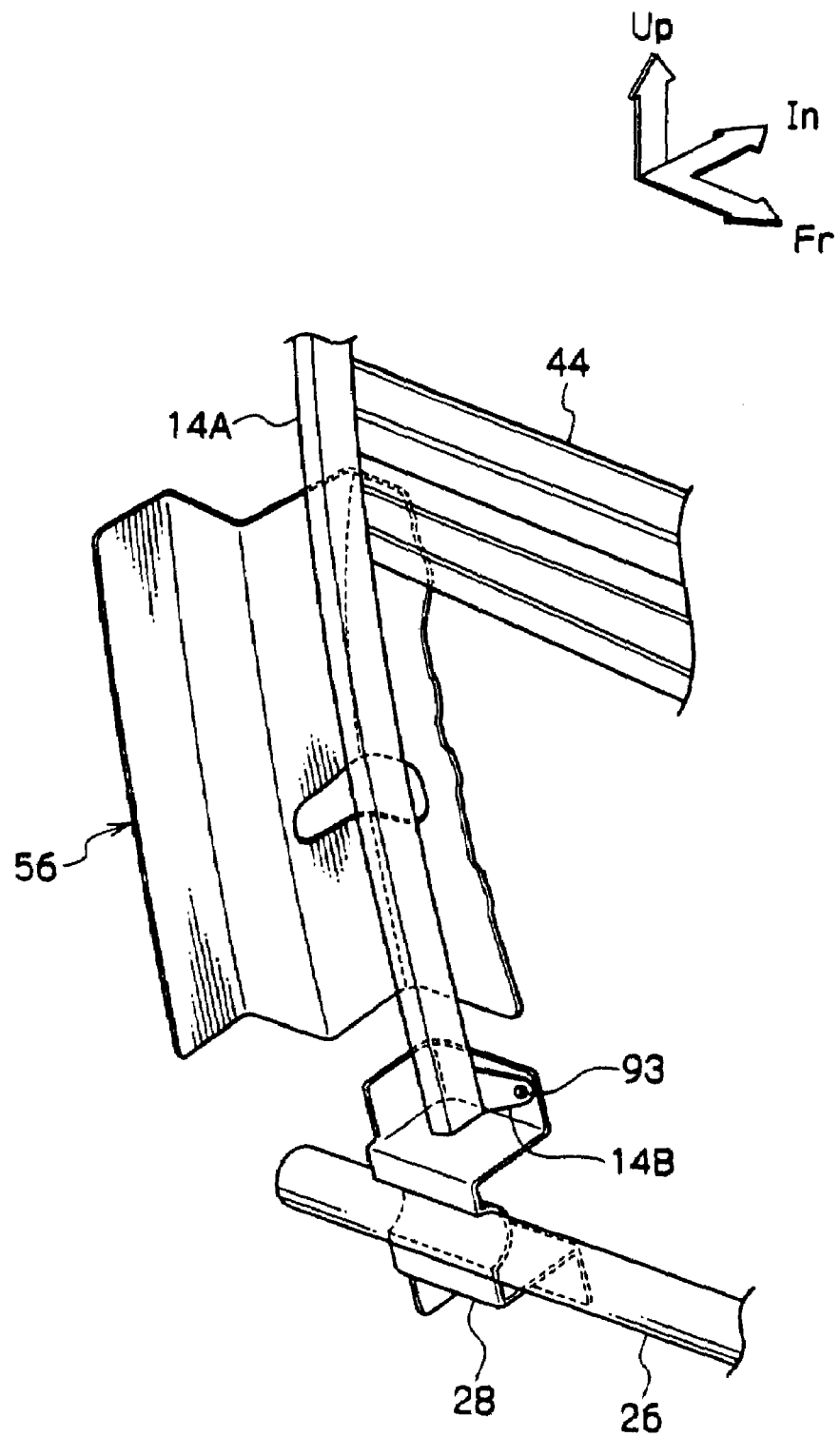
FIG. 32 is a diagram showing a first example of a modification to the vehicle door structure according to the fifth exemplary embodiment of the present invention.
Figure 33:
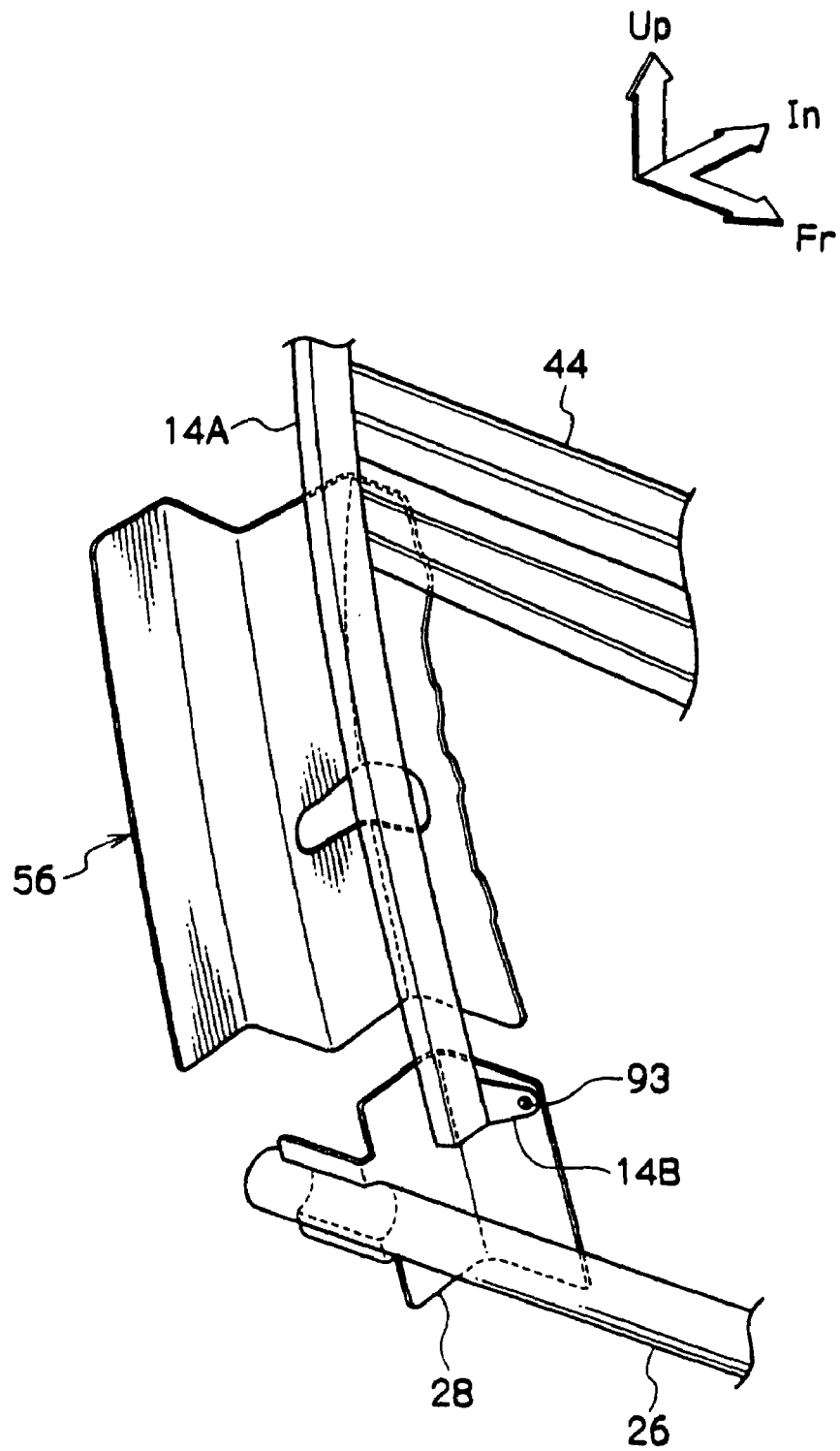
FIG. 33 is a diagram showing a second example of a modification to the vehicle door structure according to the fifth exemplary embodiment of the present invention.

In the above exemplary embodiment a lower portion of the rear frame 14A of the door frame 14 is joined to the lock reinforcement 56, but, as shown in FIG. 32 and FIG. 33, the lower portion of the rear frame 14A of the door frame 14 may be integrally joined to the extension 28 that is connected to the impact beam 26. In such a case the cross-section of the extension 28 may, as shown in FIG. 32, be made hat-shaped, or may, as shown in FIG. 33, be made Z-shaped.

Thereby, deformation of fitting faces of the door frame 14, due to thermal expansion force of the door inner panel 18, is suppressed, by the impact beam 26 that is for increasing the strength in a side impact, fixing alignment precision may be assured of the door frame 14. Furthermore, direct transmission may be made of the load during a side impact from the impact beam 26 to the door frame 14, and thereby, the load transmission ratio during a side impact may be increased.

Figure 34:
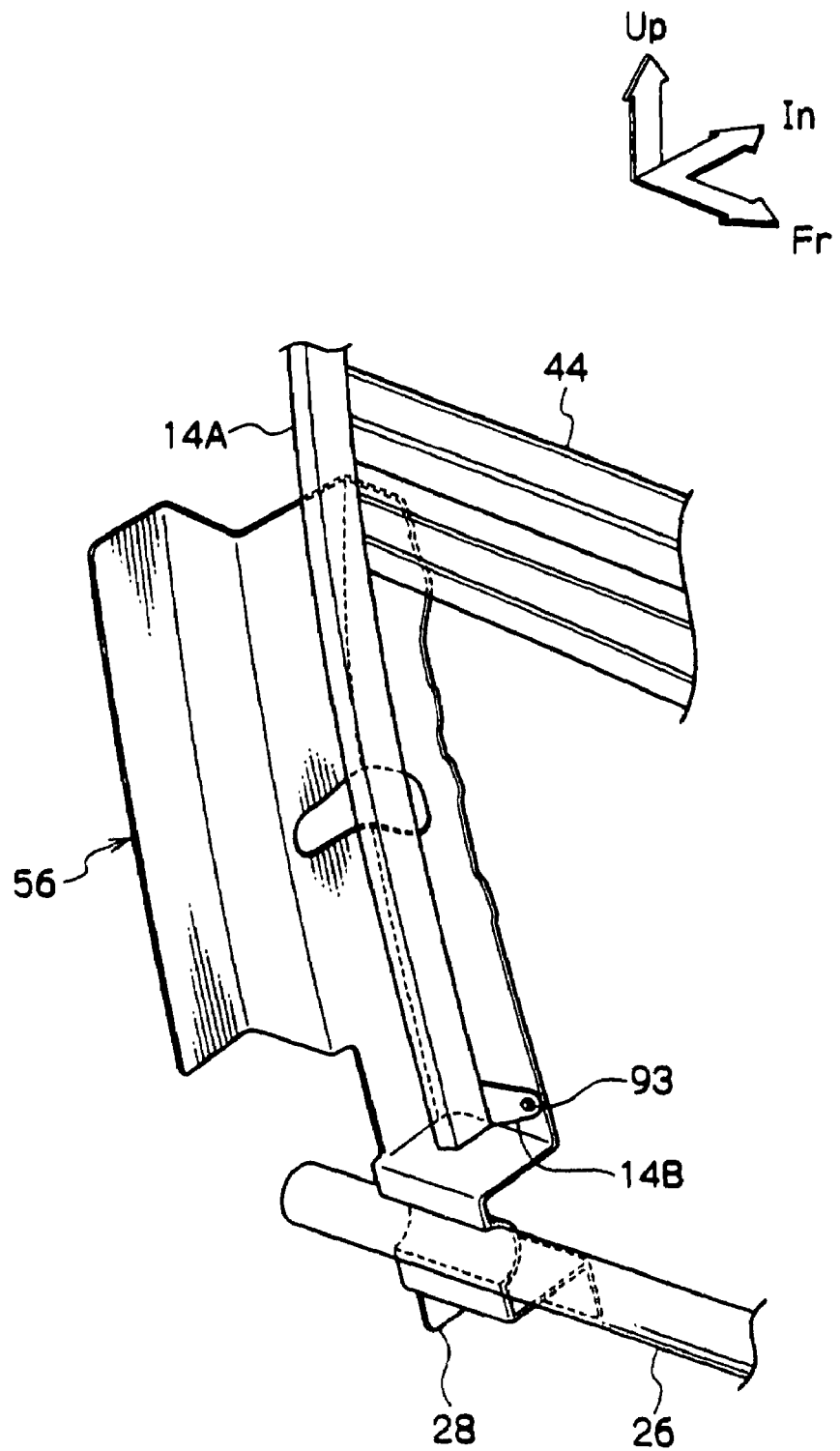
FIG. 34 is a diagram showing a third example of a modification to the vehicle door structure according to the fifth exemplary embodiment of the present invention.
Figure 35:
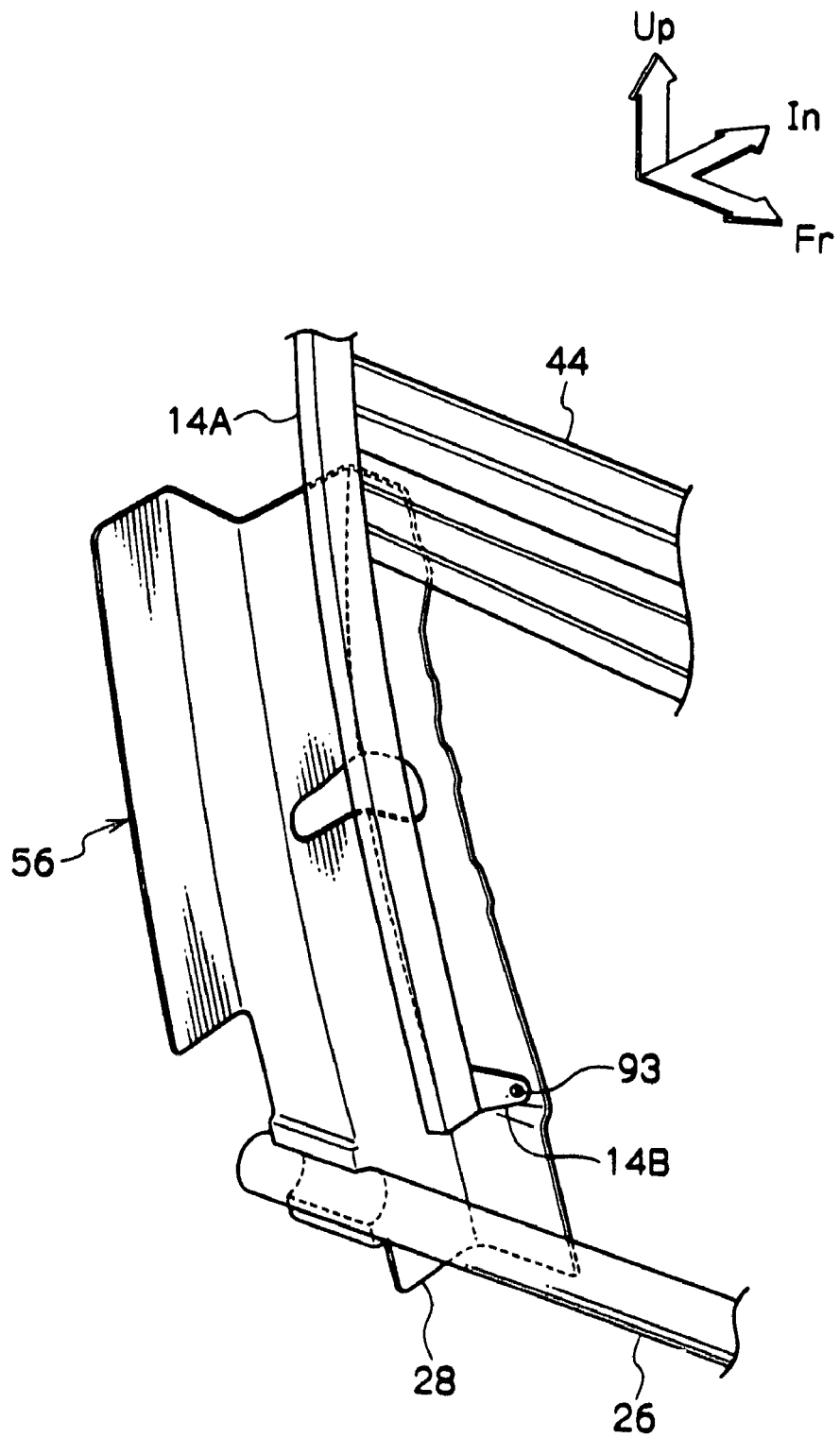
FIG. 35 is a diagram showing a fourth example of a modification to the vehicle door structure according to the fifth exemplary embodiment of the present invention.

Furthermore, in the above exemplary embodiment, the lock reinforcement 56 and the extension 28 are configured as separate bodies that are disposed apart from each other, however, as shown in FIG. 34 and FIG. 35, the lock reinforcement 56 and the extension 28 may be integrally joined together, or may be integrally formed. In such cases, the cross-section of the extension 28 may be made hat-shaped, as shown in FIG. 34, or may be made Z-shaped, as shown in FIG. 35.

By doing so, deformation of the fixing surfaces of the door frame 14 due to the thermal expansion force of the door inner panel 18 may be suppressed to a great extent, at the upper side of the door inner panel 18 by the belt line inner reinforcement 44, and at the lower side by the impact beam 26, respectively.

Furthermore, by integrally joining, or by integrally forming, the lock reinforcement 56 and the extension 28, since the belt line inner reinforcement 44 and the impact beam 26 are connected by the lock reinforcement 56 and the extension 28, as connectors, the rigidity between the belt line inner reinforcement 44 and the impact beam 26 may be assured. By doing so, even if the door 92 as a whole is, for example, placed in a high temperature environment such as a bake oven in electrophoretic coating, a difference generated in the thermal expansion conditions between the door inner panel 18 side and the door outer panel 20 side may be suppressed.

Sixth Exemplary Embodiment

Explanation will now be given of the sixth exemplary embodiment of the present invention, with reference to FIG. 36 and FIG. 37.

Figure 36:
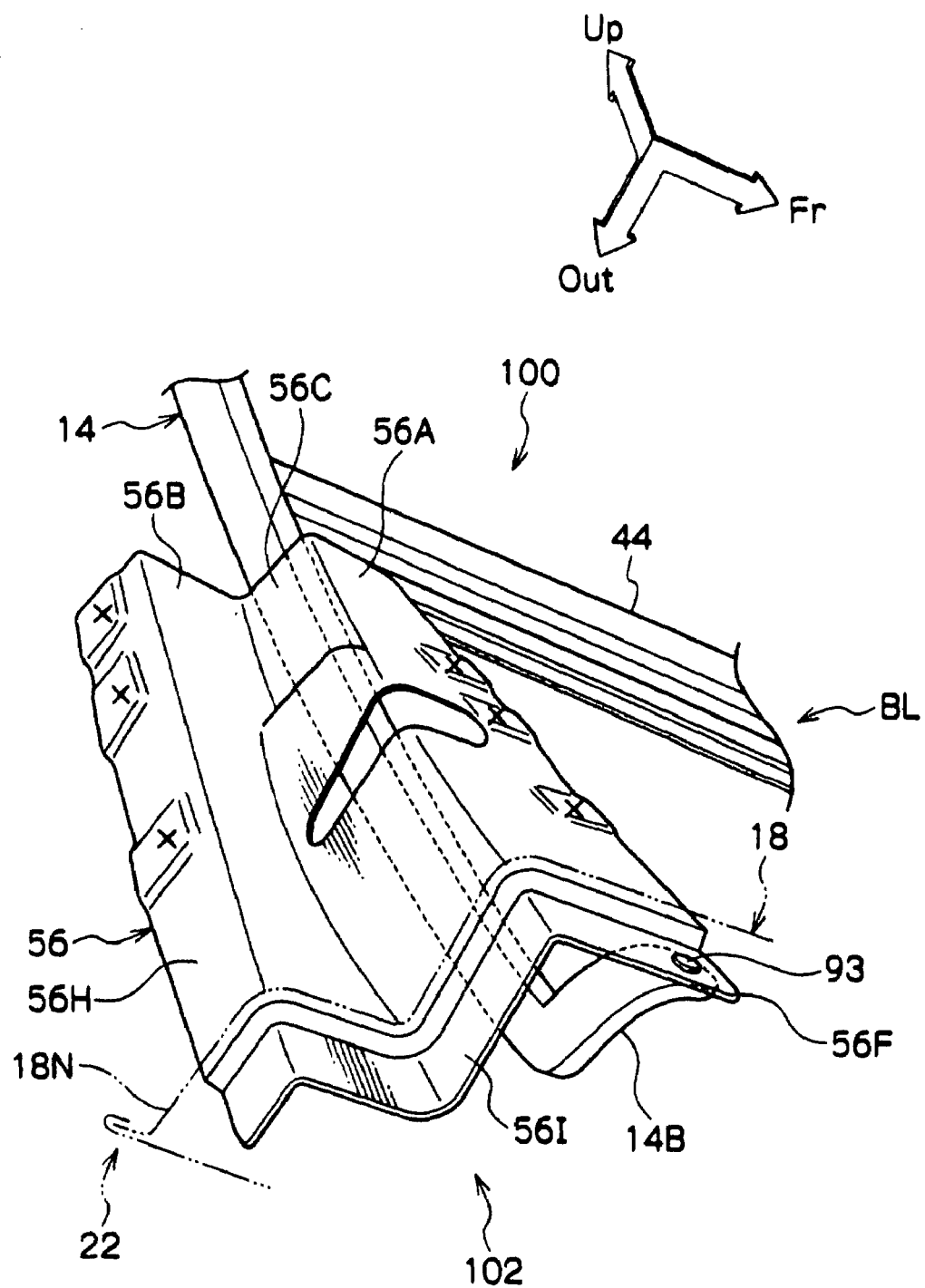
FIG. 36 is a perspective view of the vehicle door structure according to the sixth exemplary embodiment of the present invention.
Figure 37:
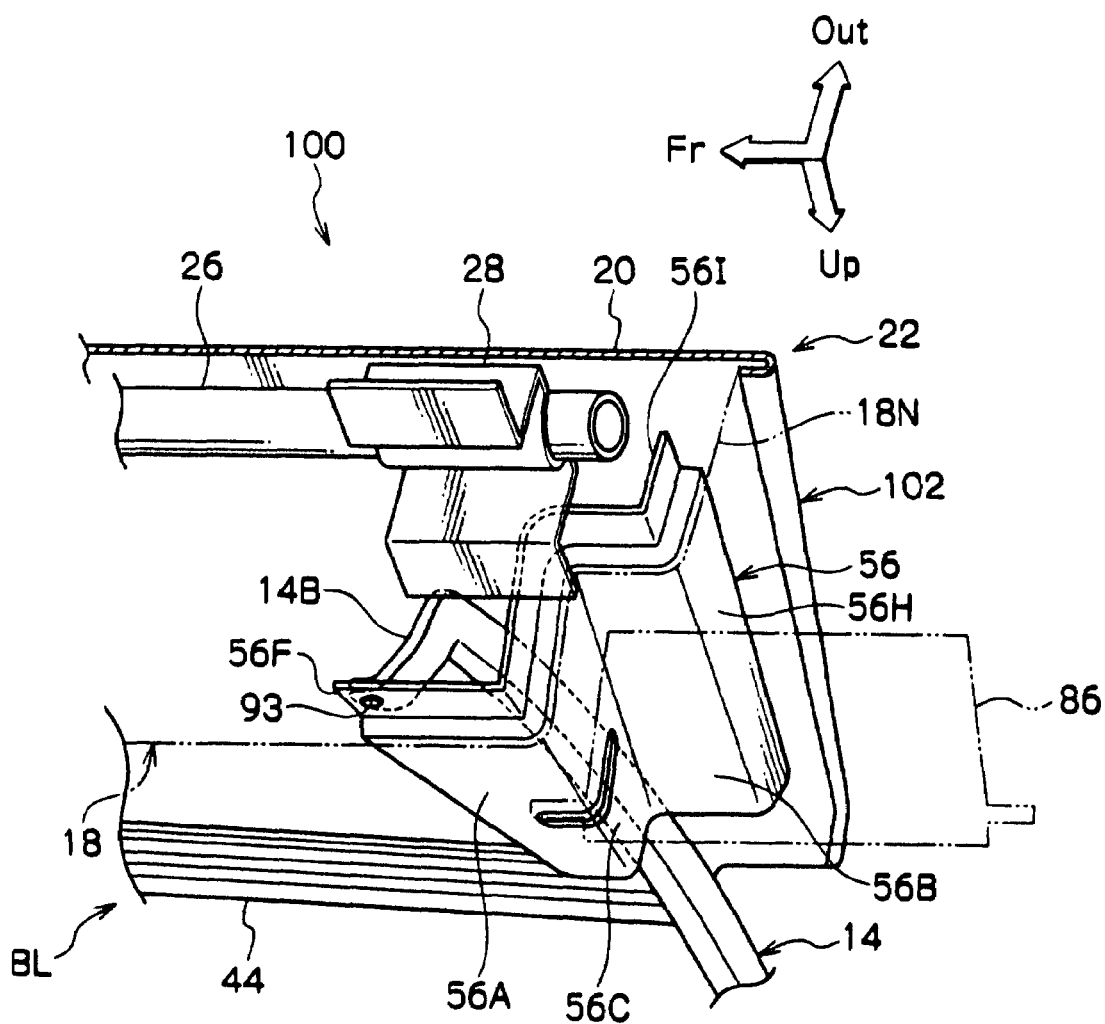
FIG. 37 is a perspective view of the vehicle door structure according to the sixth exemplary embodiment of the present invention.

FIG. 36 and FIG. 37 show a door 102 to which a vehicle door structure 100 according to the sixth exemplary embodiment of the present invention is applied. In these figures, the arrow Fr indicates the vehicle front-rear direction front side, the arrow Up indicates the vehicle up-down direction up side, and the arrow Out indicates the vehicle width direction outside.

The vehicle door structure 100 according to the present exemplary embodiment is the vehicle door structure 90 according to the fifth exemplary embodiment of the present invention described above with the following additional configurations. In the sixth exemplary embodiment of the present invention, elements that are similar to those of the first exemplary embodiment to the fifth exemplary embodiment will be allocated the same reference numerals and explanation thereof will be omitted.

In the door 102 to which the vehicle door structure 100 according to the present exemplary embodiment is applied, as shown in FIG. 36 and FIG. 37, there is a vehicle width direction joining face 18N (door thickness direction face) provided adjacent to the edge joint portion 22 to the door outer panel 20. Also, the lock reinforcement 56 is provided with a second vehicle width direction joining face 56H that is joined to the vehicle width direction joining face 18N.

Furthermore, in the lock reinforcement 56, there is a flange 56I formed as a shape retaining portion at edge portion of each joining face from the first vehicle front-rear direction joining face 56A, through the first vehicle width direction joining face 56C, the second vehicle front-rear direction joining face 56B, to the second vehicle width direction joining face 56H. The flange 56I is provided separated from the door inner panel 18 so that there is a step up to the main body of the lock reinforcement 56. Furthermore, the flange 56I is provided so as to connect to the door frame 14 and the fastened fastening portion 56F.

Explanation will now be given of the operation and effect of the sixth exemplary embodiment of the present invention.

The vehicle door structure 100 according to the present exemplary embodiment, in addition to displaying the operation and effect of the vehicle door structures 40, 50, 60, 70, 90 of the first exemplary embodiment to the fifth exemplary embodiment of the present invention, also displays the following additional operation and effect.

The vehicle width direction joining face 18N is formed to the door inner panel 18, continuous to the edge joint portion 22 with the door outer panel 20, and there is the second vehicle width direction joining face 56H of the lock reinforcement 56 joined to the vehicle width direction joining face 18N. Therefore, the lock reinforcement 56 may be made with a W-shaped cross-section, but, since shape retention may be made of the W-shaped cross-section at the flange 56I, the rigidity of the lock reinforcement 56 as a whole is increased, and as a result, the fixing alignment precision of the door frame 14 may be increased.

By the second vehicle width direction joining face 56H of the lock reinforcement 56 being joined to and increasing the rigidity of the vehicle width direction joining face 18N of the door inner panel 18, the rigidity may be raised of the edge joint portion 22, connected to the vehicle width direction joining face 18N, itself. Also, even if the door 102 as a whole is, for example, placed in a high temperature environment such as a bake oven in electrophoretic coating, since the lock reinforcement 56 restrains the door inner panel 18, deformation of the door inner panel 18 due to the thermal expansion force of the door outer panel 20, and in particular permanent deformation due to thermal distortion of the portion between the vehicle width direction joining face 18N and the edge joint portions 22, may be suppressed.

Furthermore, the flange 56I is provided to the lock reinforcement 56, and the rigidity of the lock reinforcement 56 as a whole is increased. Therefore, relative angular displacement of the each of the joining faces of the door inner panel 18 to the lock reinforcement 56 (tilting of the two faces) may be suppressed.

At the belt line portion BL where the door frame 14 is joined, the inside face in the vehicle width direction is reinforced by the belt line inner reinforcement 44, but the outside face in the vehicle width direction (compared to the reinforcement of the face on the outside in the vehicle width direction by the impact beam 26 of the lower portion of the door panel body 16) has no steel reinforcing member.

So if, as in the present exemplary embodiment, the lock reinforcement 56 is extended to the vehicle width direction joining face 18N adjacent to the edge joint portion 22 (hemming portion), and the lock reinforcement 56 is joined to the vehicle width direction joining face 18N, permanent deformation by thermal distortion, due to a difference in thermal expansion conditions between the door inner panel 18 side and the door outer panel 20 side, may be suppressed. As a result, the build precision of the door 102 to the vehicle body may be increased.

In particular, as described above, the permanent deformation due to thermal distortion at the door outer panel 20 side may be suppressed by joining the lock reinforcement 56 to the vehicle width direction joining face 18N adjacent to the edge joint portion 22 (hemming portion), and in addition, by joining the lower portion of the door frame 14 to the first vehicle width direction joining face 56C of the lock reinforcement 56, the build precision of the door frame 14 in the vehicle width direction may be increased.

Also, as shown in FIG. 37, the joining faces of the lock reinforcement 56 and the door frame 14 of the door inner panel 18 are extended in the vehicle width direction, therefore, side impact load may be transmitted to the B-pillar 86 through these faces in the vehicle width direction. In such an instance, the faces in the vehicle width direction are, compared to faces that are at an angle to the vehicle width direction, less readily collapsed during a side impact, and so the side impact load may be distributed to the B-pillar 86, and the load transmission ratio may be increased.

Also, as shown in FIG. 37, the lock reinforcement 56 as a whole, configured with the flange 56I, is lapped with the B-pillar 86 in a lateral view of the vehicle. Therefore, during a side impact load may be distributed from the lock reinforcement 56 to the door frame 14 side, and in addition load may be distributed from the lock reinforcement 56 to the B-pillar 86 side. In doing so, the load transmission ratio during a side impact may be improved.

Furthermore, the flange 56I provided at the edge portion of the lock reinforcement 56 is configured separated from the door inner panel 18. Therefore, the edge of the end portion of the steel lock reinforcement 56 does not contact with the door inner panel 18 that is of a light alloy, such as aluminum alloy or the like, and so rust prevention properties may be improved.

Seventh Exemplary Embodiment

Explanation will now be given of the seventh exemplary embodiment of the present invention will be explained, with reference to FIG. 38 to FIG. 40.

Figure 38:
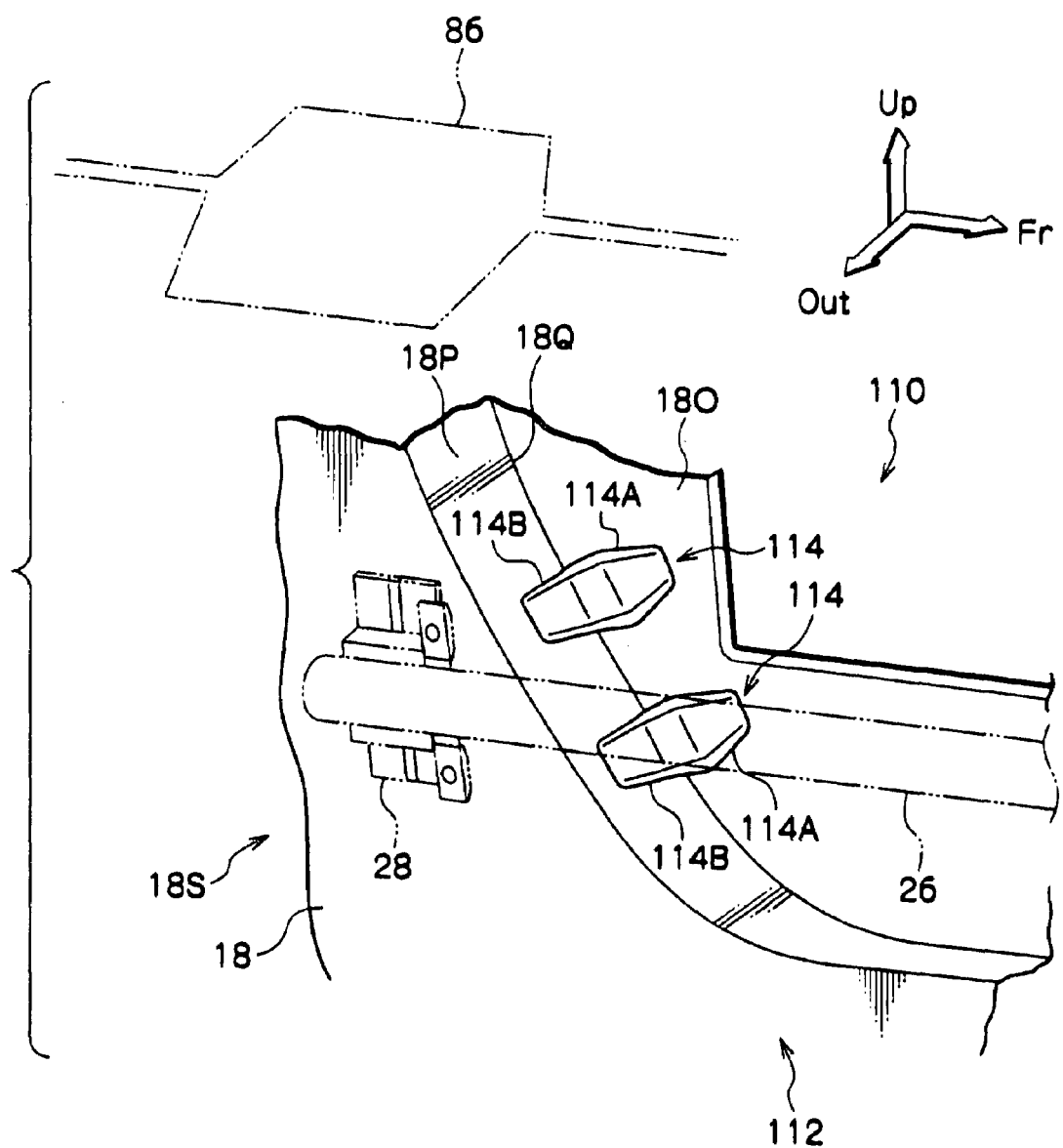
FIG. 38 is a perspective view of the vehicle door structure according to the seventh exemplary embodiment of the present invention.

FIG. 38 shows a door 112 to which a vehicle door structure 110 according to the seventh exemplary embodiment of the present invention is applied. FIG. 39 and FIG. 40 show examples of modifications to the seventh exemplary embodiment of the present invention. In these figures, the arrow Fr indicates the vehicle front-rear direction front side, the arrow Up indicates the vehicle up-down direction up side, the arrow In indicates the vehicle width direction inside and the arrow Out indicates the vehicle width direction outside.

The vehicle door structure 110 according to the present exemplary embodiment is the vehicle door structure 100 of the sixth exemplary embodiment of the present invention described above, configured with the following additions. Therefore, in the seventh exemplary embodiment of the present invention, elements that are similar to those of the first exemplary embodiment to the sixth exemplary embodiment will be allocated the same reference numerals and explanation thereof will be omitted.

As shown in FIG. 38, the door 112 to which the vehicle door structure 110 according to the present exemplary embodiment is applied is provided, as reinforcements, with a pair of, upper and lower, beads 114 at portions at the rear side in the vehicle front-rear direction of the door inner panel 18. The pair of beads 114 is provided in positions over lapping with the impact beam 26 in a side view of the vehicle.

Also, each of the beads 114 is configured with a first bead portion 114A that is provided on a vehicle front-rear direction face 18O of the door inner panel 18, and a second bead portion 114B provided on a vehicle width direction face 18P of the door inner panel 18 and continuous to the first bead portion 114A. In each of the beads 114, the first bead portion 114A protrudes out from the vehicle front-rear direction face 18O toward the outside in the vehicle width direction, and the second bead portion 114B protrudes out from the vehicle width direction face 18P toward the front side in the vehicle front-rear direction.

Explanation will now be given of the operation and effect of the seventh exemplary embodiment of the present invention.

The vehicle door structure 110 according to the seventh exemplary embodiment of the present invention displays, in addition to the operation and effect of the vehicle door structures 40, 50, 60, 70, 90, 100 displayed by the first exemplary embodiment to the sixth exemplary embodiment of the present invention, displays the following operation and effect.

That is to say, in the vehicle door structure 110 according to the present exemplary embodiment, there are beads 114, provided continuously to the vehicle front-rear direction face 18O and vehicle width direction face 18P, formed at a portion at the rear side in the vehicle front-rear direction of the door inner panel 18. Therefore, even if the door 112 as a whole is, for example, placed in a high temperature environment such as a bake oven in electrophoretic coating, relative angular displacement between the vehicle front-rear direction face 18O and the vehicle width direction face 18P of the door inner panel 18 (tilting of the two faces), due to thermal expansion force of the door outer panel 20, may be suppressed by the beads 114.

Furthermore, by adding the beads 114 to a linear edge 18Q between the vehicle front-rear direction face 18O and the vehicle width direction face 18P of the door inner panel 18, the second moment of area of the linear edge 18Q may be increased. The linear edge 18Q of the door inner panel 18 is, in general, a right angle so as to secure the fitting face of the impact beam 26, and so deformation readily occurs due to thermal expansion and contraction of the door outer panel 20. However, by providing the beads 114, as in the present exemplary embodiment, deformation of the linear edge 18Q of the door inner panel 18 may be suppressed. In this manner, in the vehicle door structure 110 according to the present exemplary embodiment, the rigidity of the door inner panel 18 against bending deformation may be increased, and deformation of the door inner panel 18 may be suppressed.

The beads 114 formed on the door inner panel 18 over lap with the impact beam 26 in a lateral view of the vehicle. Therefore, during a side impact load may be distributed from the impact beam 26 to the B-pillar 86, and the load transmission ratio may be increased.

Also, by providing the beads 114 on the door inner panel 18, the cross-sectional profile of the door inner panel 18 is maintained by the beads 114. Therefore, variations when press manufacturing the door inner panel 18, may be compensated for, to a certain extent, and press manufacturability may be increased.

Explanation will now be given of examples of modifications to the seventh exemplary embodiment of the present invention.

In the above exemplary embodiment there are a pair of, upper and lower, beads 114 provided to the door inner panel 18, however, a single bead 114 may be provided. Also, as shown in FIG. 39, there may also be a configuration (a first example modification) in which a bead portion 114C is provided that extends in a curve in the up-down direction at the vehicle front-rear direction face 18O of the door inner panel 18, and protrudes to the outside in the vehicle width direction, and the bead portion 114C is connected to the vehicle width direction face 18P by a bead portion 114B.

By doing so, the bead portion 114B provided on the vehicle width direction face 18P may reinforce at the curved bead portion 114C. By doing so, deformation of the door inner panel 18 may be suppressed. It is preferable, in such a case, that the curved bead portion 114C is formed in such a manner that the axis of the bending moment thereof is not parallel to the curved bead portion 114C itself (that is, in a manner so that the second moment of area is not decreased).

Here, the fixing portion 14B at the lower portion of the rear frame 14A of the door frame 14 may be fastened by the fastener 93 to the curved bead portion 114C. In this way, the fixing rigidity of the door frame 14 may be increased.

Figure 40:
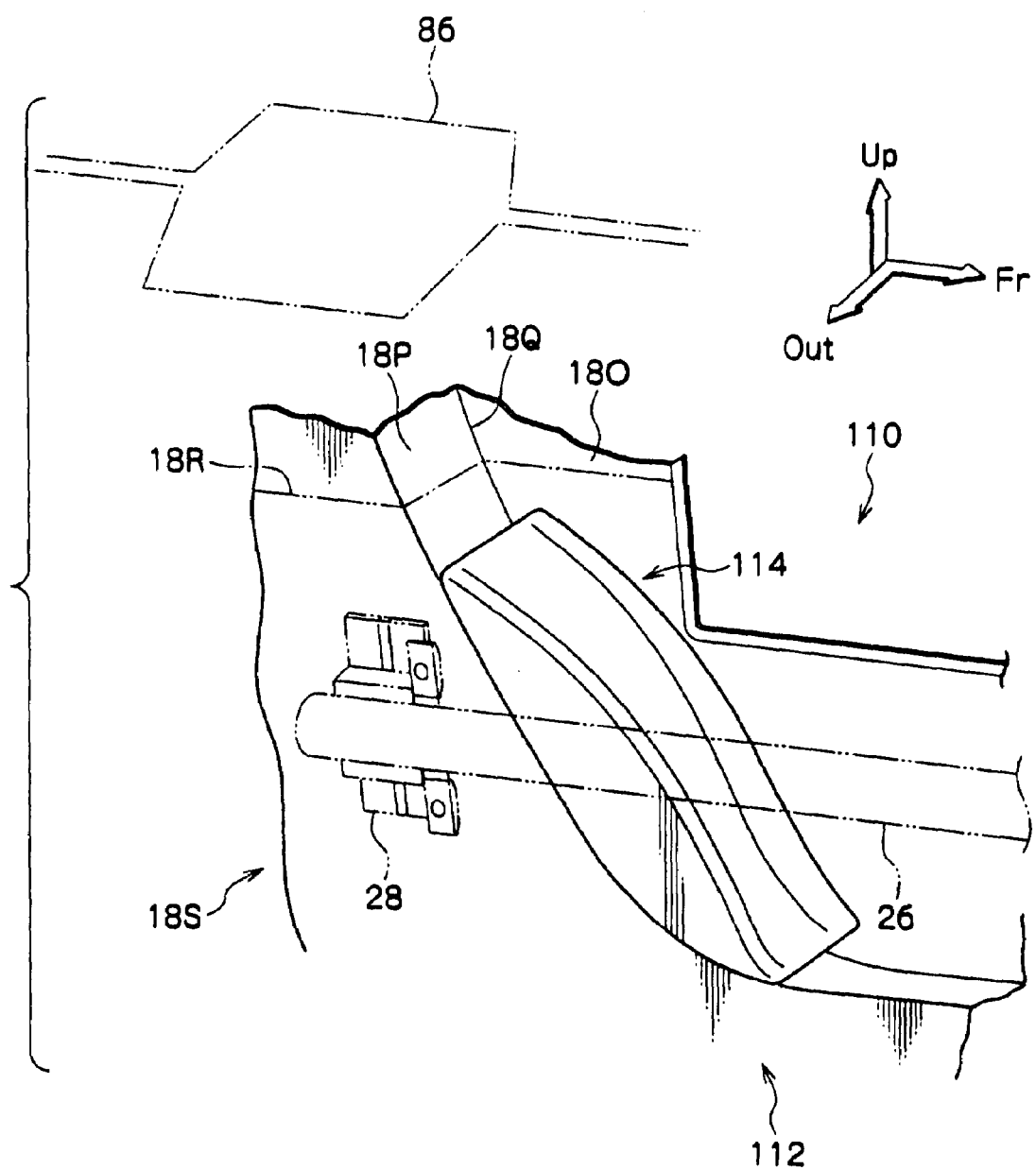
FIG. 40 is a diagram showing a second example of a modification to the vehicle door structure according to the seventh exemplary embodiment of the present invention.

Furthermore, as shown in FIG. 40, a bead 114 may be formed that is expanded toward the top and bottom, up to the normal cross-section 18R of the door inner panel 18 (a second example modification). By doing so, the second moment of area of the portion where the bead 114 is provided may be increase still further. Thereby the rigidity against bending deformation of the door inner panel 18 may be increased, and deformation of the door inner panel 18 may be further suppressed.

Test Example 2

Explanation will now be given of a test example of the vehicle door structure 110 according to the seventh exemplary embodiment of the present invention, with reference to the FIGS. 41A to 41D and FIG. 42.

Figure 41:
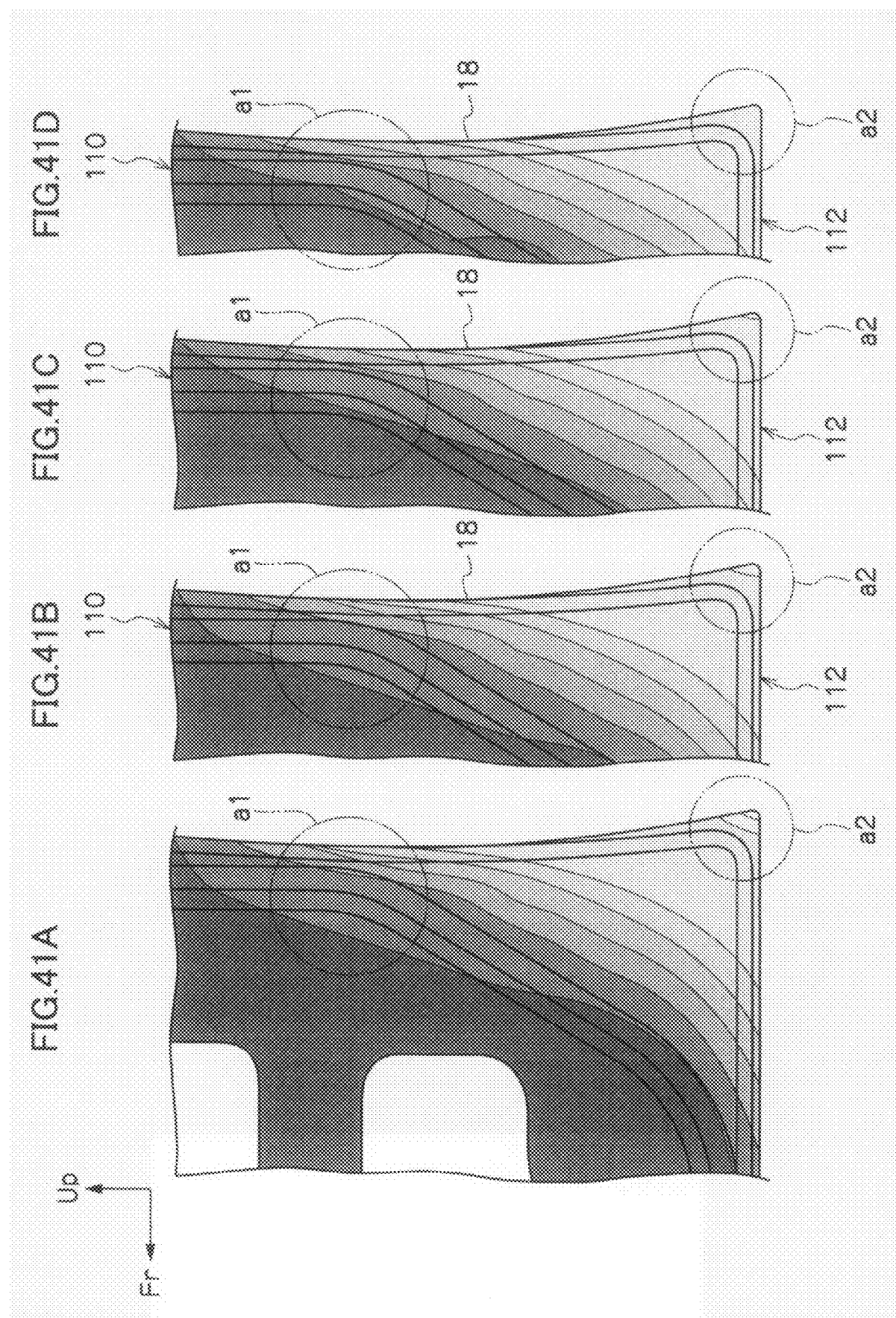
FIG. 41A to FIG. 41D explanatory diagrams showing the vehicle width direction displacement improvement effect of a door to which the vehicle door structure according to the seventh exemplary embodiment of the present invention is applied.

FIG. 41A to 41D are explanatory diagrams showing an improved effect on displacement in the vehicle width direction of the door 112 to which the vehicle door structure 110 according to the present exemplary embodiment is applied. FIG. 41A shows displacement distribution in the vehicle width direction of a conventional door, FIG. 41B shows displacement distribution in the vehicle width direction of the door 112 to which the vehicle door structure 110 according to the present exemplary embodiment (see FIG. 38) is applied.

Furthermore, FIG. 41C shows displacement distribution in the vehicle width direction of the door 112 to which the vehicle door structure 110 according to the first example modification (see FIG. 39) of the present exemplary embodiment is applied, and FIG. 41D shows displacement distribution in the vehicle width direction of the door 112 to which the vehicle door structure 110 according to the second example modification of the present exemplary embodiment (see FIG. 40) is applied. Each set of data is an analysis of the hypothesis that the door as a whole is, for example, placed in a high temperature environment such as a bake oven in electrophoretic coating.

As may be seen from the figures, in the vehicle door structure 110 according to the present exemplary embodiment, by adding the beads 114 to the door inner panel 18 (see FIG. 38 to FIG. 40), deformation of the door inner panel 18, and particularly deformation at a regional at the rear side in the vehicle front-rear direction where the door thickness becomes thin, and deformation at a region a2 at a lower portion corner portion at the rear side in the vehicle front-rear direction (portion where the door thickness is thin), may be suppressed. Also, it may be seen that, in the first example modification, by providing the curved bead 114, deformation of each of the regions a1, a2, may be further suppressed, and furthermore, by expanding the bead 114, as in the second example modification, deformation of each of the regions a1, a2, may be further suppressed even further.

Figure 42:
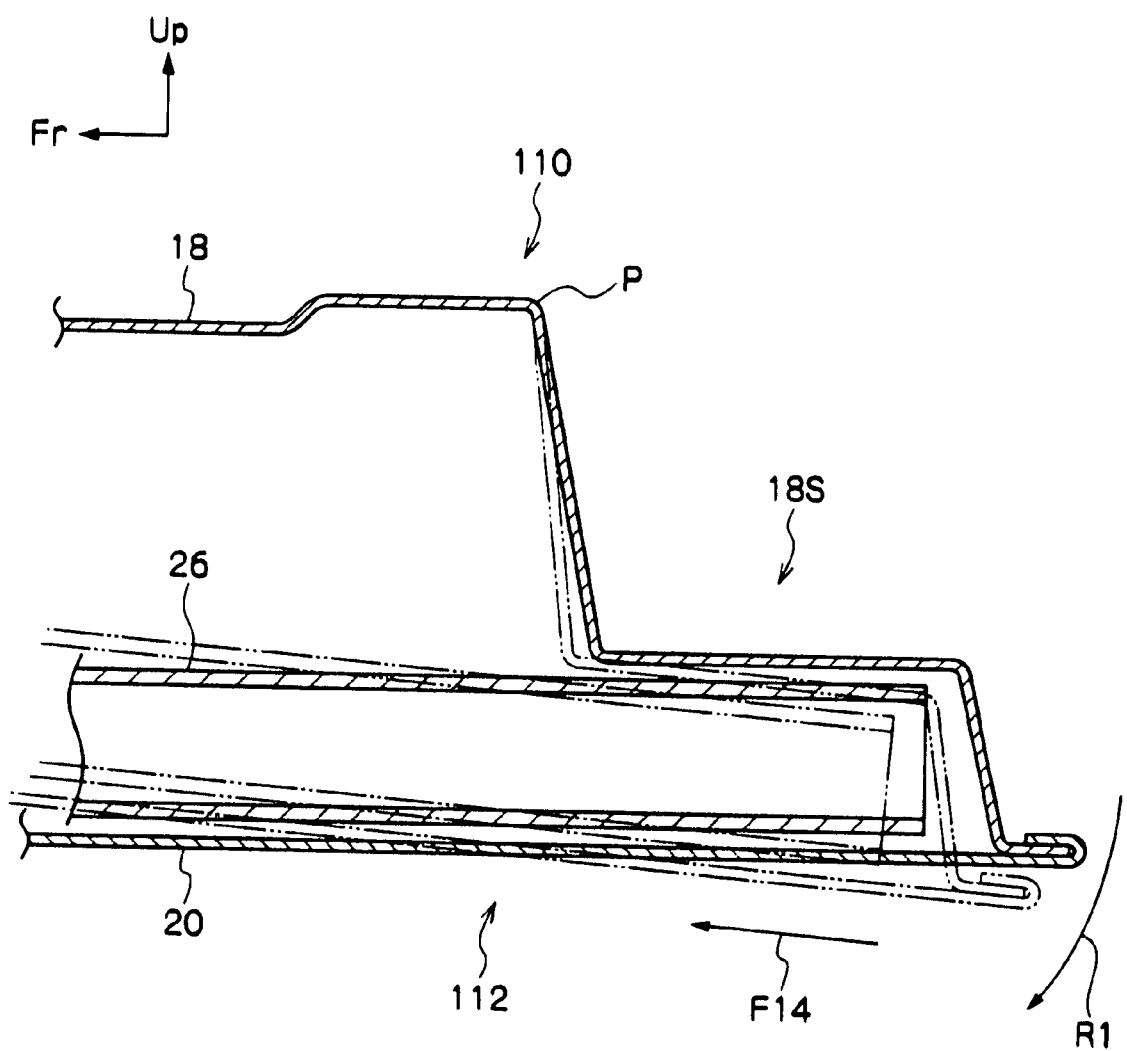
FIG. 42 is an explanatory diagram showing the vehicle width direction displacement improvement effect of a door to which the vehicle door structure according to the seventh exemplary embodiment of the present invention is applied.

That is, even if the door 112 as a whole is, for example, placed in a high temperature environment such as a bake oven in electrophoretic coating, as is seen in FIG. 42, rotational displacement of the door inner panel 18, due to the thermal expansion and contraction force F14 of the door outer panel 20 (in FIG. 42, bending deformation in the direction of the arrow R1 about the fulcrum of the door thickness change point P of the door inner panel 18), may be suppressed, and, as a result, for example, it may be said that the build precision of the door 112 to the vehicle body may be increased.

Figure 39:
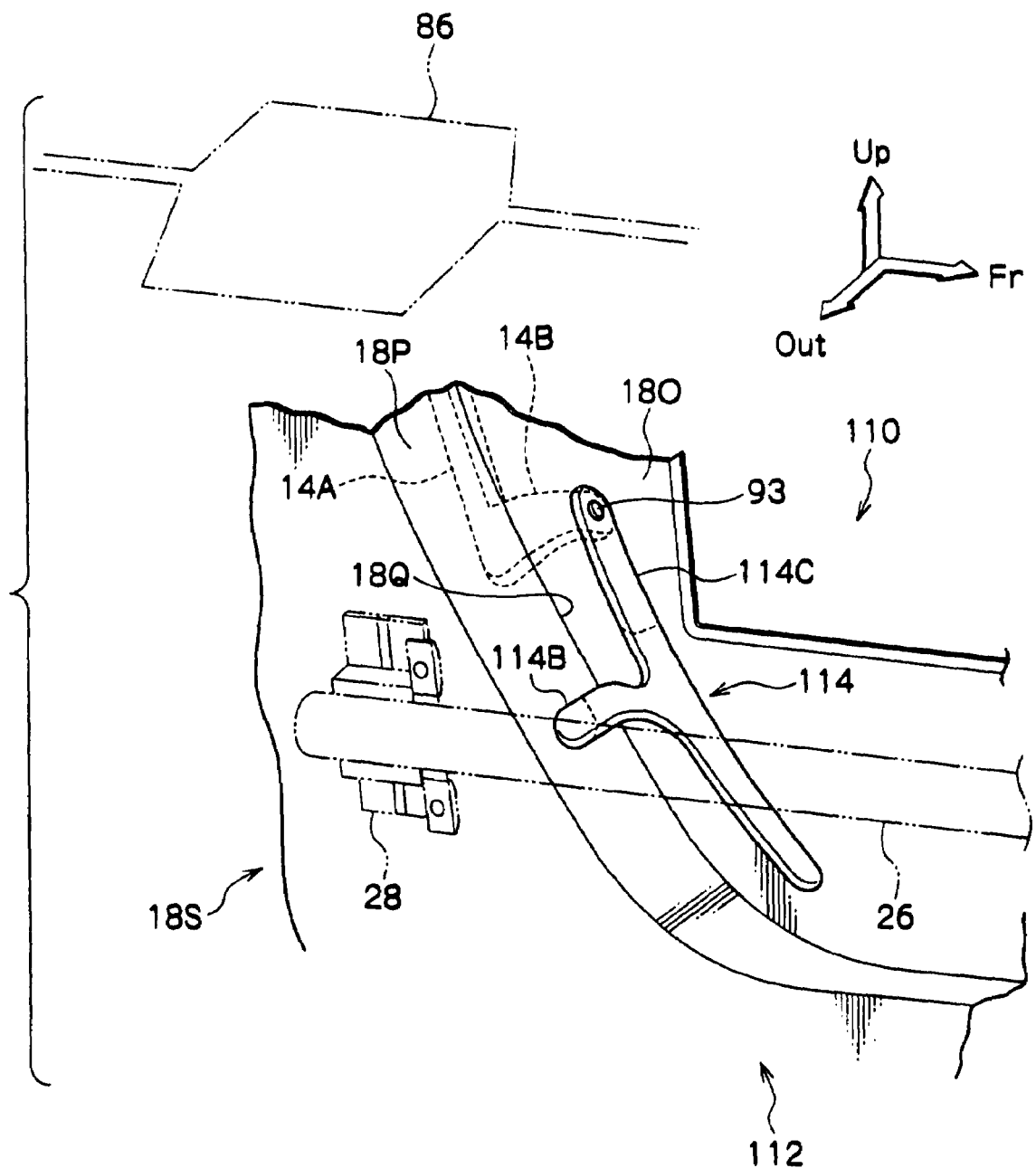
FIG. 39 is a diagram showing a first example of a modification to the vehicle door structure according to the seventh exemplary embodiment of the present invention.

In particular, by providing beads 114 to the vehicle front-rear direction face 18O and vehicle width direction face 18P of the door inner panel 18, as shown in FIGS. 38 through 40, deformation of the portion of the door inner panel 18 that is thinner in vehicle width direction thickness than the rest of the locations thereof (the portion shown by reference 18S) may be suppressed.

Eighth Exemplary Embodiment

Explanation will now be given of the eighth exemplary embodiment of the present invention, with reference to FIG. 43 to FIG. 46.

Figure 43:
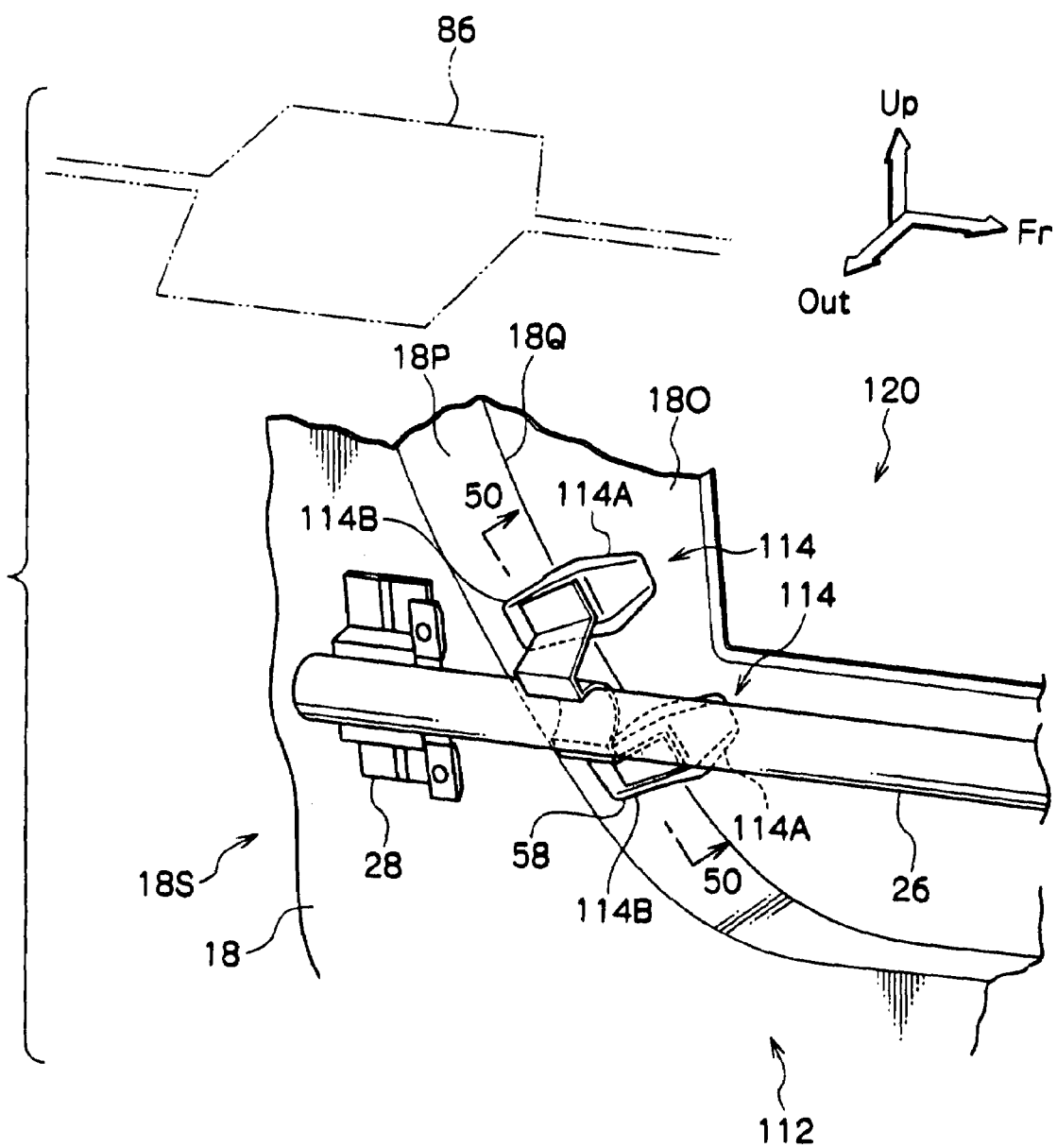
FIG. 43 is perspective view of the vehicle door structure according to the eighth exemplary embodiment of the present invention.
Figure 44:
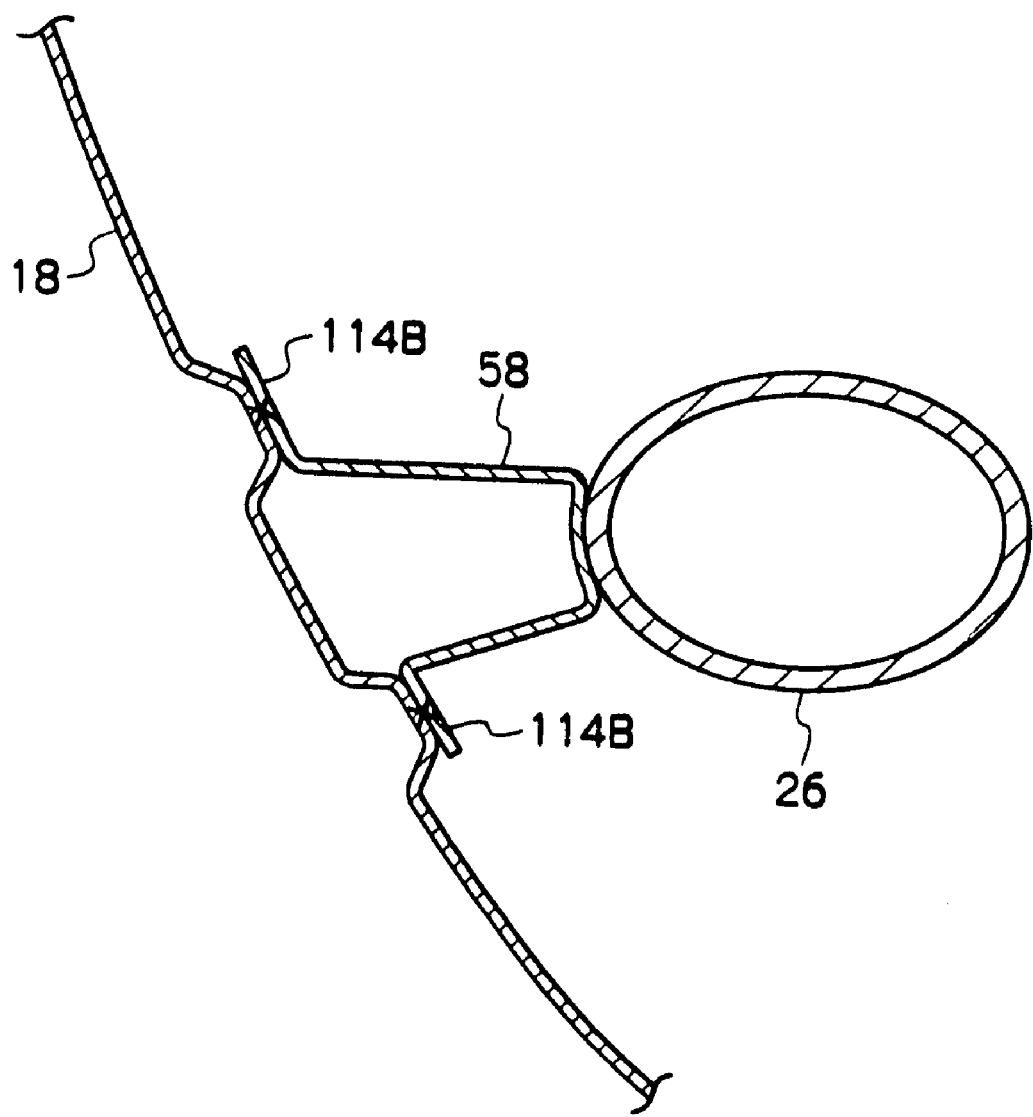
FIG. 44 is a cross-section on 50-50 of FIG. 43.
Figure 45:
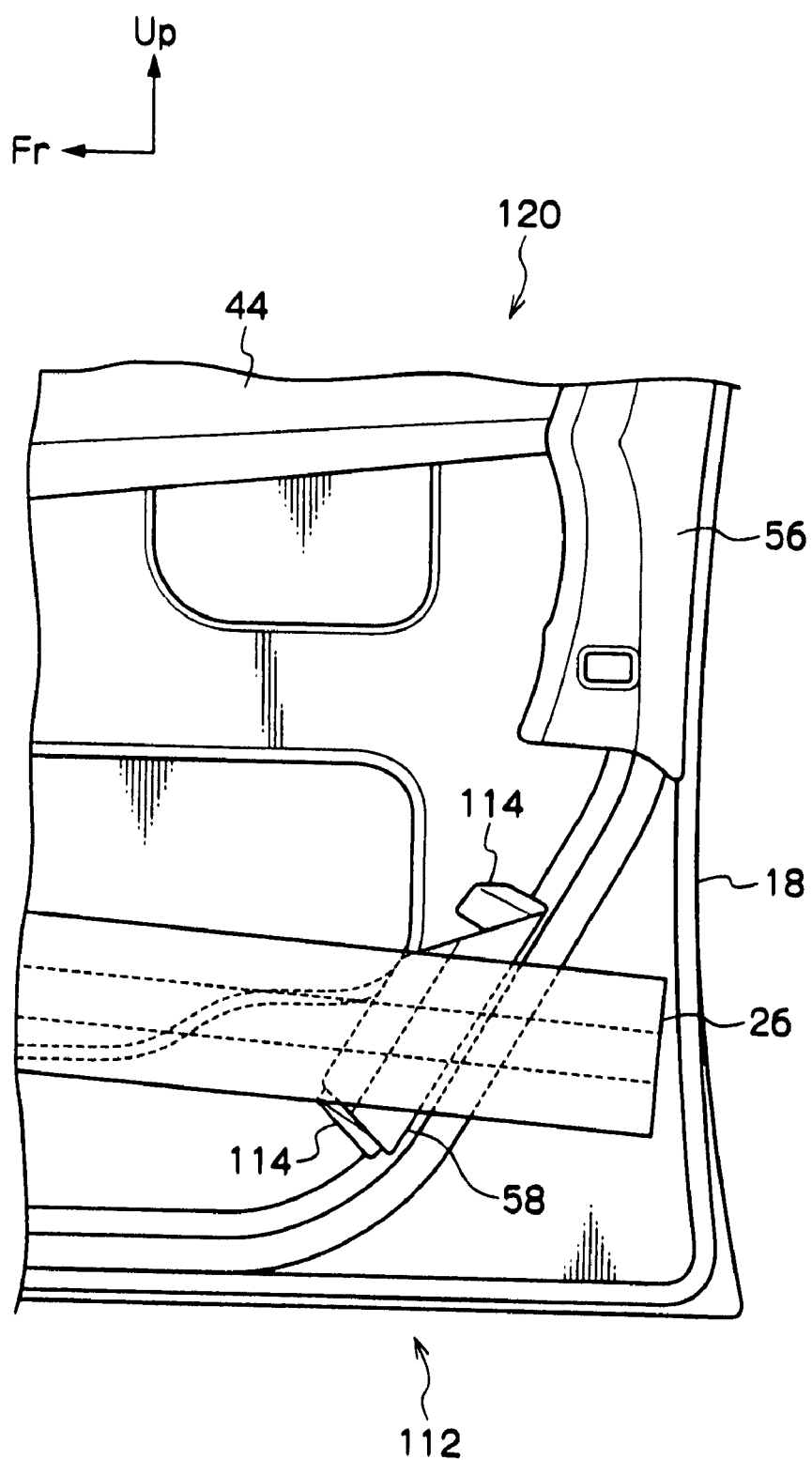
FIG. 45 is a diagram showing an example modification to the vehicle door structure according to the eighth exemplary embodiment of the present invention.
Figure 46:
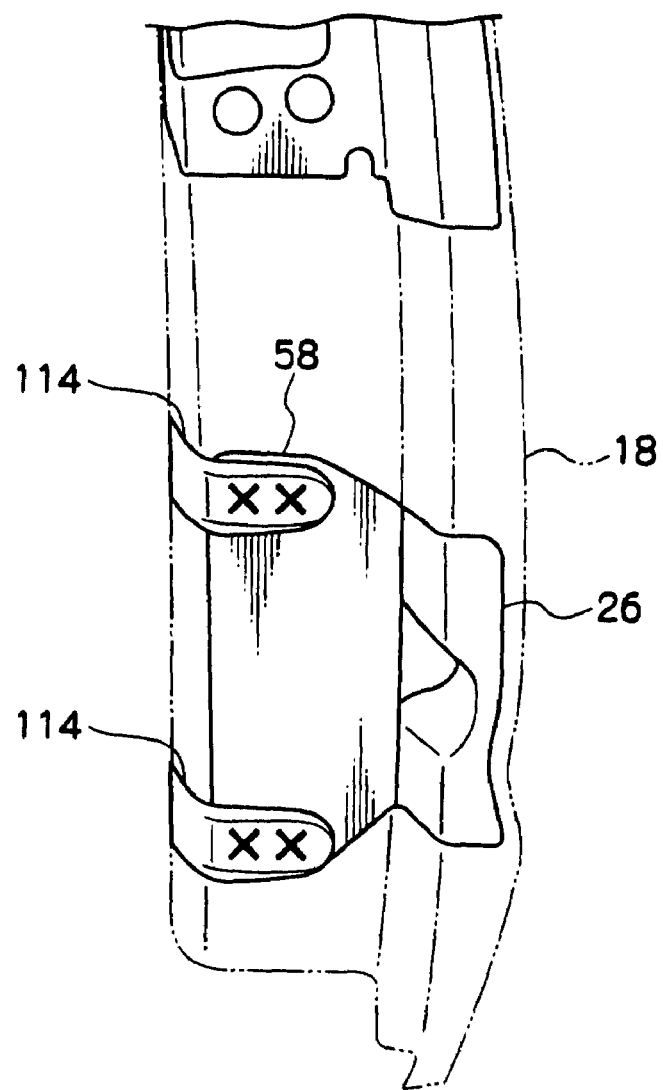
FIG. 46 is a diagram showing an example modification to the vehicle door structure according to the eighth exemplary embodiment of the present invention.

FIG. 43 and FIG. 44 show a door 122 to which a vehicle door structure 120 according to the eighth exemplary embodiment of the present invention is applied. FIG. 45 and FIG. 46 show examples of modifications of the vehicle door structure 120 according to the eighth exemplary embodiment of the present invention. In these figures, the arrow Fr indicates the vehicle front-rear direction front side, the arrow Up indicates the vehicle up-down direction up side, and the arrow Out indicates the vehicle width direction outside.

The vehicle door structure 120 according to the present exemplary embodiment is the vehicle door structure 110 according to the seventh exemplary embodiment of the present invention, configured with the following additions. Therefore, in the eighth exemplary embodiment of the present invention, elements that are similar to those of the first exemplary embodiment to the seventh exemplary embodiment will be allocated the same reference numerals and explanation thereof will be omitted.

As shown in FIG. 43 and FIG. 44, in the door 122 to which the vehicle door structure 120 according to the present exemplary embodiment is applied, the protruding direction of the bead portions 114B, of the beads 114, formed on the vehicle width direction face 18P of the door inner panel 18, is set to be substantially the same as the longitudinal direction of the impact beam 26. Furthermore, an extension 58 that is connected to the impact beam 26 is joined to the protrude end portions of the bead portions 114B.

Explanation will now be given of the operation and effect of the eighth exemplary embodiment of the present invention.

The vehicle door structure 120 according to the eighth exemplary embodiment of the present invention displays, in addition to the operation and effect of the vehicle door structures 40, 50, 60, 70, 80, 90, 100, 110, according to the first exemplary embodiment to the seventh exemplary embodiment of the present invention, the following operation and effect.

In the vehicle door structure 120 according to the present exemplary embodiment, the protruding direction of the bead portions 114B, of the beads 114, formed on the vehicle width direction face 18P of the door inner panel 18, is set to be substantially the same as the longitudinal direction of the impact beam 26. Furthermore, an extension 58 that is connected to the impact beam 26 is joined to the protrude end portions of the bead portions 114B. Therefore, deformation of the second bead portions 114B, and therefore deformation of the beads 114 as a whole may be suppressed by an axial force exhibited by the impact beam 26. By doing so, relative angular displacement between the vehicle front-rear direction face 18O and the vehicle width direction face 18P of the door inner panel 18 (tilting of the two faces) may be suppressed. As a result, for example, the build precision of the door 122 to the vehicle body may be increased.

Furthermore, the load from the impact beam 26 during a side impact is distributed to the door inner panel 18 reinforced by the beads 114. Therefore, the load transmission ratio to the B-pillar 86 during a side impact may be increased.

Also, in such a case, the end portions of the extension 58 are raised from the general plane of the beads 114 and the door inner panel 18, and so contact between the end portions of the extension 58 with the beads 114 and the door inner panel 18 may be prevented, and rust prevention properties may be raised.

Explanation will now be given of examples of modifications of the eighth exemplary embodiment of the present invention.

In the above exemplary embodiment, as shown in FIG. 45 and FIG. 46, the up-down spacing between the pair of, upper and lower, beads 114 may be increased and also the extension 58 may be extended in the up-down direction, and extension 58 may be joined to the protruding end portions of the pair of beads 114. Furthermore, when doing so, the impact beam 26 may be configured as a flat plate. In this manner, the width in the up-down direction for the deformation suppression of the door inner panel 18 may be extended, and, as a result, for example, the build precision of the door 122 to the vehicle body may be raised.

The foregoing description of the exemplary embodiments of the present exemplary embodiment is provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A vehicle door structure comprising:
a door inner panel, including, at portions toward both ends in a door width direction, first side joining portions at a first side in a door thickness direction and second side joining portions at a second side, opposite to the first side, in the door thickness direction, wherein the first side joining portions are provided at an interval from the second side portions in the door height direction;
a door outer panel, disposed more towards the second side in the door thickness direction than the door inner panel and joined to the door inner panel;
a pair of door reinforcement members, each configured from a material that has a smaller thermal expansion coefficient than that of the door outer panel, extending substantially in the door width direction and located between the door inner panel and the door outer panel,
one of the pair of door reinforcement members being disposed in a position at the first side in the door thickness direction and portions toward both ends thereof in the door width direction being joined respectively to the first side joining portions, and
the other of the pair of door reinforcement members being disposed in a position at the second side in the door thickness direction and portions toward both ends thereof in the door width direction being joined respectively to the second side joining portions.

2. The vehicle door structure according to claim 1, wherein:
the portions toward the ends in the door width direction of the door inner panel comprise a door width direction surface extending substantially in the door width direction and a door thickness direction surface extending substantially in the door thickness direction;

a connecting portion is provided, for at least one of the pair of door reinforcement members, at a portion of the door reinforcement member at one side in the door width direction; and the connecting portion is joined to the door width direction surface and to the door thickness direction surface.

3. The vehicle door structure according to claim 1, wherein the door inner panel and the door outer panel are joined together at their mutual edge portions by a normal temperature curing adhesive, a fine particle containing adhesive, or welding.

4. The vehicle door structure according to claim 2, wherein at least one of the pair of door reinforcement members or the connecting portion is provided with a mounting portion for mounting a functional component thereto.

5. The vehicle door structure according to claim 2, wherein at least one of the pair of door reinforcement members or the connecting portion is joined to the door outer panel.

6. The vehicle door structure according to claim 2, further comprising:

a door frame, supporting door glass and provided extending up from a door panel body, which comprises the door inner panel and the door outer panel, and wherein a fixing portion of the door frame to the door panel body is joined to at least one of the pair of door reinforcement members or the connecting portion.

7. The vehicle door structure according to claim 2, wherein, at the portion at the end in the door width direction of the door inner panel, a second door thickness direction surface is formed, adjacent to a portion where the edge of the door inner panel is joined to the door outer panel and extending substantially in the door thickness direction, and the connecting portion is joined to the second door thickness direction surface.

8. The vehicle door structure according to claim 2, wherein the connecting portion comprises a shape retaining portion for restricting relative angular displacement between the door width direction surface and the door thickness direction surface.

9. The vehicle door structure according to claim 1, wherein portions at the ends in the door width direction of the pair of door reinforcement members are connected by a connector.

10. The vehicle door structure according to claim 2, wherein reinforcement is provided continuously on the door width direction surface and the door thickness direction surface.

11. The vehicle door structure according to claim 10, wherein the reinforcement comprises a bead that protrudes out from the door width direction surface and the door thickness direction surface.

12. The vehicle door structure according to claim 11, wherein the bead comprises a bead portion that protrudes out from the door thickness direction surface in the door width direction, and the connecting portion of at least one of the pair of door reinforcement members is joined at a protruding end portion of the bead portion.

* * * * *